(12) United States Patent
Shalev-Shwartz et al.

(10) Patent No.: US 11,173,900 B2
(45) Date of Patent: Nov. 16, 2021

(54) NAVIGATING BASED ON SENSED BRAKE LIGHT PATTERNS

(71) Applicant: Mobileye Vision Technologies Ltd., Jerusalem (IL)

(72) Inventors: Shai Shalev-Shwartz, Jerusalem (IL); Amnon Shashua, Mevaseret Zion (IL); Shaked Shammah, Jerusalem (IL)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 202 days.

(21) Appl. No.: 16/509,325

(22) Filed: Jul. 11, 2019

(65) Prior Publication Data
US 2019/0329769 A1    Oct. 31, 2019

Related U.S. Application Data

(63) Continuation of application No. PCT/US2018/013375, filed on Jan. 11, 2018.
(Continued)

(51) Int. Cl.
*B60W 30/09* (2012.01)
*G06K 9/00* (2006.01)
(Continued)

(52) U.S. Cl.
CPC ........ *B60W 30/09* (2013.01); *B60W 30/0956* (2013.01); *B60W 30/162* (2013.01);
(Continued)

(58) Field of Classification Search
CPC ......... B60W 2300/15; B60W 2300/17; B60W 2420/42; B60W 2540/215;
(Continued)

(56) References Cited

U.S. PATENT DOCUMENTS 5,955,945 A * 9/1999 Fuhrer ................ B60Q 11/00
340/479
9,511,767 B1 * 12/2016 Okumura .......... B60W 50/0097
(Continued)

FOREIGN PATENT DOCUMENTS

DE      102010052406 A1    7/2011

OTHER PUBLICATIONS

International Search Report and Written Opinion in PCT/US2018/013375, dated Jun. 7, 2018 (19 pages).
(Continued)

*Primary Examiner* — Babar Sarwar
(74) *Attorney, Agent, or Firm* — Finnegan, Henderson, Farabow, Garrett & Dunner, LLP

(57) ABSTRACT

Systems and methods are provided for navigating based on sensed brake light patterns. In one implementation, a navigation system for a host vehicle may include at least one processing device. The at least one processing device may be programmed to receive, from a camera, a plurality of images representative of an environment ahead of the host vehicle; analyze the plurality of images to identify at least one target vehicle in the environment ahead of the host vehicle; identify, based on analysis of the plurality of images, at least one brake light associated with the target vehicle and at least one characteristic associated with changes in an illumination state of the at least one brake light; and cause a navigational change for the host vehicle based on the identified at least one characteristic associated with the changes in the illumination state of the at least one brake light.

23 Claims, 53 Drawing Sheets

Related U.S. Application Data

(60) Provisional application No. 62/445,500, filed on Jan. 12, 2017, provisional application No. 62/546,343, filed on Aug. 16, 2017, provisional application No. 62/565,244, filed on Sep. 29, 2017, provisional application No. 62/582,687, filed on Nov. 7, 2017.

(51) Int. Cl.

| | |
|---|---|
| *G05D 1/02* | (2020.01) |
| *G08G 1/01* | (2006.01) |
| *G08G 1/0968* | (2006.01) |
| *B60W 30/095* | (2012.01) |
| *B60W 30/16* | (2020.01) |
| *B60W 30/18* | (2012.01) |
| *B60W 50/10* | (2012.01) |
| *G05D 1/00* | (2006.01) |
| *G01C 21/36* | (2006.01) |
| *G08G 1/16* | (2006.01) |
| *B60W 30/165* | (2020.01) |
| *G06T 7/70* | (2017.01) |

(52) U.S. Cl.
CPC ...... *B60W 30/18163* (2013.01); *B60W 50/10* (2013.01); *G05D 1/0088* (2013.01); *G05D 1/0214* (2013.01); *G05D 1/0223* (2013.01); *G05D 1/0253* (2013.01); *G06K 9/00791* (2013.01); *G06K 9/00825* (2013.01); *G08G 1/0145* (2013.01); *G08G 1/0968* (2013.01); *B60W 30/165* (2013.01); *B60W 2300/15* (2013.01); *B60W 2300/17* (2013.01); *B60W 2420/42* (2013.01); *B60W 2540/215* (2020.02); *B60W 2540/30* (2013.01); *B60W 2554/80* (2020.02); *B60W 2554/801* (2020.02); *B60W 2554/804* (2020.02); *G01C 21/3658* (2013.01); *G05D 1/0246* (2013.01); *G05D 2201/0201* (2013.01); *G05D 2201/0202* (2013.01); *G05D 2201/0213* (2013.01); *G06K 2209/23* (2013.01); *G06T 7/70* (2017.01); *G06T 2207/30256* (2013.01); *G08G 1/167* (2013.01)

(58) Field of Classification Search
CPC ......... B60W 2540/30; B60W 2554/20; B60W 2554/4029; B60W 2554/80; B60W 2554/801; B60W 2554/804; B60W 30/09; B60W 30/0956; B60W 30/162; B60W 30/165; B60W 30/18163; B60W 50/0097; B60W 50/10; B60W 60/001; G01C 21/3602; G01C 21/3658; G05D 1/0088; G05D 1/0214; G05D 1/0223; G05D 1/0246; G05D 1/0253; G05D 2201/0201; G05D 2201/0202; G05D 2201/0213; G06K 2209/23; G06K 9/00791; G06K 9/00825; G06T 2207/30256; G06T 7/70; G08G 1/0145; G08G 1/0968; G08G 1/167

See application file for complete search history.

(56) References Cited

U.S. PATENT DOCUMENTS

| | | | |
|---|---|---|---|
| 2002/0130773 A1* | 9/2002 | Santa Cruz | B60Q 1/442 340/479 |
| 2003/0128112 A1* | 7/2003 | Chow | B60Q 1/54 340/466 |
| 2007/0168129 A1* | 7/2007 | Thorne | B60T 7/22 701/301 |
| 2014/0184400 A1* | 7/2014 | Yang | G08G 1/166 340/435 |
| 2014/0222280 A1* | 8/2014 | Salomonsson | B60Q 9/008 701/28 |
| 2015/0151725 A1* | 6/2015 | Clarke | B62D 15/0265 701/28 |
| 2015/0175069 A1* | 6/2015 | Yang | B60K 35/00 340/458 |
| 2016/0039336 A1* | 2/2016 | Nordstrom | B60Q 1/46 340/471 |
| 2016/0046290 A1 | 2/2016 | Aharony et al. | |
| 2016/0161271 A1 | 6/2016 | Okumura | |
| 2016/0278065 A1* | 9/2016 | Kim | H04W 72/046 |
| 2016/0379350 A1* | 12/2016 | Matsui | G06T 7/001 348/125 |
| 2017/0190286 A1* | 7/2017 | Yavitz | B60Q 1/54 |
| 2017/0316694 A1* | 11/2017 | Ryu | G08G 1/166 |
| 2018/0022346 A1* | 1/2018 | Murakami | G08G 1/168 701/37 |
| 2019/0138002 A1* | 5/2019 | Mimura | B60W 50/14 |

OTHER PUBLICATIONS

Leemon C Baird, "Reinforcement Learning in Continuous Time: Advantage Updating in Neural Networks," IEEE World Congress on Computational Intelligence., 1994 IEEE International Conference on Neural Networks, vol. 4, pp. 2448-2453. IEEE, 1994.

Richard Bellman, "Dynamic Programming and Lagrange Multipliers," Proceedings of the National Academy of Sciences of the United States of America, 42(10): 767, 1956.

Richard Bellman, "Introduction to the mathematical theory of control processes," vol. 2, IMA, 1971.

Volodymyr Mnih, et al., "Human-Level Control Through Deep Reinforcement Learning," Nature, 518(7540):529-533, Feb. 25, 2015.

Shai Shalev-Shwartz, et al., "Safe, Multi-Agent, Reinforcement Learning for Autonomous Driving," Oct. 11, 2016, available at https://arxiv.org/abs/1610.03295.

Richard S Sutton, et al., "Between MDPs and semi-MDPs: A framework for Temporal Abstraction in Reinforcement Learning," Artificial intelligence, 112(1):181-211, Dec. 1, 1998.

L.G. Valiant, "A Theory of the Learnable," Communications of the ACM, 27(11): 1134-1142 Nov. 1984.

Communication and Search Report, issued from the European Patent Office in corresponding Application No. 19220129.1-1001, dated Apr. 20, 2020 (10 pages).

* cited by examiner

NAVIGATING BASED ON SENSED BRAKE LIGHT PATTERNS

CROSS REFERENCES TO RELATED APPLICATIONS

This application is a continuation of PCT/US2018/013375, filed Jan. 11, 2018, which claims the benefit of priority of U.S. Provisional Patent Application No. 62/445,500, filed on Jan. 12, 2017; U.S. Provisional Patent Application No. 62/546,343, filed on Aug. 16, 2017; U.S. Provisional Patent Application No. 62/565,244, filed on Sep. 29, 2017; and U.S. Provisional Patent Application No. 62/582,687, filed on Nov. 7, 2017. The foregoing applications are incorporated herein by reference in their entirety.

BACKGROUND

Technical Field

The present disclosure relates generally to autonomous vehicle navigation. Additionally, this disclosure relates to systems and methods for navigating using reinforcement learning techniques.

Background Information

As technology continues to advance, the goal of a fully autonomous vehicle that is capable of navigating on roadways is on the horizon. Autonomous vehicles may need to take into account a variety of factors and make appropriate decisions based on those factors to safely and accurately reach an intended destination. For example, an autonomous vehicle may need to process and interpret visual information (e.g., information captured from a camera), information from radar or lidar, and may also use information obtained from other sources (e.g., from a GPS device, a speed sensor, an accelerometer, a suspension sensor, etc.). At the same time, in order to navigate to a destination, an autonomous vehicle may also need to identify its location within a particular roadway (e.g., a specific lane within a multi-lane road), navigate alongside other vehicles, avoid obstacles and pedestrians, observe traffic signals and signs, travel from one road to another road at appropriate intersections or interchanges, and respond to any other situation that occurs or develops during the vehicle's operation.

Moreover, autonomous vehicles need to account for other vehicles on the road, for example, during merging and/or by negotiating with other drivers on the road. Autonomous vehicles also need to respond to traditional indicators, such as brake lights and characteristics of following vehicles. Finally, it is important that autonomous vehicles do not impede the movement of emergency vehicles.

SUMMARY

Embodiments consistent with the present disclosure provide systems and methods for autonomous vehicle navigation. The disclosed embodiments may use cameras to provide autonomous vehicle navigation features. For example, consistent with the disclosed embodiments, the disclosed systems may include one, two, or more cameras that monitor the environment of a vehicle. The disclosed systems may provide a navigational response based on, for example, an analysis of images captured by one or more of the cameras. The navigational response may also take into account other data including, for example, global positioning system (GPS) data, sensor data (e.g., from an accelerometer, a speed sensor, a suspension sensor, etc.), and/or other map data.

In one embodiment, a navigation system for a host vehicle may comprise at least one processing device. The at least one processing device may be programmed to receive, from a camera, a plurality of images representative of an environment of the host vehicle; and analyze the plurality of images to identify a first flow of traffic and a second flow of traffic. The second flow of traffic may include the host vehicle. The at least one processing device may be further programmed to determine a presence in the environment of the vehicle of at least one navigational state characteristic indicative of an alternating merging of the first flow of traffic and the second flow of traffic into a merged lane; cause at least a first navigational change in the host vehicle to allow one target vehicle from the first flow of traffic to proceed ahead of the host vehicle; and cause at least a second navigational change in the host vehicle to cause the host vehicle to follow the target vehicle into the merged lane ahead of a second target vehicle from the first flow of traffic.

In one embodiment, a computer-implemented method for navigating a host vehicle may comprise receiving, from a camera, a plurality of images representative of an environment of the host vehicle; and analyzing the plurality of images to identify a first flow of traffic and a second flow of traffic. The second flow of traffic may include the host vehicle. The method may further comprise determining a presence in the environment of the vehicle of at least one navigational state characteristic indicative of an alternating merging of the first flow of traffic and the second flow of traffic into a merged lane; causing at least a first navigational change in the host vehicle to allow one target vehicle from the first flow of traffic to proceed ahead of the host vehicle; and causing at least a second navigational change in the host vehicle to cause the host vehicle to follow the target vehicle into the merged lane ahead of a second target vehicle from the first flow of traffic.

In one embodiment, a navigation system for a host vehicle may comprise at least one processing device. The at least one processing device may be programmed to receive, from at least one sensor associated with the host vehicle, an indication of a presence of an emergency vehicle in an environment of the host vehicle; and cause at least one navigational change in the host vehicle in response to the indication of the presence of an emergency vehicle in the environment of the host vehicle.

In one embodiment, a computer-implemented method for navigating a host vehicle may comprise receiving, from at least one sensor associated with the host vehicle, an indication of a presence of an emergency vehicle in an environment of the host vehicle; and causing at least one navigational change in the host vehicle in response to the indication of the presence of an emergency vehicle in the environment of the host vehicle.

In one embodiment, a navigation system for a host vehicle may comprise at least one processing device. The at least one processing device may be programmed to receive, from a camera, a plurality of images representative of an environment of the host vehicle; and analyze the plurality of images to identify at least one target vehicle in the environment of the host vehicle. The target vehicle may have a location that impacts at least one planned navigational action of the host vehicle. The at least one processing device may be further programmed to cause at least one navigational change of the host vehicle to signal to the target vehicle an intent of the host vehicle to make a subsequent navigational maneuver; analyze the plurality of images to detect a change in a navigational state of the target vehicle to the at least one navigational change in the host vehicle; determine a navigational action for the host vehicle based on the detected change in the navigational state of the target vehicle; and cause at least one adjustment of a navigational actuator of the host vehicle in response to the determined navigational action for the host vehicle.

In one embodiment, a navigation system for a host vehicle may comprise at least one processing device. The at least one processing device may be programmed to receive, from a camera, a plurality of images representative of an environment of the host vehicle; and analyze the plurality of images to identify a first target vehicle and a second target vehicle in the environment of the host vehicle. The first target vehicle may be traveling behind the second target vehicle in a travel lane adjoining a travel lane in which the host vehicle is traveling. The at least one processing device may be further programmed to analyze the plurality of images to determine a distance between the first target vehicle and the second target vehicle; and determine, from the plurality of images, a time to reach a boundary associated with one of the first target vehicle and the second target vehicle. The determined time may exceed a first threshold and not exceed a second threshold, the second threshold being greater than the first threshold. The at least one processing device may be further programmed to cause, based on the determined time, at least one navigational change of the host vehicle to signal to the target vehicle an intent of the host vehicle to make a subsequent navigational maneuver; analyze the plurality of images to detect a change in a navigational state of the target vehicle to the at least one navigational change in the host vehicle; determine a navigational action for the host vehicle based on the detected change in the navigational state of the target vehicle; and cause at least one adjustment of a navigational actuator of the host vehicle in response to the determined navigational action for the host vehicle.

In one embodiment, a computer-implemented method for navigating a host vehicle may comprise receiving, from a camera, a plurality of images representative of an environment of the host vehicle; and analyzing the plurality of images to identify at least one target vehicle in the environment of the host vehicle. The target vehicle may have a location that impacts at least one planned navigational action of the host vehicle. The method may further comprise causing at least one navigational change of the host vehicle to signal to the target vehicle an intent of the host vehicle to make a subsequent navigational maneuver; analyzing the plurality of images to detect a change in a navigational state of the target vehicle to the at least one navigational change in the host vehicle; determining a navigational action for the host vehicle based on the detected change in the navigational state of the target vehicle; and causing at least one adjustment of a navigational actuator of the host vehicle in response to the determined navigational action for the host vehicle.

In one embodiment, a computer-implemented method for navigating a host vehicle may comprise receiving, from a camera, a plurality of images representative of an environment of the host vehicle; and analyzing the plurality of images to identify a first target vehicle and a second target vehicle in the environment of the host vehicle. The first target vehicle may be traveling behind the second target vehicle in a travel lane adjoining a travel lane in which the host vehicle is traveling. The method may further comprise analyzing the plurality of images to determine a distance between the first target vehicle and the second target vehicle; and determining, from the plurality of images, a time to reach a boundary associated with one of the first target vehicle and the second target vehicle. The determined time may exceed a first threshold and not exceed a second threshold, the second threshold being greater than the first threshold. The method may further comprise causing, based on the determined time, at least one navigational change of the host vehicle to signal to the target vehicle an intent of the host vehicle to make a subsequent navigational maneuver; analyzing the plurality of images to detect a change in a navigational state of the target vehicle to the at least one navigational change in the host vehicle; determining a navigational action for the host vehicle based on the detected change in the navigational state of the target vehicle; and causing at least one adjustment of a navigational actuator of the host vehicle in response to the determined navigational action for the host vehicle.

In one embodiment, a navigation system for a host vehicle may comprise at least one processing device. The at least one processing device may be programmed to receive, from a rearward-facing camera, a plurality of images representative of an environment behind the host vehicle; analyze the plurality of images to identify at least one target vehicle in the environment behind the host vehicle; identify, based on analysis of the plurality of images, an indicator of at least one navigational characteristic of the target vehicle; and determine a navigational action for the host vehicle based on the identified at least one navigational characteristic of the target vehicle.

In one embodiment, a computer-implemented method for navigating a host vehicle may comprise receiving, from a rearward-facing camera, a plurality of images representative of an environment behind the host vehicle; analyzing the plurality of images to identify at least one target vehicle in the environment behind the host vehicle; identifying, based on analysis of the plurality of images, an indicator of at least one navigational characteristic of the target vehicle; and determining a navigational action for the host vehicle based on the identified at least one navigational characteristic of the target vehicle.

In one embodiment, a navigation system for a host vehicle may comprise at least one processing device. The at least one processing device may be programmed to receive, from a camera, a plurality of images representative of an environment ahead of the host vehicle; analyze the plurality of images to identify at least one target vehicle in the environment ahead of the host vehicle; identify, based on analysis of the plurality of images, at least one brake light associated with the target vehicle; identify, based on analysis of the plurality of images, at least one characteristic associated with changes in an illumination state of the at least one brake light; and cause a navigational change for the host vehicle based on the identified at least one characteristic associated with the changes in the illumination state of the at least one brake light. The at least one characteristic may include a frequency at which the illumination state of the at least one brake light changes, length of time the at least one brake light remains illuminated after activation, a number of times over a predetermined time interval that the at least one brake light is activated, or any combination thereof.

In one embodiment, a computer-implemented method for navigating a host vehicle may comprise receiving, from a camera, a plurality of images representative of an environment ahead of the host vehicle; analyzing the plurality of images to identify at least one target vehicle in the environment ahead of the host vehicle; identifying, based on analysis of the plurality of images, at least one brake light associated with the target vehicle; identifying, based on analysis of the plurality of images, at least one characteristic associated with changes in an illumination state of the at least one brake light; and causing a navigational change for the host vehicle based on the identified at least one characteristic associated with the changes in the illumination state of the at least one brake light. The at least one characteristic may include a frequency at which the illumination state of the at least one brake light changes, length of time the at least one brake light remains illuminated after activation, a number of times over a predetermined time interval that the at least one brake light is activated, or any combination thereof.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
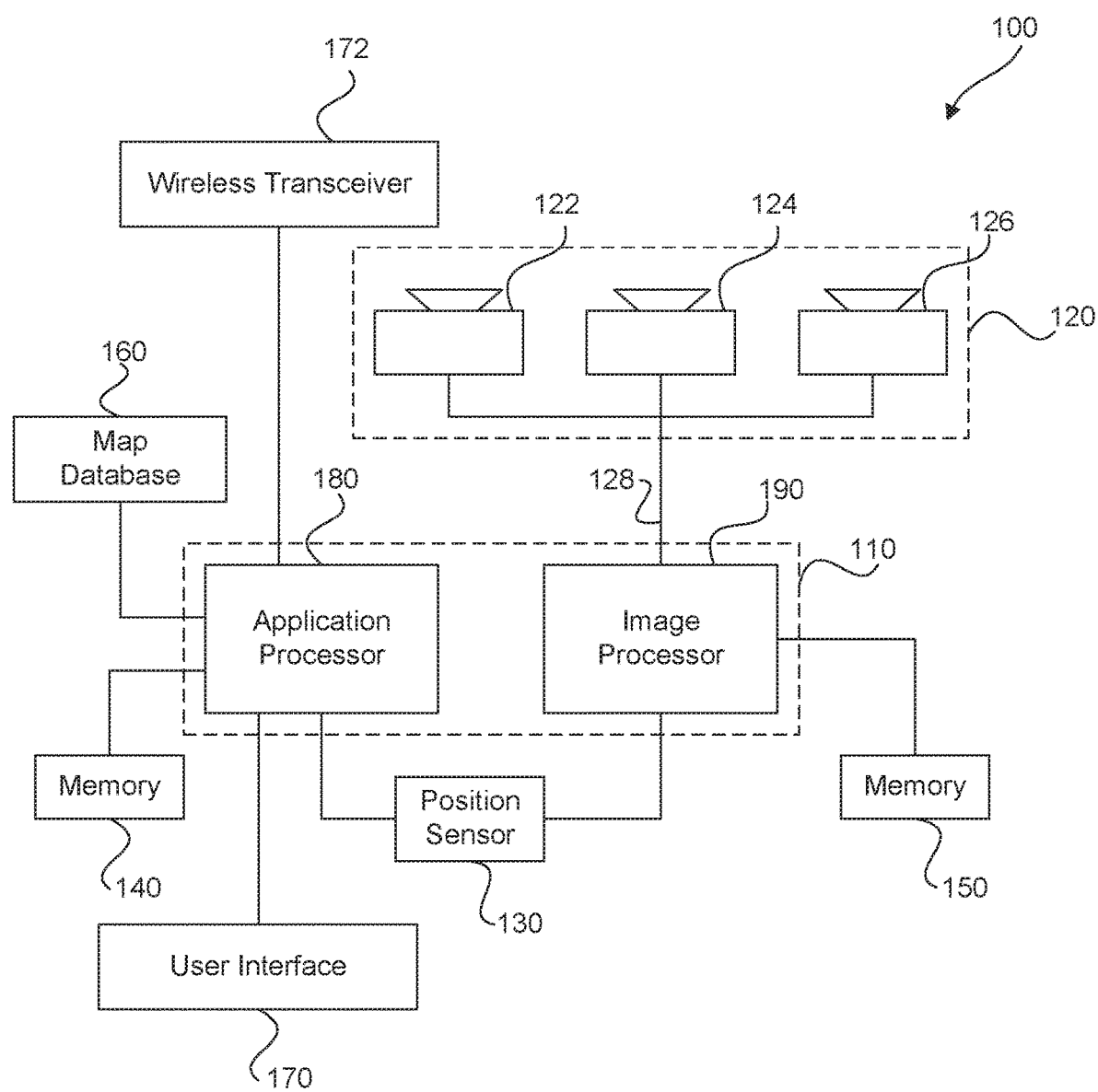
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Autonomous Vehicle Overview

As used throughout this disclosure, the term "autonomous vehicle" refers to a vehicle capable of implementing at least one navigational change without driver input. A "navigational change" refers to a change in one or more of steering, braking, or acceleration/deceleration of the vehicle. To be autonomous, a vehicle need not be fully automatic (e.g., fully operational without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects to the driver (e.g., braking or braking under certain circumstances). In some cases, autonomous vehicles may handle some or all aspects of braking, speed control, and/or steering of the vehicle.

As human drivers typically rely on visual cues and observations in order to control a vehicle, transportation infrastructures are built accordingly, with lane markings, traffic signs, and traffic lights designed to provide visual information to drivers. In view of these design characteristics of transportation infrastructures, an autonomous vehicle may include a camera and a processing unit that analyzes visual information captured from the environment of the vehicle. The visual information may include, for example, images representing components of the transportation infrastructure (e.g., lane markings, traffic signs, traffic lights, etc.) that are observable by drivers and other obstacles (e.g., other vehicles, pedestrians, debris, etc.). Additionally, an autonomous vehicle may also use stored information, such as information that provides a model of the vehicle's environment when navigating. For example, the vehicle may use GPS data, sensor data (e.g., from an accelerometer, a speed sensor, a suspension sensor, etc.), and/or other map data to provide information related to its environment while it is traveling, and the vehicle (as well as other vehicles) may use the information to localize itself on the model. Some vehicles can also be capable of communication among them, sharing information, altering the peer vehicle of hazards or changes in the vehicles' surroundings, etc.

System Overview

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, a user interface 170, and a wireless transceiver 172. Processing unit 110 may include one or more processing devices. In some embodiments, processing unit 110 may include an applications processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras, CCDs, or any other type of image sensor), such as image capture device 122, image capture device 124, and image capture device 126. System 100 may also include a data interface 128 communicatively connecting processing unit 110 to image acquisition unit 120. For example, data interface 128 may include any wired and/or wireless link or links for transmitting image data acquired by image acquisition unit 120 to processing unit 110.

Wireless transceiver 172 may include one or more devices configured to exchange transmissions over an air interface to one or more networks (e.g., cellular, the Internet, etc.) by use of a radio frequency, infrared frequency, magnetic field, or an electric field. Wireless transceiver 172 may use any known standard to transmit and/or receive data (e.g., Wi-Fi, Bluetooth®, Bluetooth Smart, 802.15.4, ZigBee, etc.). Such transmissions can include communications from the host vehicle to one or more remotely located servers. Such transmissions may also include communications (one-way or two-way) between the host vehicle and one or more target vehicles in an environment of the host vehicle (e.g., to facilitate coordination of navigation of the host vehicle in view of or together with target vehicles in the environment of the host vehicle), or even a broadcast transmission to unspecified recipients in a vicinity of the transmitting vehicle.

Both applications processor 180 and image processor 190 may include various types of hardware-based processing devices. For example, either or both of applications processor 180 and image processor 190 may include a microprocessor, preprocessors (such as an image preprocessor), graphics processors, a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, etc. Various processing devices may be used, including, for example, processors available from manufacturers such as Intel®, AMD®, etc. and may include various architectures (e.g., x86 processor, ARM®, etc.).

In some embodiments, applications processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture consists of two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, may be used in the disclosed embodiments. In other examples, the EyeQ4® and/or the EyeQ5® may be used in the disclosed embodiments. Of course, any newer or future EyeQ processing devices may also be used together with the disclosed embodiments.

Any of the processing devices disclosed herein may be configured to perform certain functions. Configuring a processing device, such as any of the described EyeQ processors or other controller or microprocessor, to perform certain functions may include programming of computer executable instructions and making those instructions available to the processing device for execution during operation of the processing device. In some embodiments, configuring a processing device may include programming the processing device directly with architectural instructions. In other embodiments, configuring a processing device may include storing executable instructions on a memory that is accessible to the processing device during operation. For example, the processing device may access the memory to obtain and execute the stored instructions during operation. In either case, the processing device configured to perform the sensing, image analysis, and/or navigational functions disclosed herein represents a specialized hardware-based system in control of multiple hardware based components of a host vehicle.

While FIG. 1 depicts two separate processing devices included in processing unit 110, more or fewer processing devices may be used. For example, in some embodiments, a single processing device may be used to accomplish the tasks of applications processor 180 and image processor 190. In other embodiments, these tasks may be performed by more than two processing devices. Further, in some embodiments, system 100 may include one or more of processing unit 110 without including other components, such as image acquisition unit 120.

Processing unit 110 may comprise various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., applications processor 180 and/or image processor 190), may control operation of various aspects of system 100. These memory units may include various databases and image processing software, as well as a trained system, such as a neural network, or a deep neural network, for example. The memory units may include random access memory, read only memory, flash memory, disk drives, optical storage, tape storage, removable storage and/or any other types of storage. In some embodiments, memory units 140, 150 may be separate from the applications processor 180 and/or image processor 190. In other embodiments, these memory units may be integrated into applications processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to applications processor 180 and/or image processor 190.

In some embodiments, system 100 may include components such as a speed sensor (e.g., a speedometer) for measuring a speed of vehicle 200. System 100 may also include one or more accelerometers (either single axis or multiaxis) for measuring accelerations of vehicle 200 along one or more axes.

The memory units 140, 150 may include a database, or data organized in any other form, that indication a location of known landmarks. Sensory information (such as images, radar signal, depth information from lidar or stereo processing of two or more images) of the environment may be processed together with position information, such as a GPS coordinate, vehicle's ego motion, etc. to determine a current location of the vehicle relative to the known landmarks, and refine the vehicle location. Certain aspects of this technology are included in a localization technology known as REM™, which is being marketed by the assignee of the present application.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, applications processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.). In some cases, map database 160 may store a sparse data model including polynomial representations of certain road features (e.g., lane markings) or target trajectories for the host vehicle. Map database 160 may also include stored representations of various recognized landmarks that may be used to determine or update a known position of the host vehicle with respect to a target trajectory. The landmark representations may include data fields such as landmark type, landmark location, among other potential identifiers.

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 122, 124, and 126 will be further described with reference to FIGS. 2B-2E, below.

One or more cameras (e.g., image capture devices 122, 124, and 126) may be part of a sensing block included on a vehicle. Various other sensors may be included in the sensing block, and any or all of the sensors may be relied upon to develop a sensed navigational state of the vehicle. In addition to cameras (forward, sideward, rearward, etc), other sensors such as RADAR, LIDAR, and acoustic sensors may be included in the sensing block. Additionally, the sensing block may include one or more components configured to communicate and transmit/receive information relating to the environment of the vehicle. For example, such components may include wireless transceivers (RF, etc.) that may receive from a source remotely located with respect to the host vehicle sensor based information or any other type of information relating to the environment of the host vehicle. Such information may include sensor output information, or related information, received from vehicle systems other than the host vehicle. In some embodiments, such information may include information received from a remote computing device, a centralized server, etc. Furthermore, the cameras may take on many different configurations: single camera units, multiple cameras, camera clusters, long FOV, short FOV, wide angle, fisheye, etc.

Figure 2A:
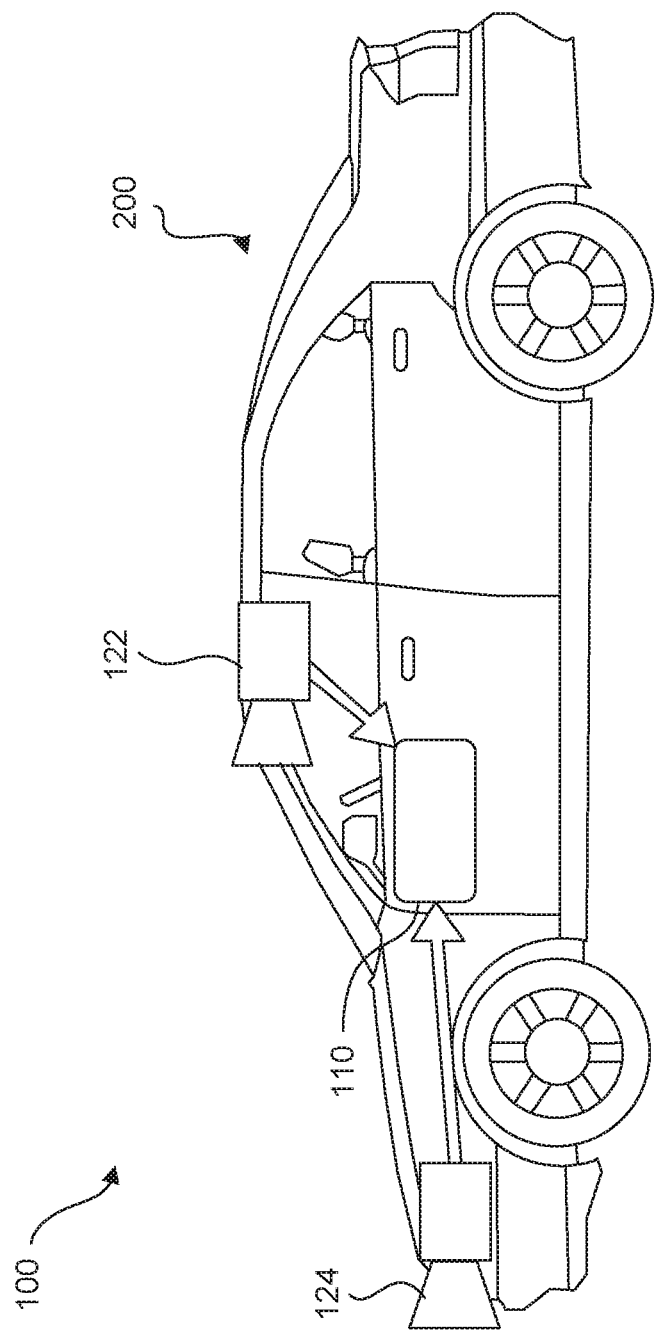
FIG. 2A is a diagrammatic side view representation of an exemplary vehicle including a system consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera), in other embodiments, such as those discussed in connection with FIGS. 2B-2E, multiple image capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver. Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light fixtures on the front and/or back of vehicle 200, etc.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

As discussed earlier, wireless transceiver 172 may and/or receive data over one or more networks (e.g., cellular networks, the Internet, etc.). For example, wireless transceiver 172 may upload data collected by system 100 to one or more servers, and download data from the one or more servers. Via wireless transceiver 172, system 100 may receive, for example, periodic or on demand updates to data stored in map database 160, memory 140, and/or memory 150. Similarly, wireless transceiver 172 may upload any data (e.g., images captured by image acquisition unit 120, data received by position sensor 130 or other sensors, vehicle control systems, etc.) from system 100 and/or any data processed by processing unit 110 to the one or more servers.

System 100 may upload data to a server (e.g., to the cloud) based on a privacy level setting. For example, system 100 may implement privacy level settings to regulate or limit the types of data (including metadata) sent to the server that may uniquely identify a vehicle and or driver/owner of a vehicle. Such settings may be set by user via, for example, wireless transceiver 172, be initialized by factory default settings, or by data received by wireless transceiver 172.

In some embodiments, system 100 may upload data according to a "high" privacy level, and under setting a setting, system 100 may transmit data (e.g., location information related to a route, captured images, etc.) without any details about the specific vehicle and/or driver/owner. For example, when uploading data according to a "high" privacy setting, system 100 may not include a vehicle identification number (VIN) or a name of a driver or owner of the vehicle, and may instead transmit data, such as captured images and/or limited location information related to a route.

Other privacy levels are contemplated as well. For example, system 100 may transmit data to a server according to an "intermediate" privacy level and include additional information not included under a "high" privacy level, such as a make and/or model of a vehicle and/or a vehicle type (e.g., a passenger vehicle, sport utility vehicle, truck, etc.). In some embodiments, system 100 may upload data according to a "low" privacy level. Under a "low" privacy level setting, system 100 may upload data and include information sufficient to uniquely identify a specific vehicle, owner/driver, and/or a portion or entirely of a route traveled by the vehicle. Such "low" privacy level data may include one or more of, for example, a VIN, a driver/owner name, an origination point of a vehicle prior to departure, an intended destination of the vehicle, a make and/or model of the vehicle, a type of the vehicle, etc.

Figure 2B:
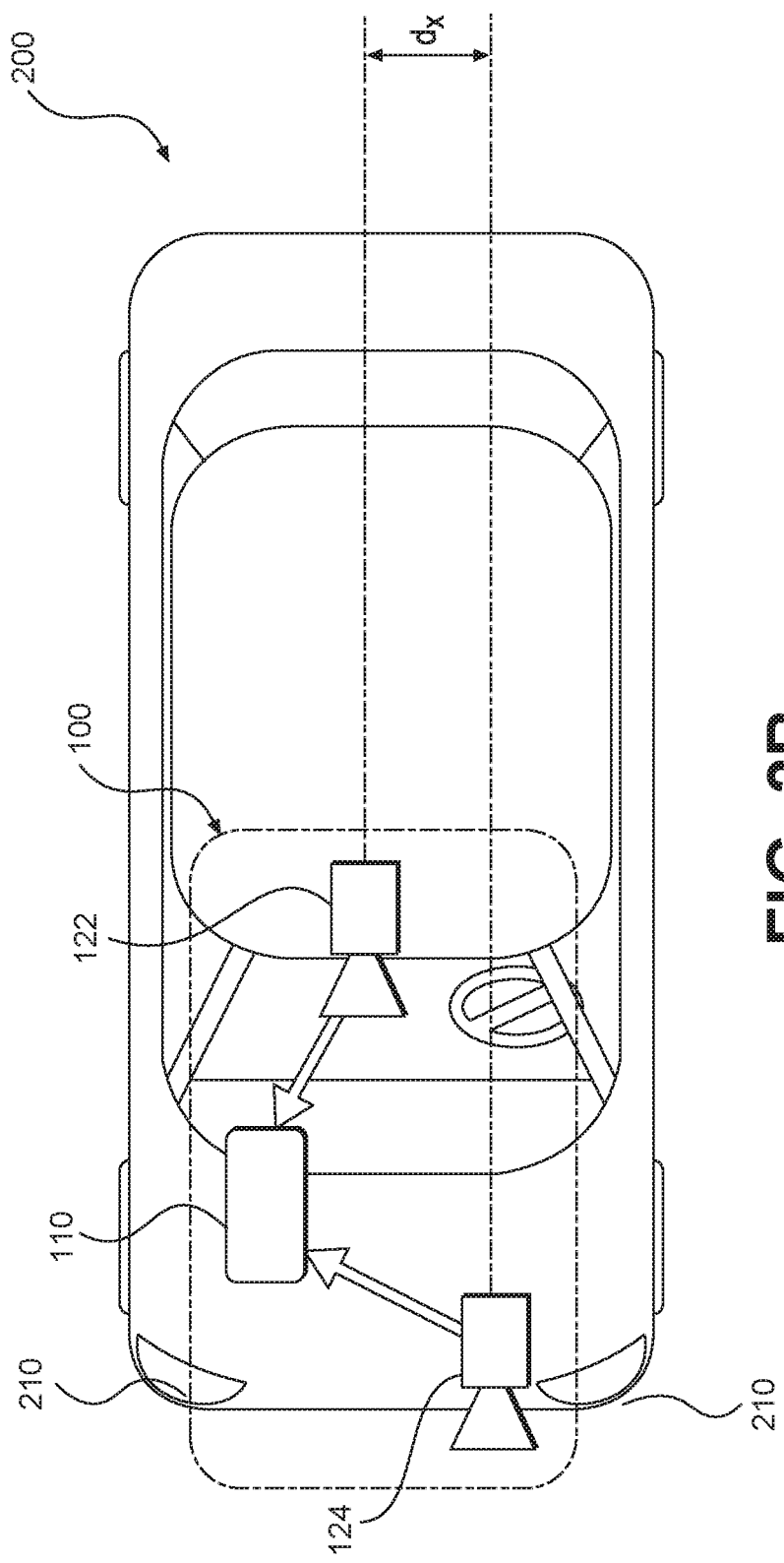
FIG. 2B is a diagrammatic top view representation of the vehicle and system shown in FIG. 2A consistent with the disclosed embodiments.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 2B, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
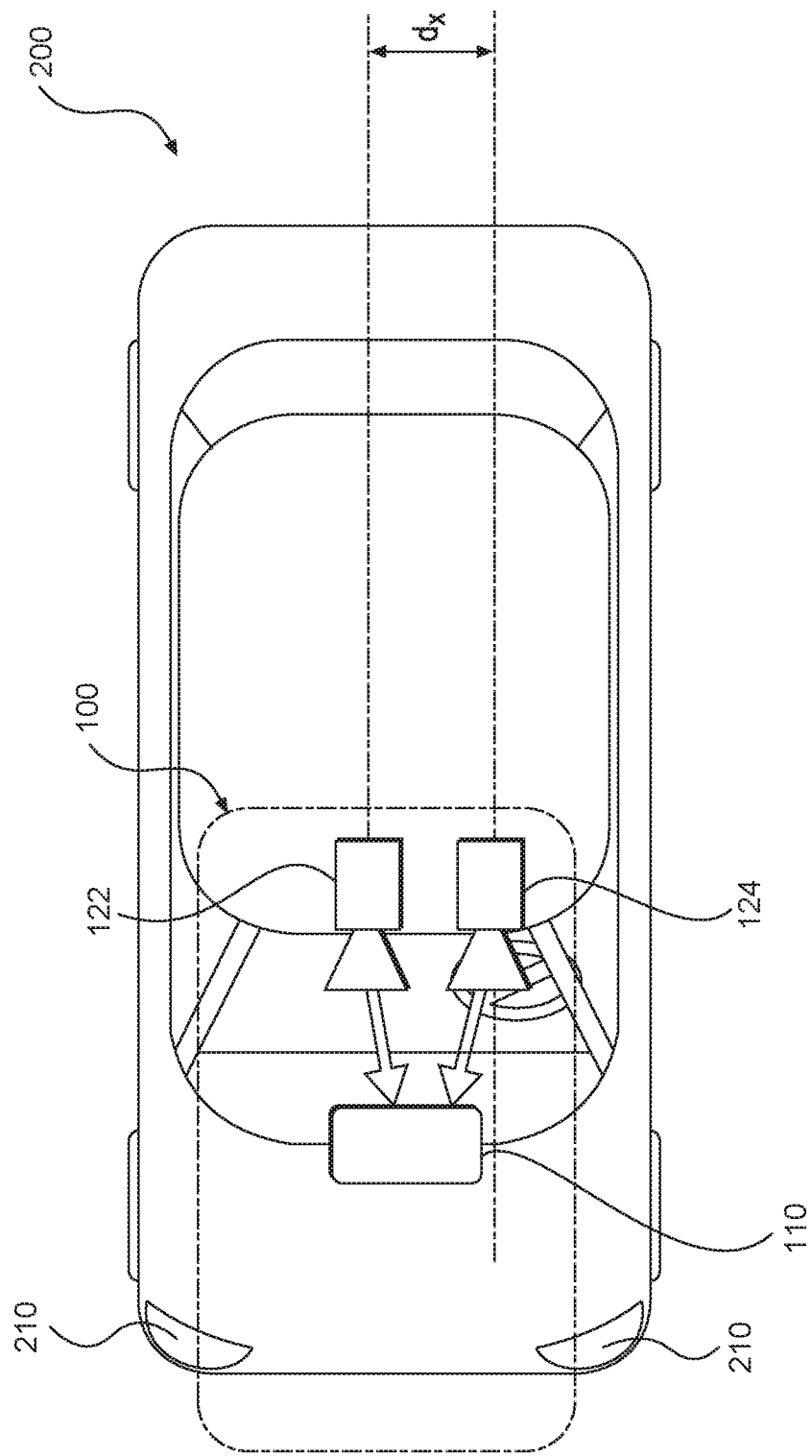
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
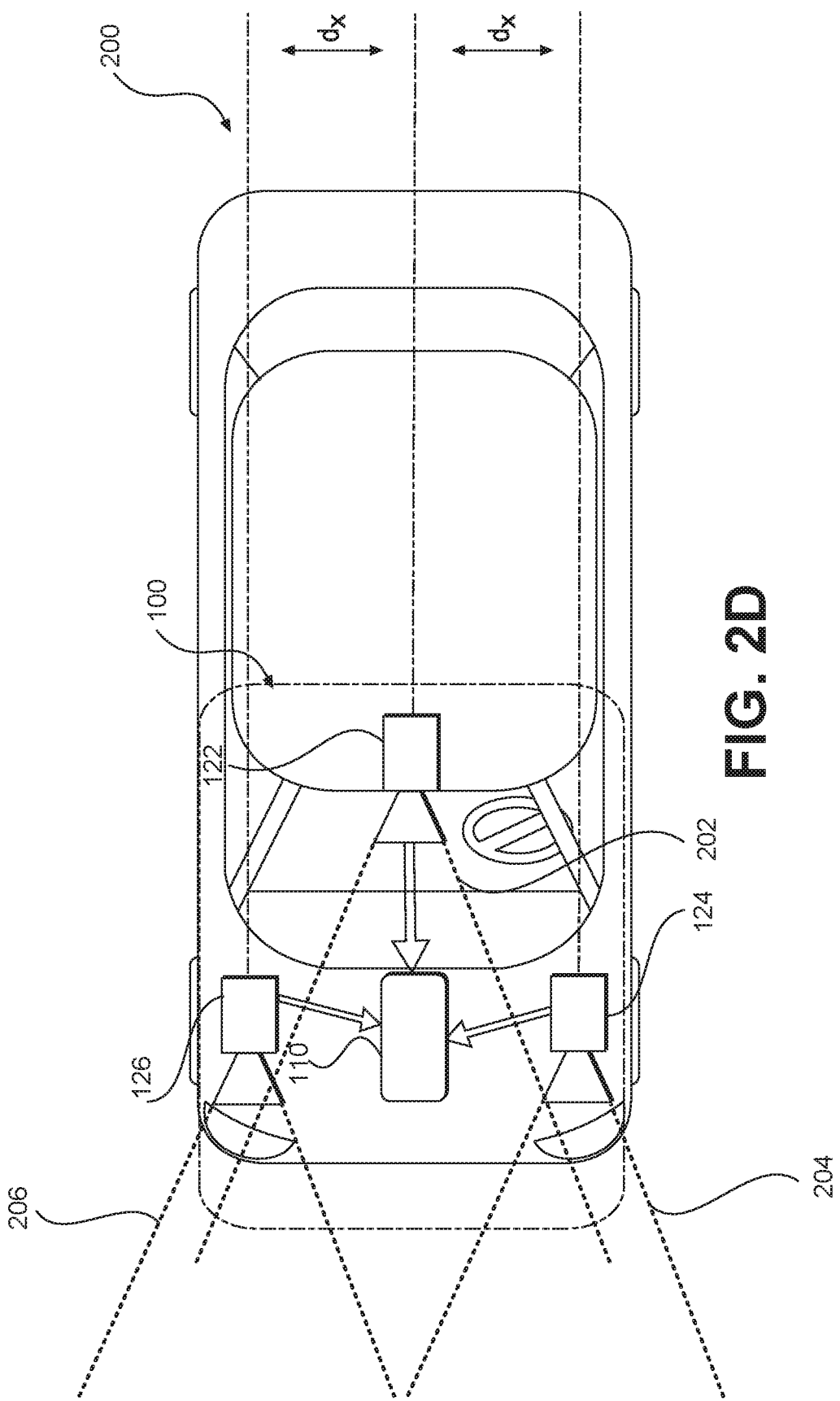
FIG. 2D is a diagrammatic top view representation of yet another embodiment of a vehicle including a system consistent with the disclosed embodiments.
Figure 2E:
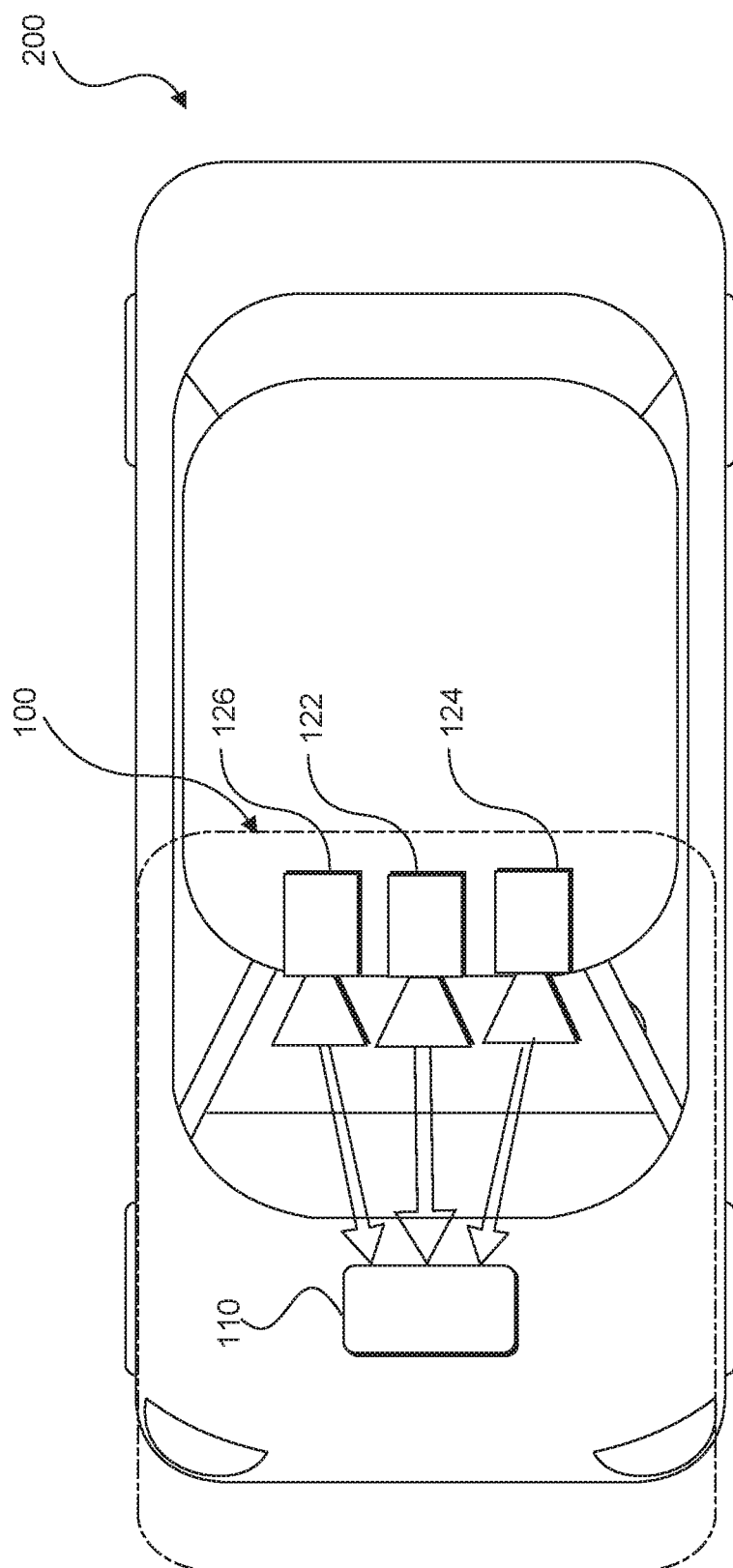
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts. It is also to be understood that disclosed embodiments are not limited to a particular type of vehicle 200 and may be applicable to all types of vehicles including automobiles, trucks, trailers, and other types of vehicles.

The first image capture device 122 may include any suitable type of image capture device. Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter. Image capture device 122 may include various optical elements. In some embodiments one or more lenses may be included, for example, to provide a desired focal length and field of view for the image capture device. In some embodiments, image capture device 122 may be associated with a 6 mm lens or a 12 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree FOV, 50 degree FOV, 52 degree FOV, or greater. Alternatively, image capture device 122 may be configured to have a narrow FOV in the range of 23 to 40 degrees, such as a 28 degree FOV or 36 degree FOV. In addition, image capture device 122 may be configured to have a wide FOV in the range of 100 to 180 degrees. In some embodiments, image capture device 122 may include a wide angle bumper camera or one with up to a 180 degree FOV. In some embodiments, image capture device 122 may be a 7.2M pixel image capture device with an aspect ratio of about 2:1 (e.g., H×V=3800×1900 pixels) with about 100 degree horizontal FOV. Such an image capture device may be used in place of a three image capture device configuration. Due to significant lens distortion, the vertical FOV of such an image capture device may be significantly less than 50 degrees in implementations in which the image capture device uses a radially symmetric lens. For example, such a lens may not be radially symmetric which would allow for a vertical FOV greater than 50 degrees with 100 degree horizontal FOV.

The first image capture device 122 may acquire a plurality of first images relative to a scene associated with vehicle 200. Each of the plurality of first images may be acquired as a series of image scan lines, which may be captured using a rolling shutter. Each scan line may include a plurality of pixels.

The first image capture device 122 may have a scan rate associated with acquisition of each of the first series of image scan lines. The scan rate may refer to a rate at which an image sensor can acquire image data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

In some embodiments, one or more of the image capture devices (e.g., image capture devices 122, 124, and 126) disclosed herein may constitute a high resolution imager and may have a resolution greater than 5M pixel, 7M pixel, 10M pixel, or greater.

The use of a rolling shutter may result in pixels in different rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire FOV (such as FOV 202) at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 124 and the third image capturing device 126 may be any type of image capture device. Like the first image capture device 122, each of image capture devices 124 and 126 may include an optical axis. In one embodiment, each of image capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements. In some embodiments, lenses associated with image capture devices 124 and 126 may provide FOVs (such as FOVs 204 and 206) that are the same as, or narrower than, a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with vehicle 200. Each of the plurality of second and third images may be acquired as a second and third series of image scan lines, which may be captured using a rolling shutter. Each scan line or row may have a plurality of pixels. Image capture devices 124 and 126 may have second and third scan rates associated with acquisition of each of image scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such as FOV 202) associated with image capture device 122 and a FOV (such as FOV 206) associated with image capture device 126.

Image capture devices 122, 124, and 126 may be located on vehicle 200 at any suitable relative heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by $d_x$, as shown in FIGS. 2C and 2D. In some embodiments, fore or aft displacement (e.g., range displacement) may exist between image capture devices 122, 124, and 126. For example, image capture device 122 may be located 0.5 to 2 meters or more behind image capture device 124 and/or image capture device 126. This type of displacement may enable one of the image capture devices to cover potential blind spots of the other image capture device(s).

Image capture devices 122 may have any suitable resolution capability (e.g., number of pixels associated with the image sensor), and the resolution of the image sensor(s) associated with the image capture device 122 may be higher, lower, or the same as the resolution of the image sensor(s) associated with image capture devices 124 and 126. In some embodiments, the image sensor(s) associated with image capture device 122 and/or image capture devices 124 and 126 may have a resolution of 640×480, 1024×768, 1280× 960, or any other suitable resolution.

The frame rate (e.g., the rate at which an image capture device acquires a set of pixel data of one image frame before moving on to capture pixel data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the timing of the frame rate. For example, one or more of image capture devices 122, 124, and 126 may include a selectable pixel delay period imposed before or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line scan rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they may include cameras having different fields of view (FOV) and focal lengths. The fields of view of image capture devices 122, 124, and 126 may include any desired area relative to an environment of vehicle 200, for example. In some embodiments, one or more of image capture devices 122, 124, and 126 may be configured to acquire image data from an environment in front of vehicle 200, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-up objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 m) while the other image capture devices (e.g., image capture devices 124 and 126) can acquire images of more distant objects (e.g., greater than 20 m, 50 m, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees, image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that a field of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent FOVs or may have partial overlap in their FOVs. In some embodiments, the fields of view of image capture devices 122, 124, and 126 may be aligned such that a center of the narrower FOV image capture devices 124 and/or 126 may be located in a lower half of the field of view of the wider FOV device 122.

Figure 2F:
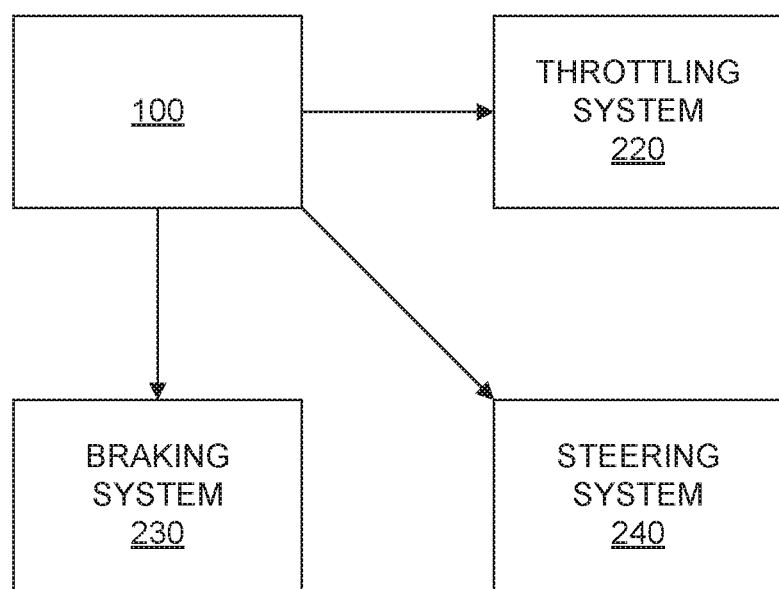
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, and steering system 240. System 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, and steering system 240 to navigate vehicle 200 (e.g., by causing an acceleration, a turn, a lane shift, etc.). Further, system 100 may receive inputs from one or more of throttling system 220, braking system 230, and steering system 24 indicating operating conditions of vehicle 200 (e.g., speed, whether vehicle 200 is braking and/or turning, etc.). Further details are provided in connection with FIGS. 4-7, below.

Figure 3A:
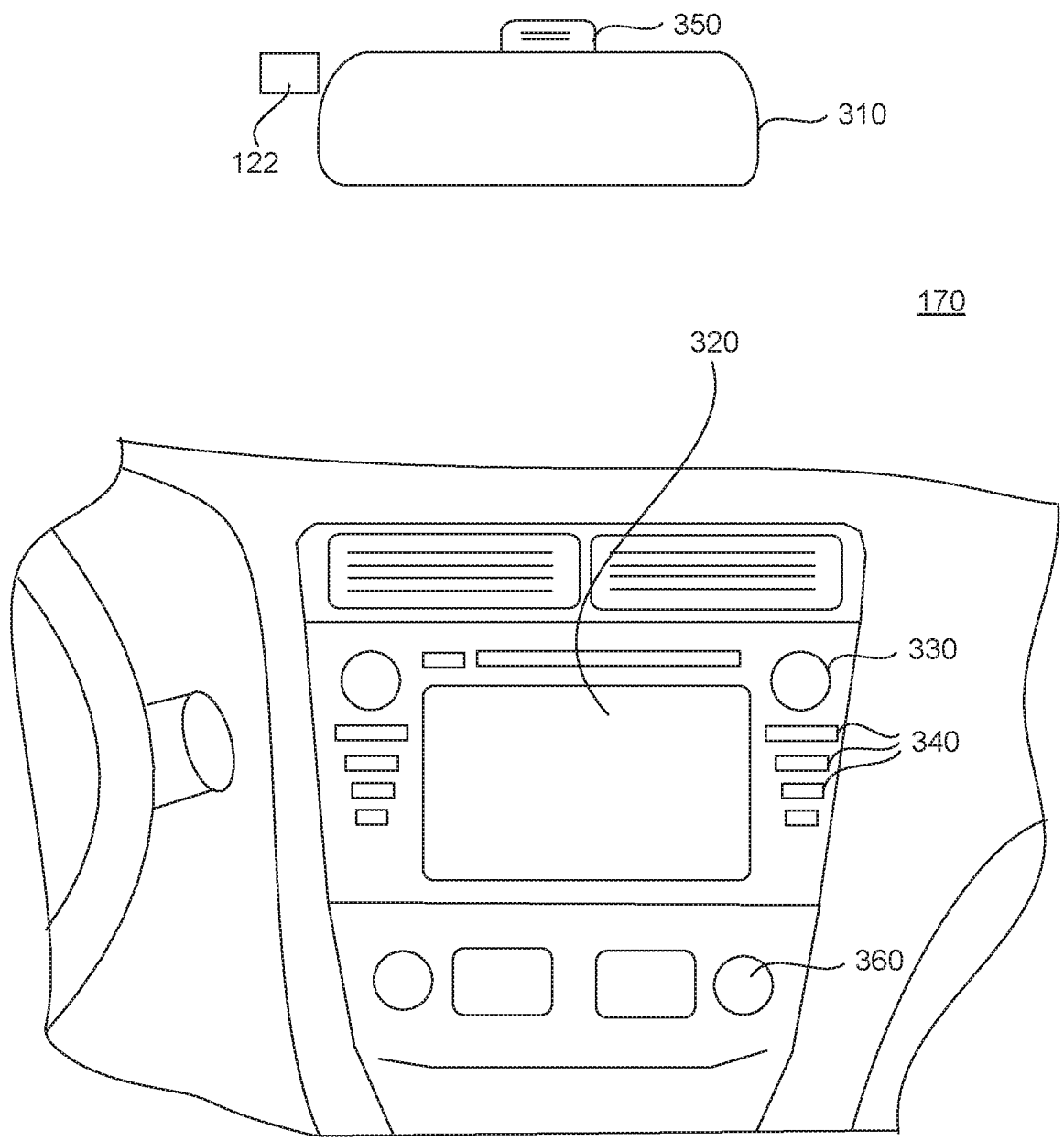
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
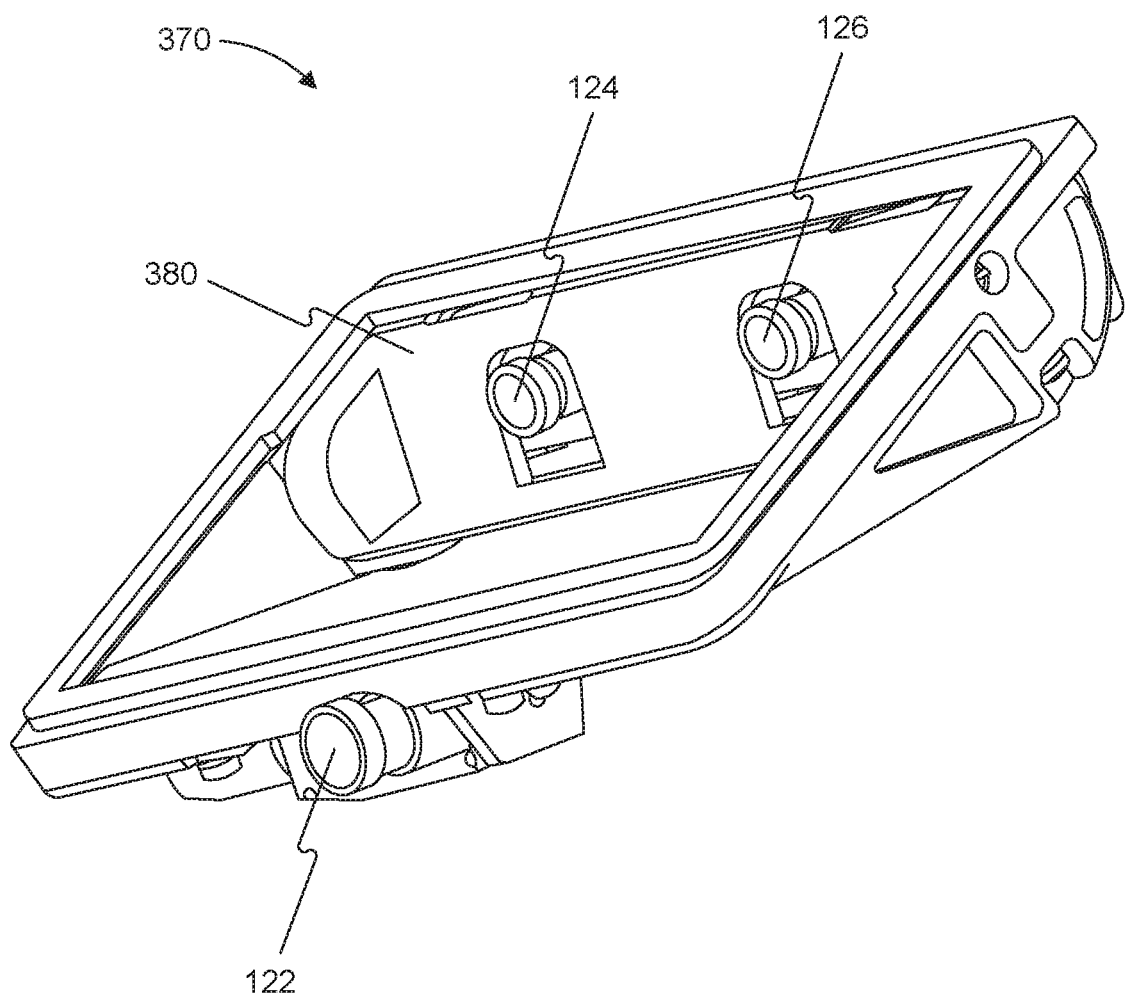
FIG. 3B is an illustration of an example of a camera mount that is configured to be positioned behind a rearview mirror and against a vehicle windshield consistent with the disclosed embodiments.
Figure 3C:
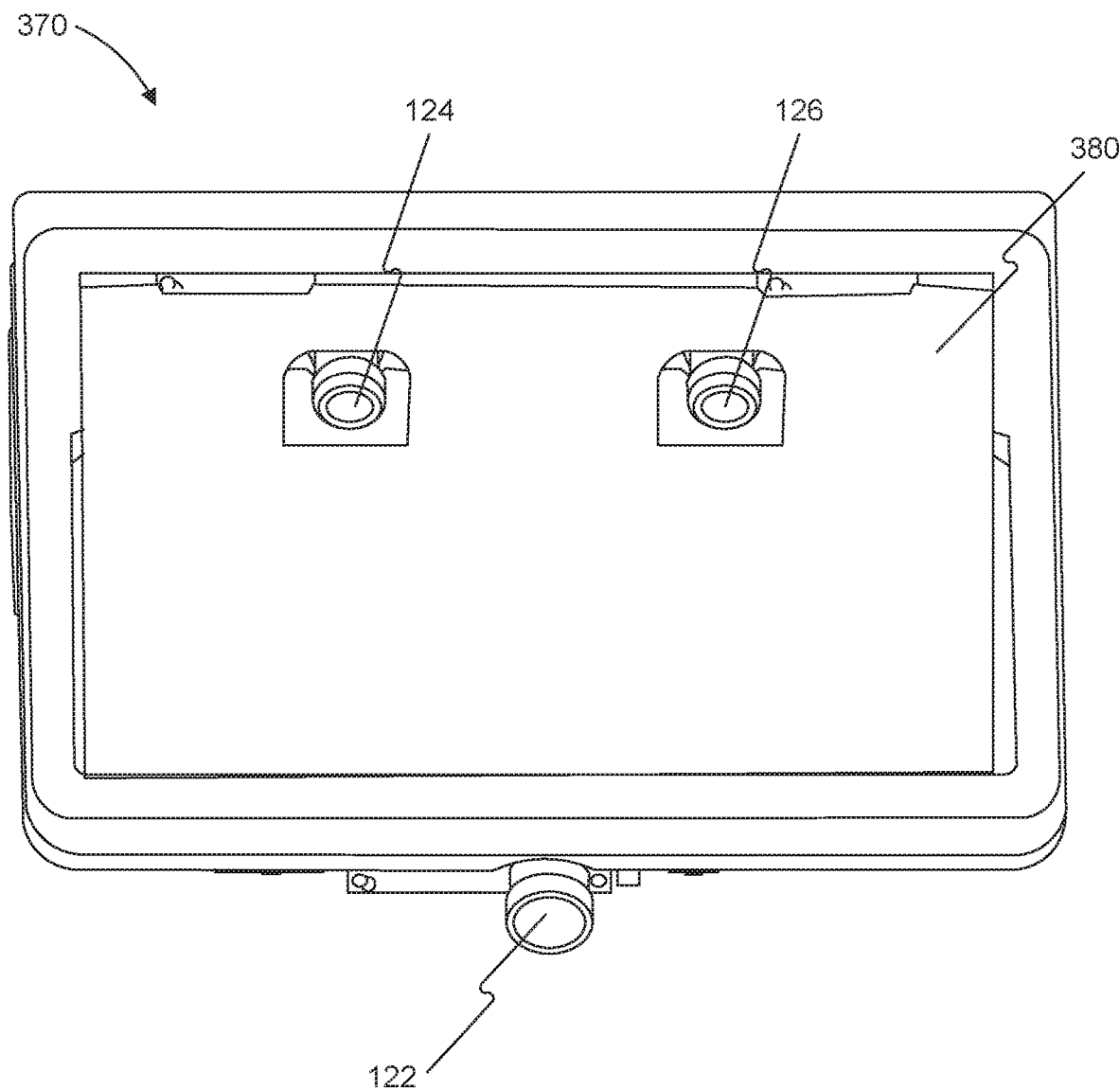
FIG. 3C is an illustration of the camera mount shown in FIG. 3B from a different perspective consistent with the disclosed embodiments.
Figure 3D:
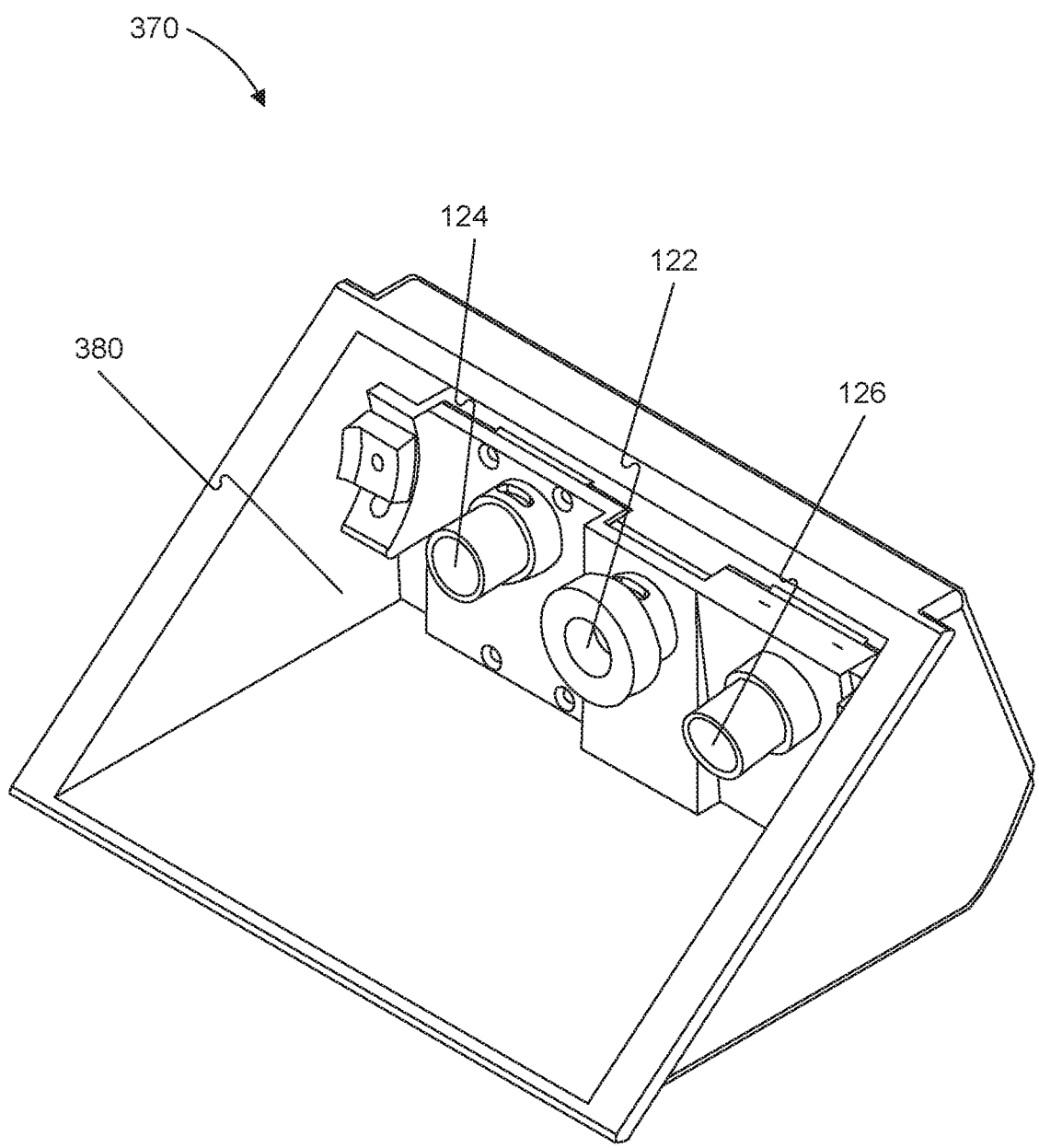
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that it aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 in response to the analysis.

As discussed below in further detail and consistent with various disclosed embodiments, system 100 may provide a variety of features related to autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings and/or alerts to vehicle occupants based on the analysis of the collected data. Additional details regarding the various embodiments that are provided by system 100 are provided below.

Forward-Facing Multi-Imaging System

As discussed above, system 100 may provide drive assist functionality that uses a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). Other camera configurations are consistent with the disclosed embodiments, and the configurations disclosed herein are examples. For example, system 100 may include a configuration of any number of cameras (e.g., one, two, three, four, five, six, seven, eight, etc.) Furthermore, system 100 may include "clusters" of cameras. For example, a cluster of cameras (including any appropriate number of cameras, e.g., one, four, eight, etc.) may be forward-facing relative to a vehicle, or may be facing any other direction (e.g., reward-facing, side-facing, at an angle, etc.) Accordingly, system 100 may include multiple clusters of cameras, with each cluster oriented in a particular direction to capture images from a particular region of a vehicle's environment.

The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122-126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122-126 may be positioned behind rearview mirror 310 and positioned substantially side-by-side (e.g., 6 cm apart). Further, in some embodiments, as discussed above, one or more of image capture devices 122-126 may be mounted behind glare shield 380 that is flush with the windshield of vehicle 200. Such shielding may act to minimize the impact of any reflections from inside the car on image capture devices 122-126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122-126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other road objects. Further, the first processing device may calculate a disparity of pixels between the images from the main camera and the narrow camera and create a 3D reconstruction of the environment of vehicle 200. The first processing device may then combine 3D reconstruction with 3D map data or with 3D information calculated based on information from another camera.

The second processing device may receive images from the main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images.

The third processing device may receive images from the wide FOV camera and process the images to detect vehicles, pedestrians, lane marks, traffic signs, traffic lights, and other road objects. The third processing device may further execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system). Furthermore, in some embodiments, redundancy and validation of received data may be supplemented based on information received from one more sensors (e.g., radar, lidar, acoustic sensors, information received from one or more transceivers outside of a vehicle, etc.).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
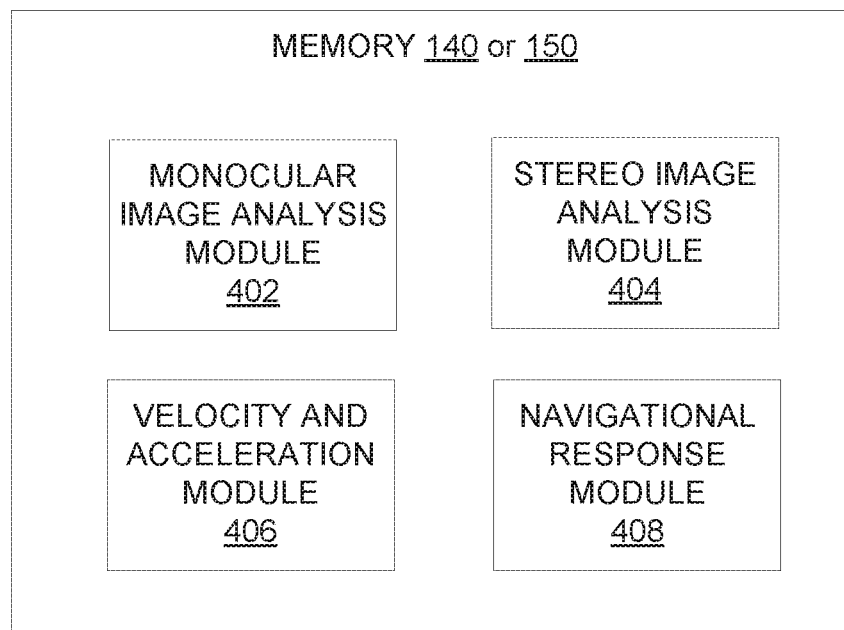
FIG. 4 is an exemplary block diagram of a memory configured to store instructions for performing one or more operations consistent with the disclosed embodiments.

FIG. 4 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any particular configuration of memory 140. Further, applications processor 180 and/or image processor 190 may execute the instructions stored in any of modules 402-408 included in memory 140. One of skill in the art will understand that references in the following discussions to processing unit 110 may refer to applications processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with navigational response module 408.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar, lidar, etc.) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with determining a navigational response.

In one embodiment, stereo image analysis module 404 may store instructions (such as computer vision software) which, when executed by processing unit 110, performs stereo image analysis of first and second sets of images acquired by a combination of image capture devices selected from any of image capture devices 122, 124, and 126. In some embodiments, processing unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408. Furthermore, in some embodiments, stereo image analysis module 404 may implement techniques associated with a trained system (such as a neural network or a deep neural network) or an untrained system.

In one embodiment, velocity and acceleration module 406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or a relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Furthermore, any of the modules (e.g., modules 402, 404, and 406) disclosed herein may implement techniques associated with a trained system (such as a neural network or a deep neural network) or an untrained system.

Figure 5A:
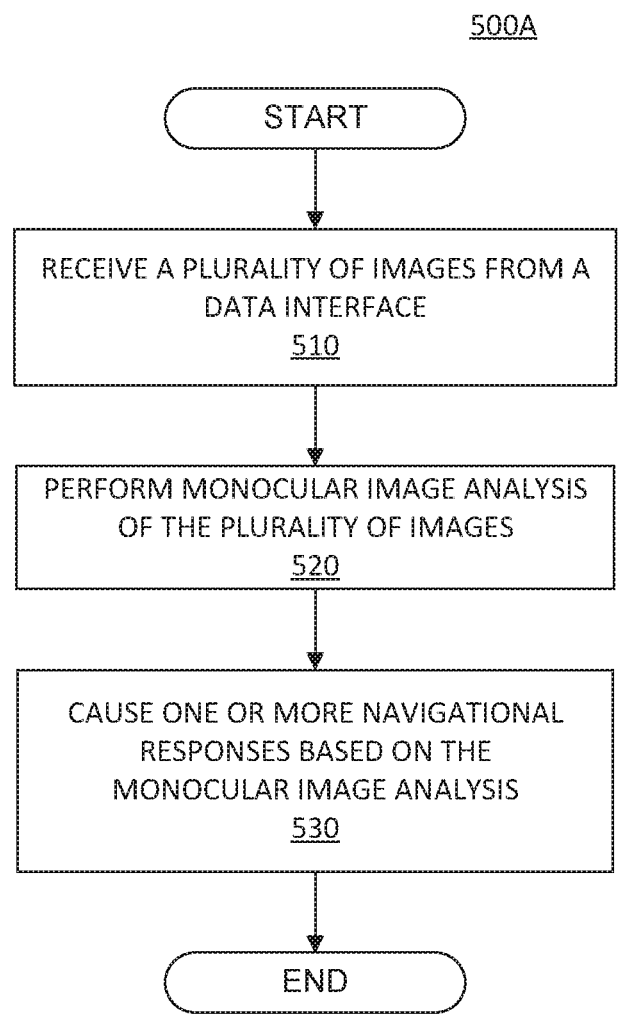
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based on monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality of images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road. Processing unit 110 may then use the 3D-map to detect the road surface, as well as hazards existing above the road surface.

At step 530, processing unit 110 may execute navigational response module 408 to cause one or more navigational responses in vehicle 200 based on the analysis performed at step 520 and the techniques as described above in connection with FIG. 4. Navigational responses may include, for example, a turn, a lane shift, a change in acceleration, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Figure 5B:
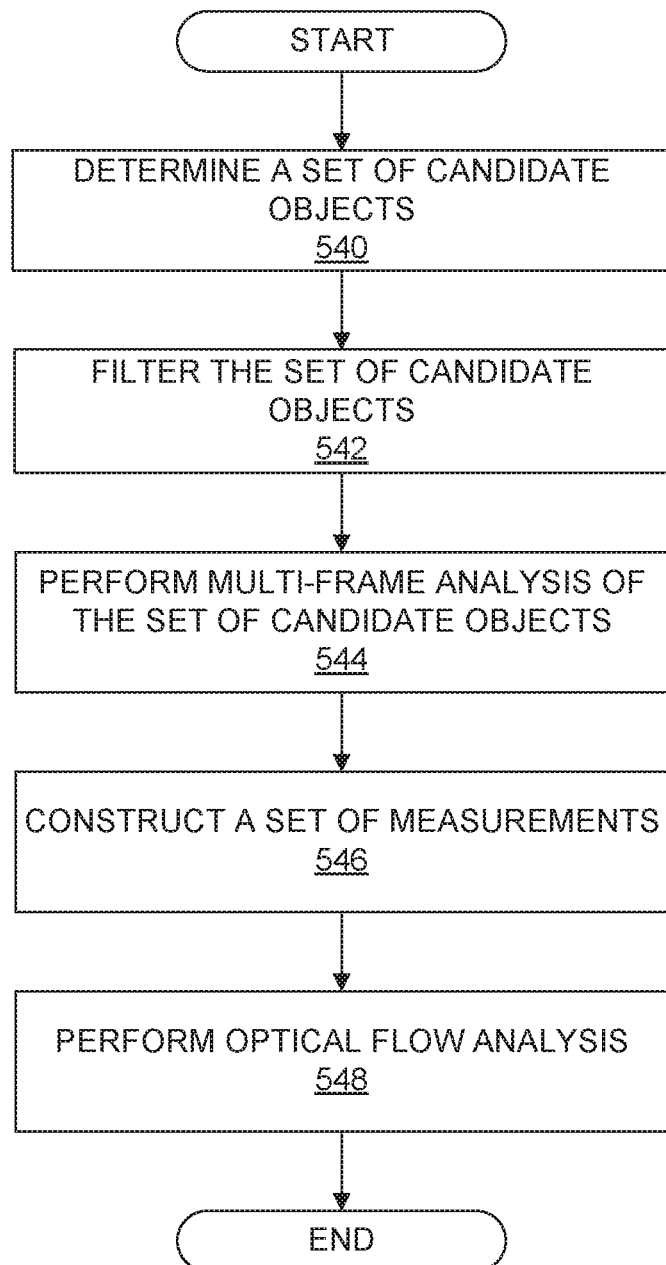
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses." For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (e.g., irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 200, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, position, velocity, and acceleration values (relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object). Thus, by performing steps 540-546, processing unit 110 may identify vehicles and pedestrians appearing within the set of captured images and derive information (e.g., position, speed, size) associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540-546 to provide redundancy for detecting vehicles and pedestrians and increase the reliability of system 100.

Figure 5C:
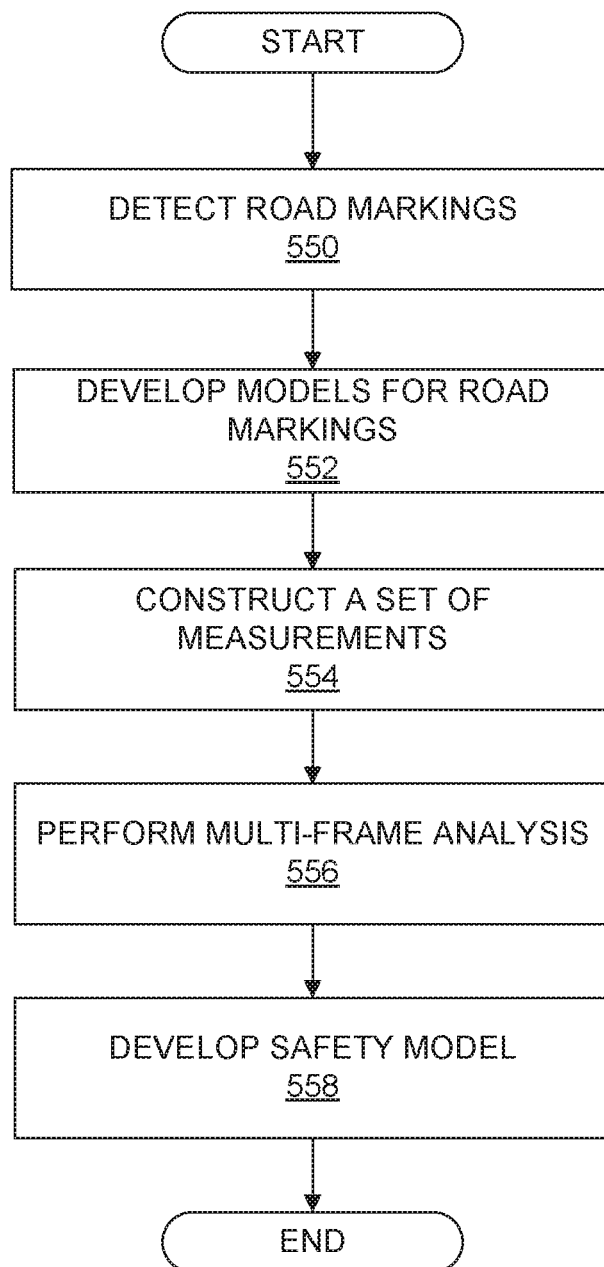
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 110 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in the road surface, as well as pitch and roll rates associated with vehicle 200. In addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating frame-by-frame data associated with detected segments. As processing unit 110 performs multi-frame analysis, the set of measurements constructed at step 554 may become more reliable and associated with an increasingly higher confidence level. Thus, by performing steps 550-556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To develop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
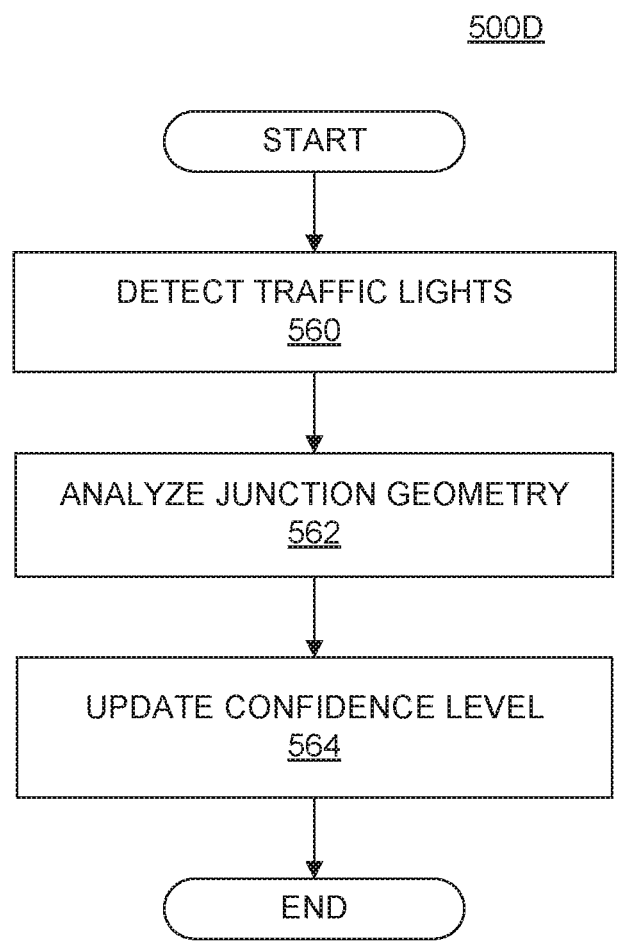
FIG. 5D is a flowchart showing an exemplary process for detecting traffic lights in a set of images consistent with the disclosed embodiments.

FIG. 5D is a flowchart showing an exemplary process 500D for detecting traffic lights in a set of images, consistent with disclosed embodiments. Processing unit 110 may execute monocular image analysis module 402 to implement process 500D. At step 560, processing unit 110 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter out those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, Processing unit 110 may determine a correspondence between the traffic lights detected at step 560 and the lanes appearing near vehicle 200.

As vehicle 200 approaches the junction, at step 564, processing unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By performing steps 560-564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
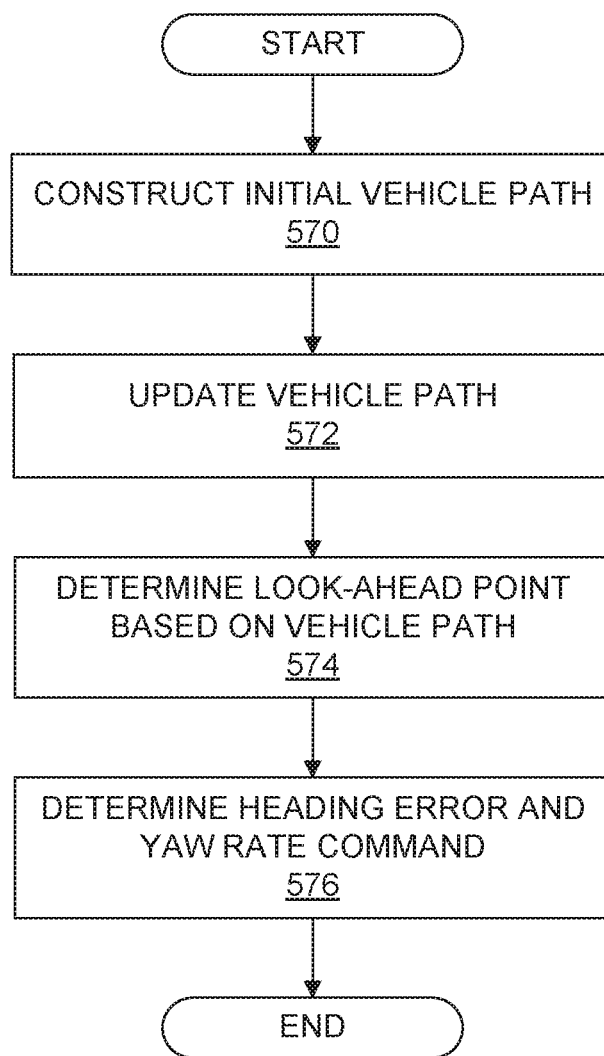
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates (x, z), and the distance $d_i$ between two points in the set of points may fall in the range of 1 to 5 meters. In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points in the vehicle path. In another embodiment, processing unit 110 may use one polynomial and an estimated lane width to offset each point of the vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the distance $d_k$ between two points in the set of points representing the vehicle path is less than the distance $d_i$ described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path).

At step 574, processing unit 110 may determine a look-ahead point (expressed in coordinates as $(x_l, z_l)$) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200, such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

At step 576, processing unit 110 may determine a heading error and yaw rate command based on the look-ahead point determined at step 574. Processing unit 110 may determine the heading error by calculating the arc tangent of the look-ahead point, e.g., arc tan $(x_l/z_l)$. Processing unit 110 may determine the yaw rate command as the product of the heading error and a high-level control gain. The high-level control gain may be equal to: (2/look-ahead time), if the look-ahead distance is not at the lower bound. Otherwise, the high-level control gain may be equal to: (2*speed of vehicle 200/look-ahead distance).

Figure 5F:
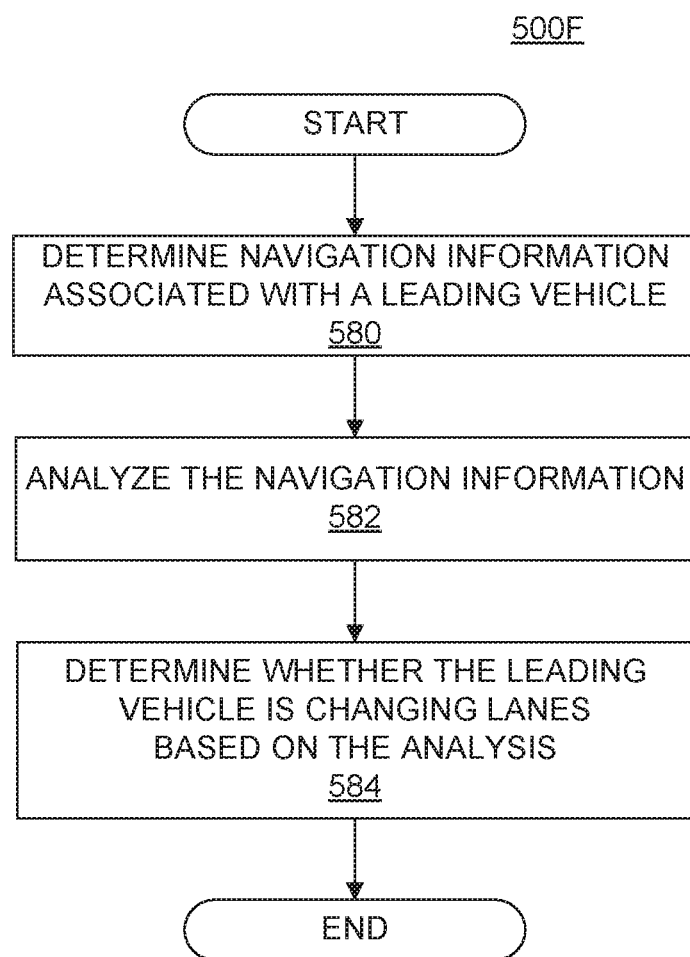
FIG. 5F is a flowchart showing an exemplary process for determining whether a leading vehicle is changing lanes consistent with the disclosed embodiments.

FIG. 5F is a flowchart showing an exemplary process 500F for determining whether a leading vehicle is changing lanes, consistent with the disclosed embodiments. At step 580, processing unit 110 may determine navigation information associated with a leading vehicle (e.g., a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above.

At step 582, processing unit 110 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.6 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles' snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time (e.g., 0.5 to 1.5 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2 + \delta_x^2)/2/(\delta_x)$, where $\delta_x$ represents the lateral distance traveled and $\delta_z$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle obscures a road polynomial (e.g., the leading vehicle is overlaid on top of the road polynomial), then processing unit 110 may determine that the leading vehicle is likely changing lanes. In the case where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights. Furthermore, in some embodiments, the analysis may make use of trained system (e.g., a machine learning or deep learning system), which may, for example, estimate a future path ahead of a current location of a vehicle based on an image captured at the current location.

Figure 6:
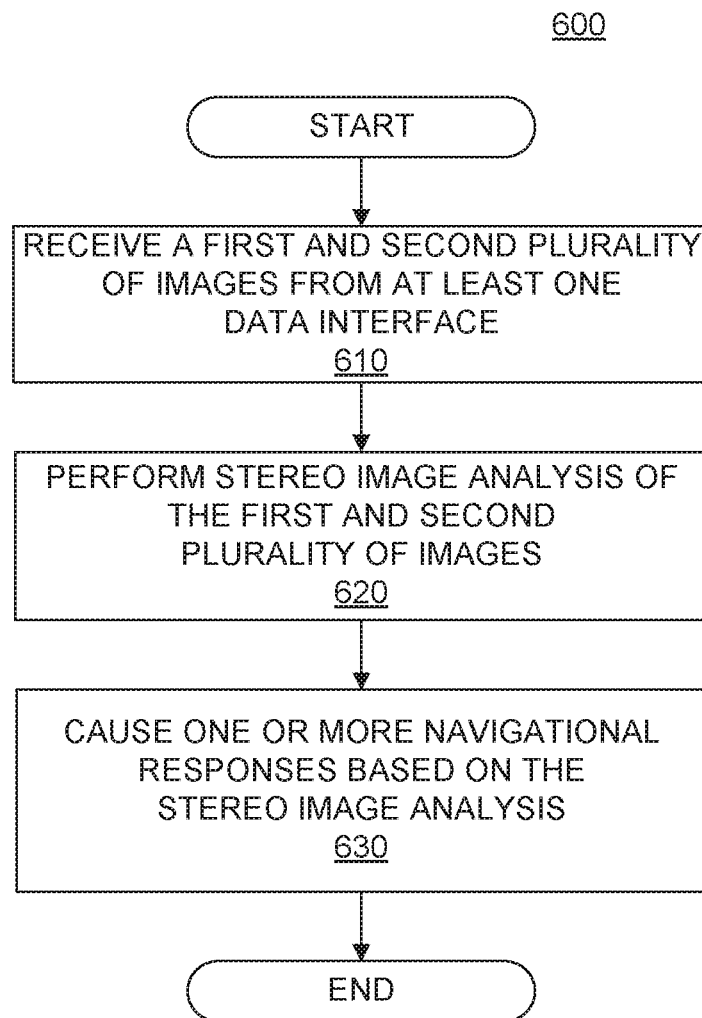
FIG. 6 is a flowchart showing an exemplary process for causing one or more navigational responses based on stereo image analysis consistent with the disclosed embodiments.

FIG. 6 is a flowchart showing an exemplary process 600 for causing one or more navigational responses based on stereo image analysis, consistent with disclosed embodiments. At step 610, processing unit 110 may receive a first and second plurality of images via data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit ramps, traffic lights, road hazards, and the like. Stereo image analysis may be performed in a manner similar to the steps described in connection with FIGS. 5A-5D, above. For example, processing unit 110 may execute stereo image analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may analyze the differences in pixel-level data (or other data subsets from among the two streams of captured images) for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that may exist relative to objects appearing in the two image streams. For example, position, velocity, and/or acceleration relative to vehicle 200 may be determined based on trajectories, positions, movement characteristics, etc. of features associated with an object appearing in one or both of the image streams.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like. In some embodiments, processing unit 110 may use data derived from execution of velocity and acceleration module 406 to cause the one or more navigational responses. Additionally, multiple navigational responses may occur simultaneously, in sequence, or any combination thereof.

Figure 7:
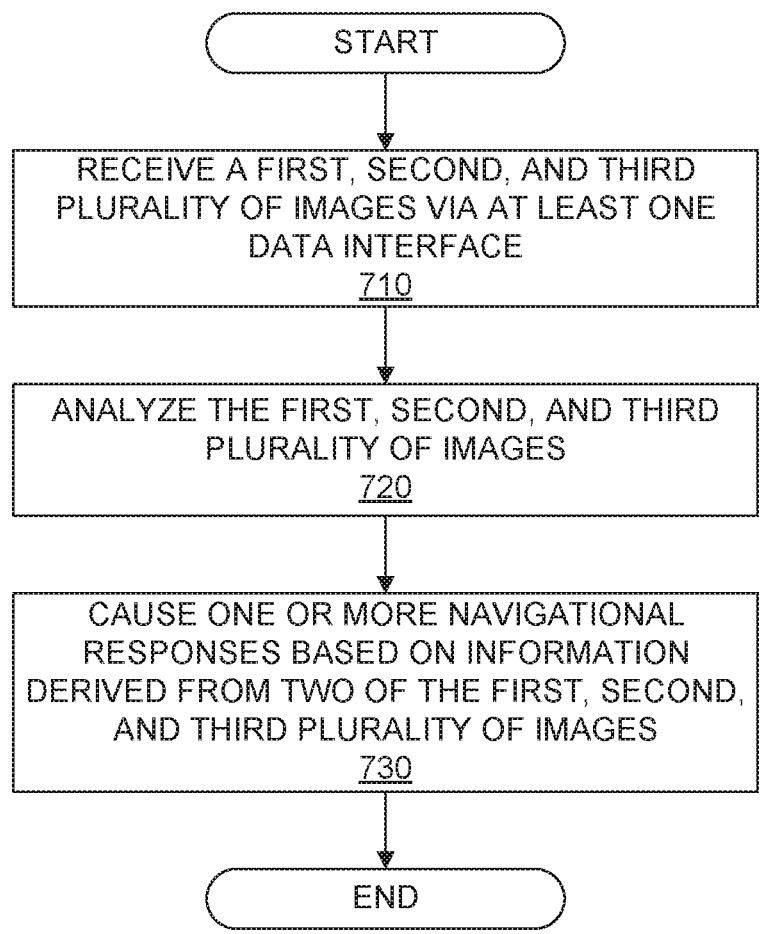
FIG. 7 is a flowchart showing an exemplary process for causing one or more navigational responses based on an analysis of three sets of images consistent with the disclosed embodiments.

FIG. 7 is a flowchart showing an exemplary process 700 for causing one or more navigational responses based on an analysis of three sets of images, consistent with disclosed embodiments. At step 710, processing unit 110 may receive a first, second, and third plurality of images via data interface 128. For instance, cameras included in image acquisition unit 120 (such as image capture devices 122, 124, and 126 having fields of view 202, 204, and 206) may capture a first, second, and third plurality of images of an area forward and/or to the side of vehicle 200 and transmit them over a digital connection (e.g., USB, wireless, Bluetooth, etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D, above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126—including their respective locations and fields of view 202, 204, and 206—may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend on various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments, processing unit 110 may select information derived from two of the first, second, and third plurality of images by determining the extent to which information derived from one image source is consistent with information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Navigational responses may include, for example, a turn, a lane shift, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position, relative velocity, and/or relative acceleration between vehicle 200 and an object detected within any of the first, second, and third plurality of images. Multiple navigational responses may occur simultaneously, in sequence, or any combination thereof.

Reinforcement Learning and Trained Navigational Systems

Figure 8:
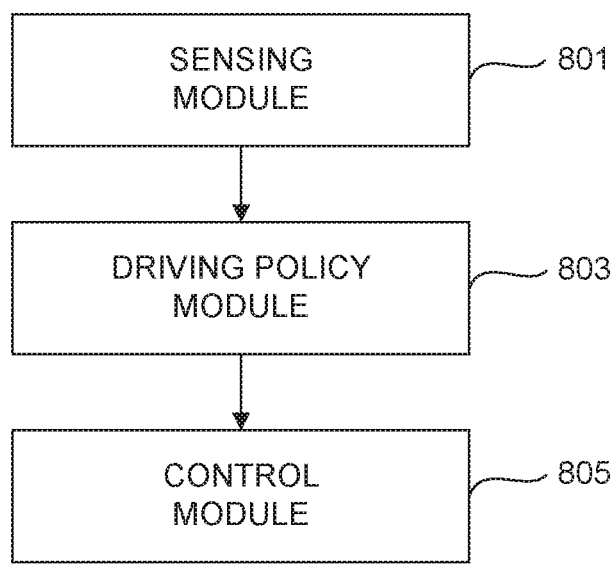
FIG. 8 is a block diagram representation of modules that may be implemented by one or more specifically programmed processing devices of a navigation system for an autonomous vehicle consistent with the disclosed embodiments.

The sections that follow discuss autonomous driving along with systems and methods for accomplishing autonomous control of a vehicle, whether that control is fully autonomous (a self-driving vehicle) or partially autonomous (e.g., one or more driver assist systems or functions). As shown in FIG. 8, the autonomous driving task can be partitioned into three main modules, including a sensing module 801, a driving policy module 803, and a control module 805. In some embodiments, modules 801, 803, and 805 may be stored in memory unit 140 and/or memory unit 150 of system 100, or modules 801, 803, and 805 (or portions thereof) may be stored remotely from system 100 (e.g., stored in a server accessible to system 100 via, for example, wireless transceiver 172). Furthermore, any of the modules (e.g., modules 801, 803, and 805) disclosed herein may implement techniques associated with a trained system (such as a neural network or a deep neural network) or an untrained system.

Sensing module 801, which may be implemented using processing unit 110, may handle various tasks relating to sensing of a navigational state in an environment of a host vehicle. Such tasks may rely upon input from various sensors and sensing systems associated with the host vehicle. These inputs may include images or image streams from one or more onboard cameras, GPS position information, accelerometer outputs, user feedback, or user inputs to one or more user interface devices, radar, lidar, etc. Sensing, which may include data from cameras and/or any other available sensors, along with map information, may be collected, analyzed, and formulated into a "sensed state," describing information extracted from a scene in the environment of the host vehicle. The sensed state may include sensed information relating to target vehicles, lane markings, pedestrians, traffic lights, road geometry, lane shape, obstacles, distances to other objects/vehicles, relative velocities, relative accelerations, among any other potential sensed information. Supervised machine learning may be implemented in order to produce a sensing state output based on sensed data provided to sensing module 801. The output of the sensing module may represent a sensed navigational "state" of the host vehicle, which may be passed to driving policy module 803.

While a sensed state may be developed based on image data received from one or more cameras or image sensors associated with a host vehicle, a sensed state for use in navigation may be developed using any suitable sensor or combination of sensors. In some embodiments, the sensed state may be developed without reliance upon captured image data. In fact, any of the navigational principles described herein may be applicable to sensed states developed based on captured image data as well as sensed states developed using other non-image based sensors. The sensed state may also be determined via sources external to the host vehicle. For example, a sensed state may be developed in full or in part based on information received from sources remote from the host vehicle (e.g., based on sensor information, processed state information, etc. shared from other vehicles, shared from a central server, or from any other source of information relevant to a navigational state of the host vehicle.)

Driving policy module 803, which is discussed in more detail below and which may be implemented using processing unit 110, may implement a desired driving policy in order to decide on one or more navigational actions for the host vehicle to take in response to the sensed navigational state. If there are no other agents (e.g., target vehicles or pedestrians) present in the environment of the host vehicle, the sensed state input to driving policy module 803 may be handled in a relatively straightforward manner. The task becomes more complex when the sensed state requires negotiation with one or more other agents. The technology used to generate the output of driving policy module 803 may include reinforcement learning (discussed in more detail below). The output of driving policy module 803 may include at least one navigational action for the host vehicle and may include a desired acceleration (which may translate to an updated speed for the host vehicle), a desired yaw rate for the host vehicle, a desired trajectory, among other potential desired navigational actions.

Based on the output from the driving policy module 803, control module 805, which may also be implemented using processing unit 110, may develop control instructions for one or more actuators or controlled devices associated with the host vehicle. Such actuators and devices may include an accelerator, one or more steering controls, a brake, a signal transmitter, a display, or any other actuator or device that may be controlled as part of a navigation operation associated with a host vehicle. Aspects of control theory may be used to generate the output of control module 805. Control module 805 may be responsible for developing and outputting instructions to controllable components of the host vehicle in order to implement the desired navigational goals or requirements of driving policy module 803.

Returning to driving policy module 803, in some embodiments, a trained system trained through reinforcement learning may be used to implement driving policy module 803. In other embodiments, driving policy module 803 may be implemented without a machine learning approach, by using specified algorithms to "manually" address the various scenarios that may arise during autonomous navigation. Such an approach, however, while viable, may result in a driving policy that is too simplistic and may lack the flexibility of a trained system based on machine learning. A trained system, for example, may be better equipped to handle complex navigational states and may better determine whether a taxi is parking or is stopping to pick up or drop off a passenger; determine whether a pedestrian intends to cross the street ahead of the host vehicle; balance unexpected behavior of other drivers with defensiveness; negotiate in dense traffic involving target vehicles and/or pedestrians; decide when to suspend certain navigational rules or augment other rules; anticipate unsensed, but anticipated conditions (e.g., whether a pedestrian will emerge from behind a car or obstacle); etc. A trained system based on reinforcement learning may also be better equipped to address a state space that is continuous and high-dimensional along with an action space that is continuous.

Training of the system using reinforcement learning may involve learning a driving policy in order to map from sensed states to navigational actions. A driving policy is a function $\pi: S \rightarrow A$, where S is a set of states and $A \subset \mathbb{R}^2$ is the action space (e.g., desired speed, acceleration, yaw commands, etc.). The state space is $S=S_s \times S_p$, where $S_s$ is the sensing state and $S_p$ is additional information on the state saved by the policy. Working in discrete time intervals, at time t, the current state $s_t \in S$ may be observed, and the policy may be applied to obtain a desired action, $a_t = \pi(s_t)$.

The system may be trained through exposure to various navigational states, having the system apply the policy, providing a reward (based on a reward function designed to reward desirable navigational behavior). Based on the reward feedback, the system may "learn" the policy and becomes trained in producing desirable navigational actions. For example, the learning system may observe the current state $s_t \in S$ and decide on an action $a_t \in A$ based on a policy $\pi: S \rightarrow \mathbb{D}(A)$. Based on the decided action (and implementation of the action), the environment moves to the next state $s_{t+1} \in S$ for observation by the learning system. For each action developed in response to the observed state, the feedback to the learning system is a reward signal $r_1, r_2, \ldots$.

The goal of Reinforcement Learning (RL) is to find a policy $\pi$. It is usually assumed that at time t, there is a reward function $r_t$ which measures the instantaneous quality of being at state $s_t$ and taking action $a_t$. However, taking the action $a_t$ at time t affects the environment and therefore affects the value of the future states. As a result, when deciding on what action to take, not only should the current reward be taken into account, but future rewards should also be considered. In some instances the system should take a certain action, even though it is associated with a reward lower than another available option, when the system determines that in the future a greater reward may be realized if the lower reward option is taken now. To formalize this, observe that a policy, $\pi$, and an initial state, s, induces a distribution over $\mathbb{R}^T$, where the probability of a vector $(r_1, \ldots, r_T)$ is the probability of observing the rewards $r_1, \ldots, r_T$, if the agent starts at state $s_0=s$ and from there on follows the policy $\pi$. The value of the initial state s may be defined as:

$$V^\pi(s) = \mathbb{E}\left[\sum_{t=1}^{T} r_t \,\Big|\, s_0 = s, \forall\, t \geq 1, a_t = \pi(s_t)\right].$$

Instead of restricting the time horizon to T, the future rewards may be discounted to define, for some fixed $\gamma \in (0, 1)$:

$$V^\pi(s) = \mathbb{E}\left[\sum_{t=1}^{\infty} \gamma^t r_t \,\Big|\, s_0 = s, \forall\, t \geq 1, a_t = \pi(s_t)\right].$$

In any case, the optimal policy is the solution of $$\operatorname*{argmax}_{\pi} \mathbb{E}[V^\pi(s)]$$

where the expectation is over the initial state, s.

There are several possible methodologies for training the driving policy system. For example, an imitation approach (e.g., behavior cloning) may be used in which the system learns from state/action pairs where the actions are those that would be chosen by a good agent (e.g., a human) in response to a particular observed state. Suppose a human driver is observed. Through this observation, many examples of the form $(s_t, a_t)$, where $s_t$ is the state and $a_t$ is the action of the human driver could be obtained, observed, and used as a basis for training the driving policy system. For example, supervised learning can be used to learn a policy $\pi$ such that $\pi(s_t) \approx a_t$. There are many potential advantages of this approach. First, there is no requirement to define a reward function. Second, the learning is supervised and happens offline (there is no need to apply the agent in the learning process). A disadvantage of this method is that different human drivers, and even the same human drivers, are not deterministic in their policy choices. Hence, learning a function for which $\|\pi(s_t)-a_t\|$ is very small is often infeasible. And, even small errors may accumulate over time to yield large errors.

Another technique that may be employed is policy based learning. Here, the policy may be expressed in parametric form and directly optimized using a suitable optimization technique (e.g., stochastic gradient descent). The approach is to directly solve the problem given in $$\operatorname*{argmax}_{\pi} \mathbb{E}[V^\pi(s)].$$

There are of course many ways to solve the problem. One advantage of this approach is that it tackles the problem directly, and therefore often leads to good practical results. One potential disadvantage is that it often requires an "on-policy" training, namely, the learning of π is an iterative process, where at iteration j we have a non-perfect policy, $\pi_j$, and to construct the next policy $\pi_j$, we must interact with the environment while acting based on $\pi_j$.

The system may also be trained through value based learning (learning Q or V functions). Suppose a good approximation can be learned to the optimal value function V*. An optimal policy may be constructed (e.g., by relying on the Bellman equation). Some versions of value based learning can be implemented offline (called "off-policy" training). Some disadvantages of the value-based approach may result from its strong dependence on Markovian assumptions and required approximation of a complicated function (it may be more difficult to approximate the value function than to approximate the policy directly).

Another technique may include model based learning and planning (learning the probability of state transitions and solving the optimization problem of finding the optimal V). Combinations of these techniques may also be used to train the learning system. In this approach, the dynamics of the process may be learned, namely, the function that takes ($s_t$, $a_t$) and yields a distribution over the next state $s_{t+1}$. Once this function is learned, the optimization problem may be solved to find the policy π whose value is optimal. This is called "planning". One advantage of this approach may be that the learning part is supervised and can be applied offline by observing triplets ($s_t$, $a_t$, $s_{t+1}$). One disadvantage of this approach, similar to the "imitation" approach, may be that small errors in the learning process can accumulate and to yield inadequately performing policies.

Another approach for training driving policy module 803 may include decomposing the driving policy function into semantically meaningful components. This allows implementation of parts of the policy manually, which may ensure the safety of the policy, and implementation of other parts of the policy using reinforcement learning techniques, which may enable adaptivity to many scenarios, a human-like balance between defensive/aggressive behavior, and a human-like negotiation with other drivers. From the technical perspective, a reinforcement learning approach may combine several methodologies and offer a tractable training procedure, where most of the training can be performed using either recorded data or a self-constructed simulator.

In some embodiments, training of driving policy module 803 may rely upon an "options" mechanism. To illustrate, consider a simple scenario of a driving policy for a two-lane highway. In a direct RL approach, a policy π that maps the state into A ⊂ $\mathbb{R}^2$, where the first component of π(s) is the desired acceleration command and the second component of π(s) is the yaw rate. In a modified approach, the following policies can be constructed:

Automatic Cruise Control (ACC) policy, $o_{ACC}$:S→A: this policy always outputs a yaw rate of 0 and only changes the speed so as to implement smooth and accident-free driving.

ACC+Left policy, $o_L$: S→A: the longitudinal command of this policy is the same as the ACC command. The yaw rate is a straightforward implementation of centering the vehicle toward the middle of the left lane, while ensuring a safe lateral movement (e.g., don't move left if there's a car on the left side).

ACC+Right policy, $o_R$: S→A: Same as $o_L$, but the vehicle may be centered toward the middle of the right lane.

These policies may be referred to as "options". Relying on these "options", a policy can be learned that selects options, $\pi_o$: S→O, where O is the set of available options. In one case, O={$o_{ACC}$, $o_L$, $o_R$}. The option-selector policy, $\pi_o$, defines an actual policy, π: S→A, by setting, for every s, $\pi(s)=o_{\pi_o(s)}(s)$.

Figure 9:
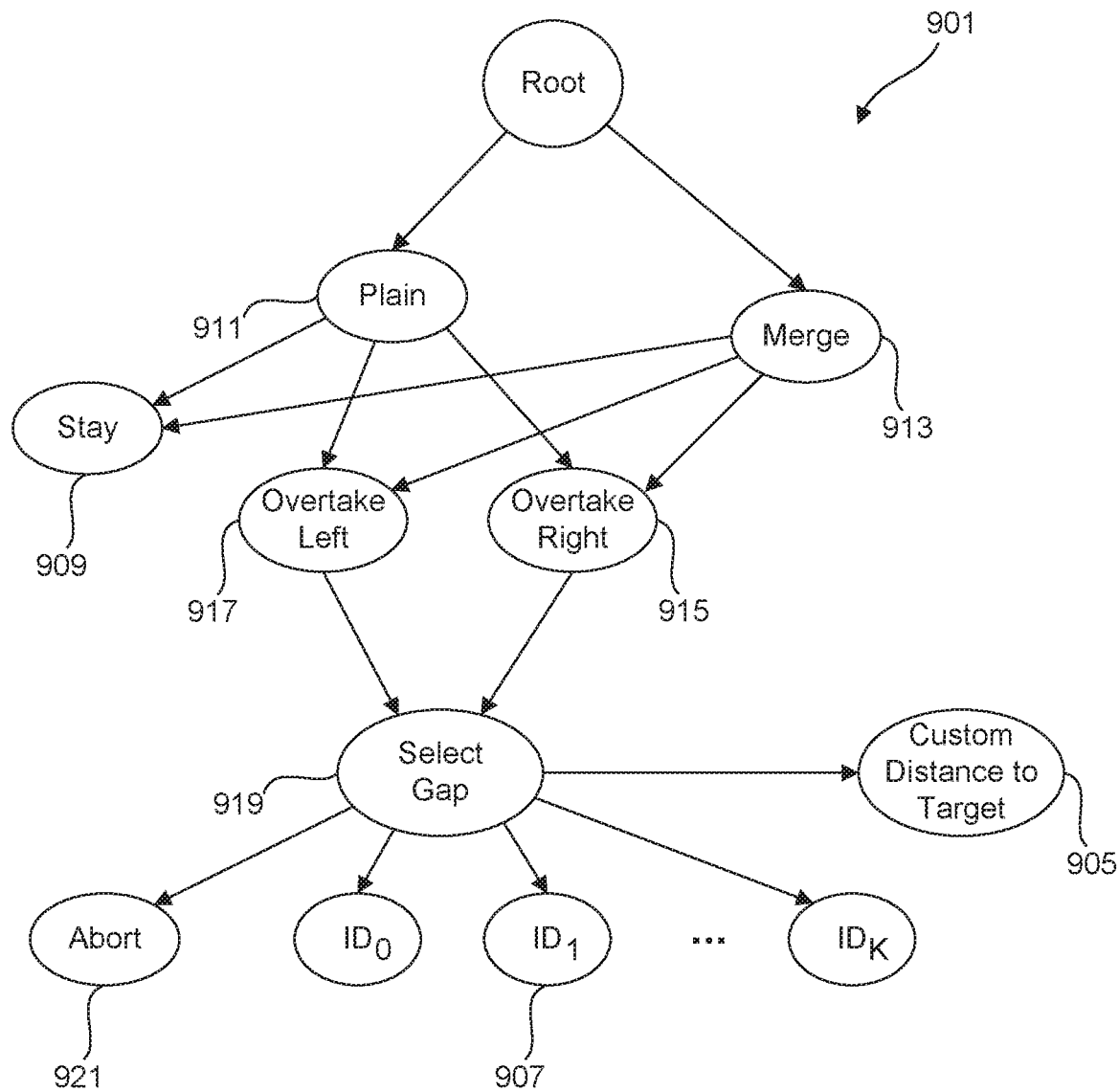
FIG. 9 is a navigation options graph consistent with the disclosed embodiments.
Figure 10:
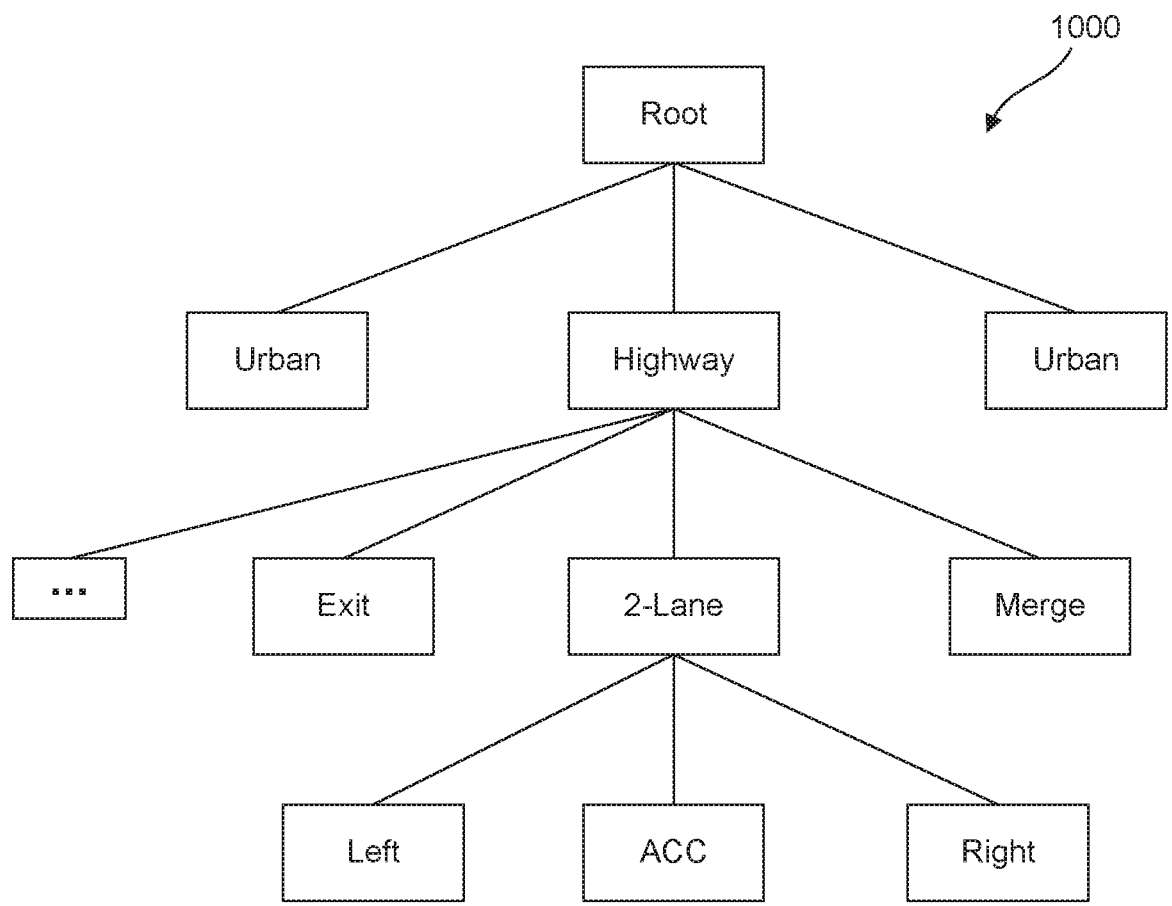
FIG. 10 is a navigation options graph consistent with the disclosed embodiments.

In practice, the policy function may be decomposed into an options graph 901, as shown in FIG. 9. Another example options graph 1000 is shown in FIG. 10. The options graph can represent a hierarchical set of decisions organized as a Directed Acyclic Graph (DAG). There is a special node called the root node 903 of the graph. This node has no incoming nodes. The decision process traverses through the graph, starting from the root node, until it reaches a "leaf" node, which refers to a node that has no outgoing decision lines. As shown in FIG. 9, leaf nodes may include nodes 905, 907, and 909, for example. Upon encountering a leaf node, driving policy module 803 may output the acceleration and steering commands associated with a desired navigational action associated with the leaf node.

Internal nodes, such as nodes 911, 913, and 915, for example, may result in implementation of a policy that chooses a child among its available options. The set of available children of an internal node include all of the nodes associated with a particular internal node via decision lines. For example, internal node 913 designated as "Merge" in FIG. 9 includes three children nodes 909, 915, and 917 ("Stay," "Overtake Right," and "Overtake Left," respectively) each joined to node 913 by a decision line.

Flexibility of the decision making system may be gained by enabling nodes to adjust their position in the hierarchy of the options graph. For example, any of the nodes may be allowed to declare themselves as "critical." Each node may implement a function "is critical," that outputs "True" if the node is in a critical section of its policy implementation. For example, a node that is responsible for a take-over, may declare itself as critical while in the middle of a maneuver. This may impose constraints on the set of available children of a node u, which may include all nodes v which are children of node u and for which there exists a path from v to a leaf node that goes through all nodes designated as critical. Such an approach may allow, on one hand, declaration of the desired path on the graph at each time step, while on the other hand, stability of a policy may be preserved, especially while critical portions of the policy are being implemented.

By defining an options graph, the problem of learning the driving policy π: S→A may be decomposed into a problem of defining a policy for each node of the graph, where the policy at internal nodes should choose from among available children nodes. For some of the nodes, the respective policy may be implemented manually (e.g., through if-then type algorithms specifying a set of actions in response to an observed state) while for others the policies may be implemented using a trained system built through reinforcement learning. The choice between manual or trained/learned approaches may depend on safety aspects associated with the task and on its relative simplicity. The option graphs may be constructed in a manner such that some of the nodes are straightforward to implement, while other nodes may rely on trained models. Such an approach can ensure safe operation of the system.

The following discussion provides further details regarding the role of the options graph of FIG. 9 within driving policy module 803. As discussed above, the input to the driving policy module is a "sensed state," which summarizes the environment map, for example, as obtained from available sensors. The output of driving policy module 803 is a set of desires (optionally, together with a set of hard constraints) that define a trajectory as a solution of an optimization problem.

As described above, the options graph represents a hierarchical set of decisions organized as a DAG. There is a special node called the "root" of the graph. The root node is the only node that has no incoming edges (e.g., decision lines). The decision process traverses the graph, starting from the root node, until it reaches a "leaf" node, namely, a node that has no outgoing edges. Each internal node should implement a policy that picks a child among its available children. Every leaf node should implement a policy that, based on the entire path from the root to the leaf, defines a set of Desires (e.g., a set of navigational goals for the host vehicle). The set of Desires, together with a set of hard constraints that are defined directly based on the sensed state, establish an optimization problem whose solution is the trajectory for the vehicle. The hard constraints may be employed to further increase the safety of the system, and the Desires can be used to provide driving comfort and human-like driving behavior of the system. The trajectory provided as a solution to the optimization problem, in turn, defines the commands that should be provided to the steering, braking, and/or engine actuators in order to accomplish the trajectory.

Returning to FIG. 9, options graph 901 represents an options graph for a two-lane highway, including with merging lanes (meaning that at some points, a third lane is merged into either the right or the left lane of the highway). The root node 903 first decides if the host vehicle is in a plain road scenario or approaching a merge scenario. This is an example of a decision that can be implemented based on the sensing state. Plain road node 911 includes three child nodes: stay node 909, overtake left node 917, and overtake right node 915. Stay refers to a situation in which the host vehicle would like to keep driving in the same lane. The stay node is a leaf node (no outgoing edges/lines). Therefore, it the stay node defines a set of Desires. The first Desire it defines may include the desired lateral position—e.g., as close as possible to the center of the current lane of travel. There may also be a desire to navigate smoothly (e.g., within predefined or allowable acceleration maximums). The stay node may also define how the host vehicle is to react to other vehicles. For example, the stay node may review sensed target vehicles and assign each a semantic meaning, which can be translated into components of the trajectory.

Various semantic meanings may be assigned to target vehicles in an environment of the host vehicle. For example, in some embodiments the semantic meaning may include any of the following designations: 1) not relevant: indicating that the sensed vehicle in the scene is currently not relevant; 2) next lane: indicating that the sensed vehicle is in an adjacent lane and an appropriate offset should be maintained relative to this vehicle (the exact offset may be calculated in the optimization problem that constructs the trajectory given the Desires and hard constraints, and can potentially be vehicle dependent—the stay leaf of the options graph sets the target vehicle's semantic type, which defines the Desire relative to the target vehicle); 3) give way: the host vehicle will attempt to give way to the sensed target vehicle by, for example, reducing speed (especially where the host vehicle determines that the target vehicle is likely to cut into the lane of the host vehicle); 4) take way: the host vehicle will attempt to take the right of way by, for example, increasing speed; 5) follow: the host vehicle desires to maintain smooth driving following after this target vehicle; 6) takeover left/right: this means the host vehicle would like to initiate a lane change to the left or right lane. Overtake left node 917 and overtake right node 915 are internal nodes that do not yet define Desires.

The next node in options graph 901 is the select gap node 919. This node may be responsible for selecting a gap between two target vehicles in a particular target lane that host vehicle desires to enter. By choosing a node of the form IDj, for some value of j, the host vehicle arrives at a leaf that designates a Desire for the trajectory optimization problem—e.g., the host vehicle wishes to make a maneuver so as to arrive at the selected gap. Such a maneuver may involve first accelerating/braking in the current lane and then heading to the target lane at an appropriate time to enter the selected gap. If the select gap node 919 cannot find an appropriate gap, it moves to the abort node 921, which defines a desire to move back to the center of the current lane and cancel the takeover.

Figure 11A:
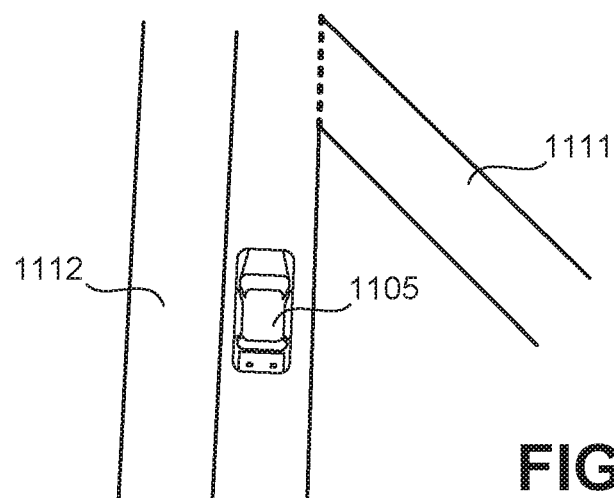
FIGS. 11A, 11B, and 11C provide a schematic representation of navigational options of a host vehicle in a merge zone consistent with the disclosed embodiments.

Returning to merge node 913, when the host vehicle approaches a merge, it has several options that may depend on a particular situation. For example, as shown in FIG. 11A, host vehicle 1105 is traveling along a two-lane road with no other target vehicles detected, either in the primary lanes of the two-lane road or in the merge lane 1111. In this situation, driving policy module 803, upon reaching merge node 913, may select stay node 909. That is, staying within its current lane may be desired where no target vehicles are sensed as merging onto the roadway.

Figure 11B:
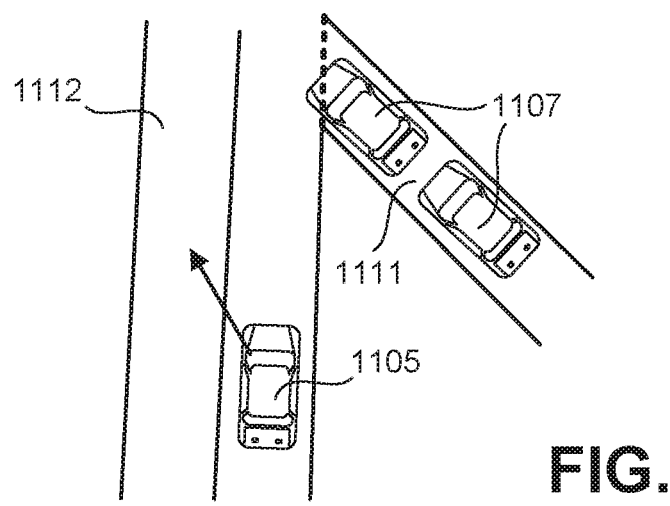

In FIG. 11B, the situation is slightly different. Here, host vehicle 1105 senses one or more target vehicles 1107 entering the main roadway 1112 from merge lane 1111. In this situation, once driving policy module 803 encounters merge node 913, it may choose to initiate an overtake left maneuver in order to avoid the merging situation.

Figure 11C:
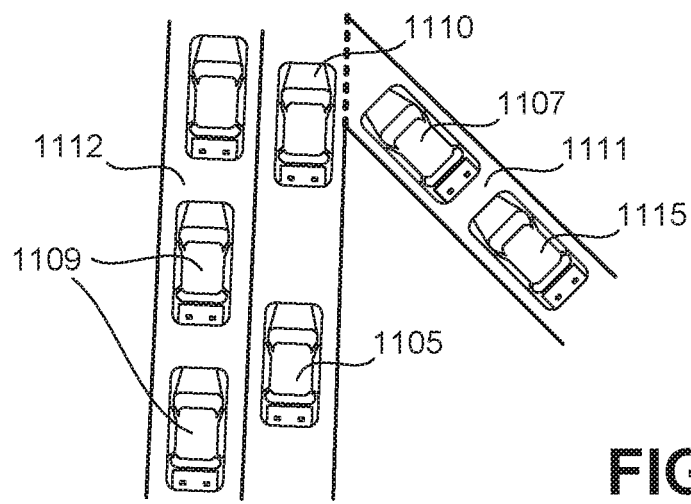

In FIG. 11C, host vehicle 1105 encounters one or more target vehicles 1107 entering main roadway 1112 from merge lane 1111. Host vehicle 1105 also detects target vehicles 1109 traveling in a lane adjacent to the lane of the host vehicle. The host vehicle also detects one or more target vehicles 1110 traveling in the same lane as host vehicle 1105. In this situation, driving policy module 803 may decide to adjust the speed of host vehicle 1105 to give way to target vehicle 1107 and to proceed ahead of target vehicle 1115. This can be accomplished, for example, by progressing to select gap node 919, which, in turn, will select a gap between ID0 (vehicle 1107) and ID1 (vehicle 1115) as the appropriate merging gap. In such a case, the appropriate gap of the merging situation defines the objective for a trajectory planner optimization problem.

As discussed above, nodes of the options graph may declare themselves as "critical," which may ensure that the selected option passes through the critical nodes. Formally, each node may implement a function IsCritical. After performing a forward pass on the options graph, from the root to a leaf, and solving the optimization problem of the trajectory planner, a backward pass may be performed from the leaf back to the root. Along this backward pass, the IsCritical function of all nodes in the pass may be called, and a list of all critical nodes may be saved. In the forward path corresponding to the next time frame, driving policy module 803 may be required to choose a path from the root node to a leaf that goes through all critical nodes.

FIGS. 11A-11C may be used to show a potential benefit of this approach. For example, in a situation where an overtake action is initiated, and driving policy module 803 arrives at the leaf corresponding to IDk, it would be undesirable to choose, for example, the stay node 909 when the host vehicle is in the middle of the takeover maneuver. To avoid such jumpiness, the IDj node can designate itself as critical. During the maneuver, the success of the trajectory planner can be monitored, and function IsCritical will return a "True" value if the overtake maneuver progresses as intended. This approach may ensure that in the next time frame, the takeover maneuver will be continued (rather than jumping to another, potentially inconsistent maneuver prior to completion of the initially selected maneuver). If, on the other hand, monitoring of the maneuver indicates that the selected maneuver is not progressing as intended, or if the maneuver has become unnecessary or impossible, the function IsCritical can return a "False" value. This can allow the select gap node to select a different gap in the next time frame, or to abort the overtake maneuver altogether. This approach may allow, on one hand, declaration of the desired path on the options graph at each time step, while on the other hand, may help to promote stability of the policy while in critical parts of the execution.

Hard constraints, which will be discussed in more detail below, may be differentiated from navigational desires. For example, hard constraints may ensure safe driving by applying an added layer of filtering of a planned navigational action. The implicated hard constraints, which may be programmed and defined manually, rather than through use of a trained system built upon reinforcement learning, can be determined from the sensed state. In some embodiments, however, the trained system may learn the applicable hard constraints to be applied and followed. Such an approach may promote driving policy module 803 arriving at a selected action that is already in compliance with the applicable hard constraints, which may reduce or eliminate selected actions that may require later modification to comply with applicable hard constraints. Nevertheless, as a redundant safety measure, hard constraints may be applied to the output of driving policy module 803 even where driving policy module 803 has been trained to account for predetermined hard constraints.

There are many examples of potential hard constraints. For example, a hard constraint may be defined in conjunction with a guardrail on an edge of a road. In no situation may the host vehicle be allowed to pass the guardrail. Such a rule induces a hard lateral constraint on the trajectory of the host vehicle. Another example of a hard constraint may include a road bump (e.g., a speed control bump), which may induce a hard constraint on the speed of driving before the bump and while traversing the bump. Hard constraints may be considered safety critical and, therefore, may be defined manually rather than relying solely on a trained system learning the constraints during training.

In contrast to hard constraints, the goal of desires may be to enable or achieve comfortable driving. As discussed above, an example of a desire may include a goal of positioning the host vehicle at a lateral position within a lane that corresponds to the center of the host vehicle lane. Another desire may include the ID of a gap to fit into. Note that there is not a requirement for the host vehicle to be exactly in the center of the lane, but instead a desire to be as close as possible to it may ensure that the host vehicle tends to migrate to the center of the lane even in the event of deviations from the center of the lane. Desires may not be safety critical. In some embodiments, desires may require negotiation with other drivers and pedestrians. One approach for constructing the desires may rely on the options graph, and the policy implemented in at least some nodes of the graph may be based on reinforcement learning.

For the nodes of options graph 901 or 1000 implemented as nodes trained based on learning, the training process may include decomposing the problem into a supervised learning phase and a reinforcement learning phase. In the supervised learning phase, a differentiable mapping from $(s_t, a_t)$ to $\hat{s}_{t+1}$ can be learned such that $\hat{s}_{t+1} \approx s_{t+1}$. This may be similar to "model-based" reinforcement learning. However, in the forward loop of the network, $\hat{s}_{t+1}$ may be replaced by the actual value of $s_{t+1}$, therefore eliminating the problem of error accumulation. The role of prediction of $\hat{s}_{t+1}$ is to propagate messages from the future back to past actions. In this sense, the algorithm may be a combination of "model-based" reinforcement learning with "policy-based learning."

An important element that may be provided in some scenarios is a differentiable path from future losses/rewards back to decisions on actions. With the option graph structure, the implementation of options that involve safety constraints are usually not differentiable. To overcome this issue, the choice of a child in a learned policy node may be stochastic. That is, a node may output a probability vector, p, that assigns probabilities used in choosing each of the children of the particular node. Suppose that a node has k children and let $a^{(1)}, \ldots, a^{(k)}$ be the actions of the path from each child to a leaf. The resulting predicted action is therefore $\hat{a}=\Sigma_{i=1}^{k} p_i a^{(i)}$, which may result in a differentiable path from the action to p. In practice, an action a may be chosen to be $a^{(i)}$ for i~p, and the difference between a and â may be referred to as additive noise.

For the training of $\hat{s}_{t+1}$ given $s_t, a_t$, supervised learning may be used together with real data. For training the policy of nodes simulators can be used. Later, fine tuning of a policy can be accomplished using real data. Two concepts may make the simulation more realistic. First, using imitation, an initial policy can be constructed using the "behavior cloning" paradigm, using large real world data sets. In some cases, the resulting agents may be suitable. In other cases, the resulting agents at least form very good initial policies for the other agents on the roads. Second, using self-play, our own policy may be used to augment the training. For example, given an initial implementation of the other agents (cars/pedestrians) that may be experienced, a policy may be trained based on a simulator. Some of the other agents may be replaced with the new policy, and the process may be repeated. As a result, the policy can continue to improve as it should respond to a larger variety of other agents that have differing levels of sophistication.

Further, in some embodiments, the system may implement a multi-agent approach. For example, the system may take into account data from various sources and/or images capturing from multiple angles. Further, some disclosed embodiments may provide economy of energy, as anticipation of an event which does not directly involve the host vehicle, but which may have an effect on the host vehicle can be considered, or even anticipation of an event that may lead to unpredictable circumstances involving other vehicles may be a consideration (e.g., radar may "see through" the leading vehicle and anticipation of an unavoidable, or even a high likelihood of an event that will affect the host vehicle).

Trained System with Imposed Navigational Constraints

In the context of autonomous driving, a significant concern is how to ensure that a learned policy of a trained navigational network will be safe. In some embodiments, the driving policy system may be trained using constraints, such that the actions selected by the trained system may already account for applicable safety constraints. Additionally, in some embodiments, an extra layer of safety may be provided by passing the selected actions of the trained system through one or more hard constraints implicated by a particular sensed scene in the environment of the host vehicle. Such an approach may ensure that that the actions taken by the host vehicle have been restricted to those confirmed as satisfying applicable safety constraints.

At its core, the navigational system may include a learning algorithm based on a policy function that maps an observed state to one or more desired actions. In some implementations, the learning algorithm is a deep learning algorithm. The desired actions may include at least one action expected to maximize an anticipated reward for a vehicle. While in some cases, the actual action taken by the vehicle may correspond to one of the desired actions, in other cases, the actual action taken may be determined based on the observed state, one or more desired actions, and non-learned, hard constraints (e.g., safety constraints) imposed on the learning navigational engine. These constraints may include no-drive zones surrounding various types of detected objects (e.g., target vehicles, pedestrians, stationary objects on the side of a road or in a roadway, moving objects on the side of a road or in a roadway, guard rails, etc.) In some cases, the size of the zone may vary based on a detected motion (e.g., speed and/or direction) of a detected object. Other constraints may include a maximum speed of travel when passing within an influence zone of a pedestrian, a maximum deceleration (to account for a target vehicle spacing behind the host vehicle), a mandatory stop at a sensed crosswalk or railroad crossing, etc.

Hard constraints used in conjunction with a system trained through machine learning may offer a degree of safety in autonomous driving that may surpass a degree of safety available based on the output of the trained system alone. For example, the machine learning system may be trained using a desired set of constraints as training guidelines and, therefore, the trained system may select an action in response to a sensed navigational state that accounts for and adheres to the limitations of applicable navigational constraints. Still, however, the trained system has some flexibility in selecting navigational actions and, therefore, there may exist at least some situations in which an action selected by the trained system may not strictly adhere to relevant navigational constraints. Therefore, in order to require that a selected action strictly adheres to relevant navigational constraints, the output of the trained system may be combined with, compared to, filtered with, adjusted, modified, etc. using a non-machine learning component outside the learning/trained framework that guarantees strict application of relevant navigational constraints.

The following discussion provides additional details regarding the trained system and the potential benefits (especially from a safety perspective) that may be gleaned from combining a trained system with an algorithmic component outside of the trained/learning framework. As discussed, the reinforcement learning objective by policy may be optimized through stochastic gradient ascent. The objective (e.g., the expected reward) may be defined as $\mathbb{E}_{\bar{s} \sim P_\pi} R(\bar{s})$.

Objectives that involve expectation may be used in machine learning scenarios. Such an objective, without being bound by navigational constraints, however, may not return actions strictly bound by those constraints. For example, considering a reward function for which $R(\bar{s})=-r$ for trajectories that represent a rare "corner" event to be avoided (e.g., such as an accident), and $R(\bar{s}) \in [-1, 1]$ for the rest of the trajectories, one goal for the learning system may be to learn to perform an overtake maneuver. Normally, in an accident free trajectory, $R(\bar{s})$ would reward successful, smooth, takeovers and penalize staying in a lane without completing the takeover—hence the range $[-1, 1]$. If a sequence, $\bar{s}$, represents an accident, the reward, $-r$, should provide a sufficiently high penalty to discourage such an occurrence. The question is what should be the value of r to ensure accident-free driving.

Observe that the effect of an accident on $\mathbb{E}[R(\bar{s})]$ is the additive term $-pr$ where p is the probability mass of trajectories with an accident event. If this term is negligible, i.e., $p \ll 1/r$, then the learning system may prefer a policy that performs an accident (or adopt in general a reckless driving policy) in order to fulfill the takeover maneuver successfully more often than a policy that would be more defensive at the expense of having some takeover maneuvers not complete successfully. In other words, if the probability of accidents is to be at most p, then r must be set such that $r \gg 1/p$. It may be desirable to make p extremely small (e.g., on the order of $p=10^{-9}$). Therefore, r should be large. In policy gradient, the gradient of $\mathbb{E}[R(\bar{s})]$ may be estimated. The following lemma shows that the variance of the random variable $R(\bar{s})$ grows with $pr^2$, which is larger than r for $r \gg 1/p$. Therefore, estimating the objective may be difficult, and estimating its gradient may be even more difficult.

Lemma: Let $\pi_o$ be a policy and let p and r be scalars such that with probability p, $R(\bar{s})=-r$ is obtained, and with probability $1-p$ we have $R(\bar{s}) \in [-1, 1]$ is obtained. Then, $$\text{Var}[R(\bar{s})] \geq pr^2 - (pr+(1-p))^2 =$$
$$(p-p^2)r^2 - 2p(1-p)r - (1-p)^2 \approx pr^2$$

where the last approximation holds for the case $r \geq 1/p$.

This discussion shows that an objection of the form $\mathbb{E}[R(\bar{s})]$ may not ensure functional safety without causing a variance problem. The baseline subtraction method for variance reduction may not offer a sufficient remedy to the problem because the problem would shift from a high variance of $R(\bar{s})$ to an equally high variance of the baseline constants whose estimation would equally suffer numeric instabilities. Moreover, if the probability of an accident is p, then on average at least $1/p$ sequences should be sampled before obtaining an accident event. This implies a lower bound of $1/p$ samples of sequences for a learning algorithm that aims at minimizing $\mathbb{E}[R(\bar{s})]$. The solution to this problem may be found in the architectural design described herein, rather than through numerical conditioning techniques. The approach here is based on the notion that hard constraints should be injected outside of the learning framework. In other words, the policy function may be decomposed into a learnable part and a nonlearnable part. Formally, the policy function may be structured as $\pi_\theta = \pi^{(T)} \circ \pi_\theta^{(D)}$, where $\pi_\theta^{(D)}$ maps the (agnostic) state space into a set of Desires (e.g., desired navigational goals, etc.), while $\pi^{(T)}$ maps the Desires into a trajectory (which may determine how the car should move in a short range). The function $\pi_\theta^{(D)}$ is responsible for the comfort of driving and for making strategic decisions such as which other cars should be over-taken or given way and what is the desired position of the host vehicle within its lane, etc. The mapping from sensed navigational state to Desires is a policy $\pi_\theta^{(D)}$ that may be learned from experience by maximizing an expected reward. The desires produced by $\pi_\theta^{(D)}$ may be translated into a cost function over driving trajectories. The function $\pi_\theta^{(D)}$, not a learned function, may be implemented by finding a trajectory that minimizes the cost subject to hard constraints on functional safety. This decomposition may ensure functional safety while at the same time providing for comfortable driving.

Figure 11D:
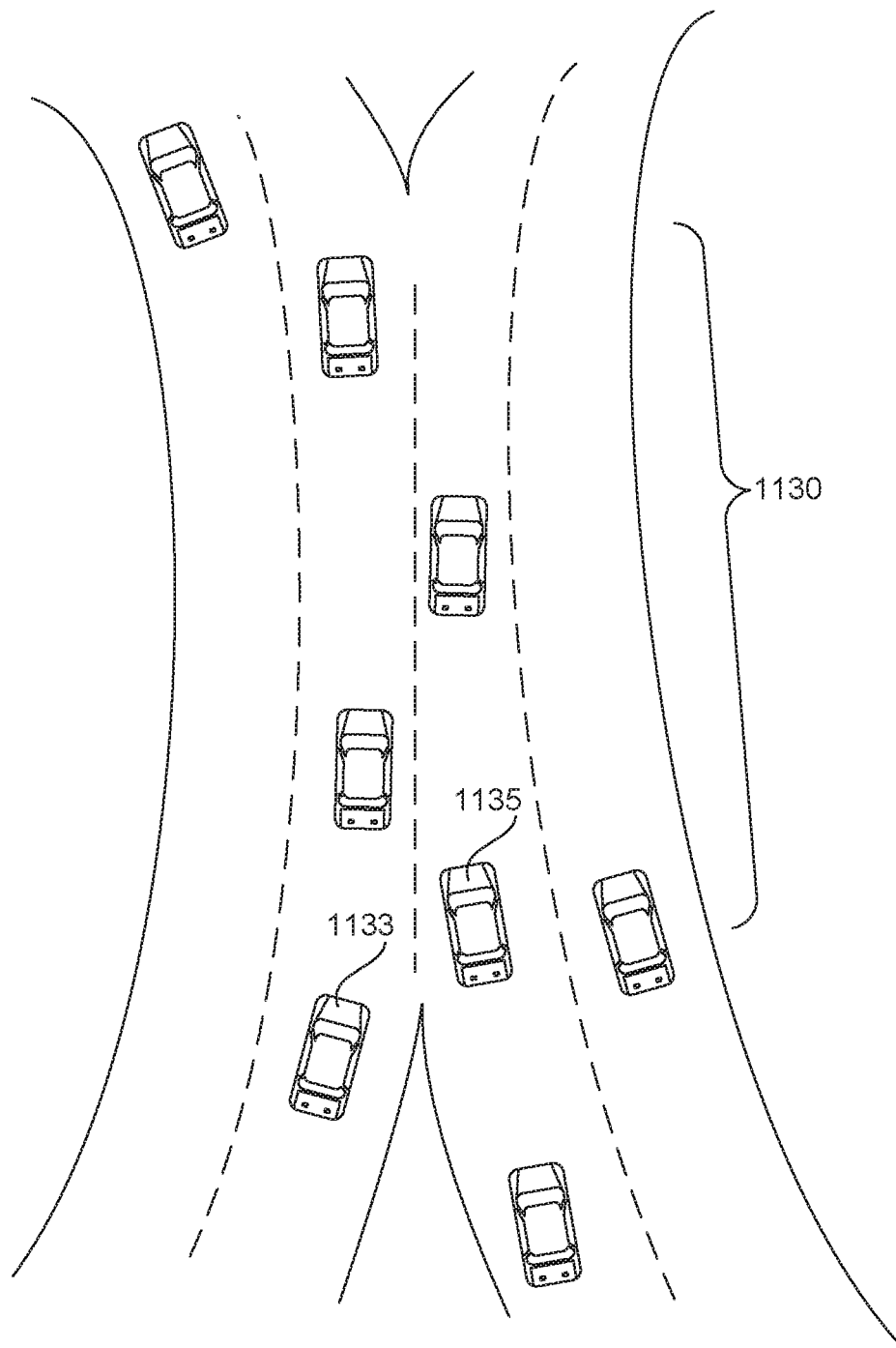
FIG. 11D provide a diagrammatic depiction of a double merge scenario.

A double merge navigational situation, as depicted in FIG. 11D, provides an example further illustrating these concepts.

In a double merge, vehicles approach the merge area 1130 from both left and right sides. And, from each side, a vehicle, such as vehicle 1133 or vehicle 1135, can decide whether to merge into lanes on the other side of merge area 1130. Successfully executing a double merge in busy traffic may require significant negotiation skills and experience and may be difficult to execute in a heuristic or brute force approach by enumerating all possible trajectories that could be taken by all agents in the scene. In this double merge example, a set of Desires, $\mathcal{D}$, appropriate for the double merge maneuver may be defined. $\mathcal{D}$ may be the Cartesian product of the following sets: $\mathcal{D} = [0, v_{max}] \times L \times \{g, t, o\}^n$, where $[0, v_{max}]$ is the desired target speed of the host vehicle, $L = \{1, 1.5, 2, 2.5, 3, 3.5, 4\}$ is the desired lateral position in lane units where whole numbers designate a lane center and fractional numbers designate lane boundaries, and $\{g, t, o\}$ are classification labels assigned to each of the n other vehicles. The other vehicles may be assigned "g" if the host vehicle is to give way to the other vehicle, "t" if the host vehicle is to take way relative to the other vehicle, or "o" if the host vehicle is to maintain an offset distance relative to the other vehicle.

Below is a description of how a set of Desires, $(v, l, c_1, \ldots, c_n) \in \mathcal{D}$, may be translated into a cost function over driving trajectories. A driving trajectory may be represented by $(x_1, y_1), \ldots, (x_k, y_k)$, where $(x_i, y_i)$ is the (lateral, longitudinal) location of the host vehicle (in ego-centric units) at time $r \cdot i$. In some experiments, $r=0.1$ sec and $k=10$. Of course, other values may be selected as well. The cost assigned to a trajectory may include a weighted sum of individual costs assigned to the desired speed, lateral position, and the label assigned to each of the other n vehicles.

Given a desired speed $v \in [0, v_{max}]$, the cost of a trajectory associated with speed is $$\Sigma_{i=2}^{k}(v - \|(x_i, y_i) - (x_{i-1}, y_{i-1})\|/r)^2.$$

Given desired lateral position, $l \in L$, the cost associated with desired lateral position is $$\Sigma_{i=1}^{k} \text{dist}(x_i, y_i, l)$$

where $\text{dist}(x, y, l)$ is the distance from the point $(x, y)$ to the lane position $l$. Regarding the cost due to other vehicles, for any other vehicle $(x'_1, y'_1), \ldots, (x'_k, y'_k)$ may represent the other vehicle in egocentric units of the host vehicle, and i may be the earliest point for which there exists j such that the distance between $(x_i, y_i)$ and $(x'_j, y'_j)$ is small. If there is no such point, then i can be set as $i=\infty$. If another car is classified as "give-way", it may be desirable that $ri>rj+0.5$, meaning that the host vehicle will arrive to the trajectory intersection point at least 0.5 seconds after the other vehicle will arrive at the same point. A possible formula for translating the above constraint into a cost is $[r(j-i)+0.5]+$.

Likewise, if another car is classified as "take-way", it may be desirable that $rj>ri+0.5$, which may be translated to the cost $[r(i-j)+0.5]+$. If another car is classified as "offset", it may be desirable that $i=\infty$, meaning that the trajectory of the host vehicle and the trajectory of the offset car do not intersect. This condition can be translated to a cost by penalizing with respect to the distance between trajectories.

Assigning a weight to each of these costs may provide a single objective function for the trajectory planner, $\pi^{(T)}$. A cost that encourages smooth driving may be added to the objective. And, to ensure functional safety of the trajectory, hard constraints can be added to the objective. For example, $(x_i, y_i)$ may be prohibited from being off the roadway, and $(x_i, y_i)$ may be forbidden from being close to $(x'_j, y'_j)$ for any trajectory point $(x'_j, y'_j)$ of any other vehicle if $|i-j|$ is small.

To summarize, the policy, $\pi_\theta$, can be decomposed into a mapping from the agnostic state to a set of Desires and a mapping from the Desires to an actual trajectory. The latter mapping is not based on learning and may be implemented by solving an optimization problem whose cost depends on the Desires and whose hard constraints may guarantee functional safety of the policy.

The following discussion describes mapping from the agnostic state to the set of Desires. As described above, to be compliant with functional safety, a system reliant upon reinforcement learning alone may suffer a high and unwieldy variance on the reward $R(\bar{s})$. This result may be avoided by decomposing the problem into a mapping from (agnostic) state space to a set of Desires using policy gradient iterations followed by a mapping to an actual trajectory which does not involve a system trained based on machine learning.

For various reasons, the decision making may be further decomposed into semantically meaningful components. For example, the size of $\mathcal{D}$ might be large and even continuous. In the double-merge scenario described above with respect to FIG. 11D, $\mathcal{D} = [0, v_{max}] \times L \times \{g, t, o\}^n$). Additionally, the gradient estimator may involve the term $\Sigma_{t=1}^{T} \nabla_\theta \pi_\theta(a_t|s_t)$. In such an expression, the variance may grow with the time horizon T. In some cases, the value of T may be roughly 250 which may be high enough to create significant variance. Supposing a sampling rate is in the range of 10 Hz and the merge area 1130 is 100 meters, preparation for the merge may begin approximately 300 meters before the merge area. If the host vehicle travels at 16 meters per second (about 60 km per hour), then the value of T for an episode may be roughly 250.

Figure 11E:
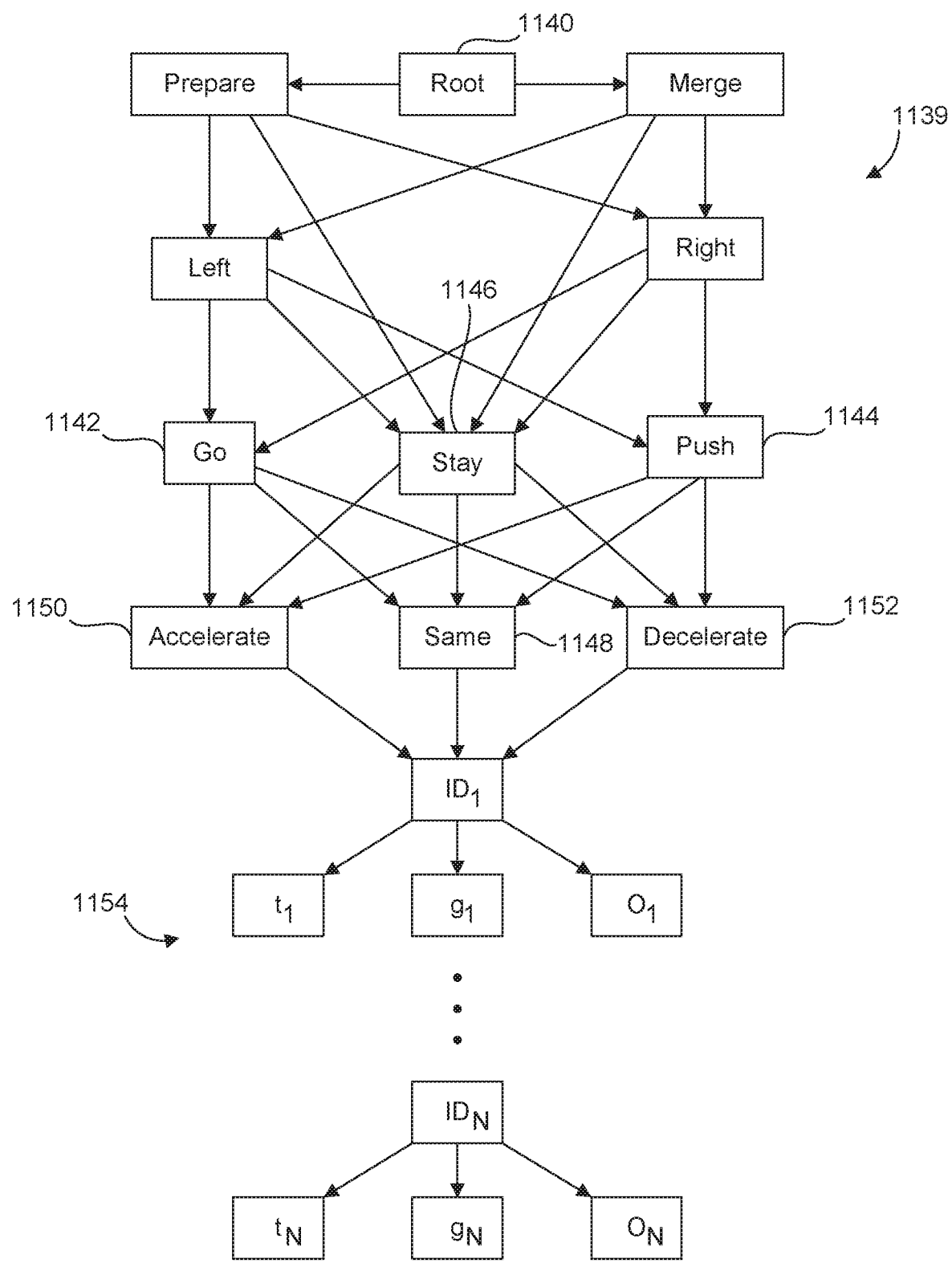
FIG. 11E provides an options graph potentially useful in a double merge scenario.

Returning to the concept of an options graph, an options graph that may be representative of the double merge scenario depicted in FIG. 11D is shown in FIG. 11E. As previously discussed, an options graph may represent a hierarchical set of decisions organized as a Directed Acyclic Graph (DAG). There may be a special node in the graph called the "root" node 1140, which may be the only node that has no incoming edges (e.g., decision lines). The decision process may traverse the graph, starting from the root node, until it reaches a "leaf" node, namely, a node that has no outgoing edges. Each internal node may implement a policy function that chooses a child from among its available children. There may be a predefined mapping from the set of traversals over the options graph to the set of desires, $\mathcal{D}$. In other words, a traversal on the options graph may be automatically translated into a desire in $\mathcal{D}$. Given a node, v, in the graph, a parameter vector $\theta_v$ may specify the policy of choosing a child of v. If $\theta$ is the concatenation of all the $\theta_v$, then $\pi_\theta^{(D)}$ may be defined by traversing from the root of the graph to a leaf, while at each node v using the policy defined by $\theta_v$, to choose a child node.

In the double merge options graph 1139 of FIG. 11E, root node 1140 may first decide if the host vehicle is within the merging area (e.g., area 1130 of FIG. 11D) or if the host vehicle instead is approaching the merging area and needs to prepare for a possible merge. In both cases, the host vehicle may need to decide whether to change lanes (e.g., to the left or to the right side) or whether to stay in the current lane. If the host vehicle has decided to change lanes, the host vehicle may need to decide whether conditions are suitable to go on and perform the lane change maneuver (e.g., at "go" node 1142). If it is not possible to change lanes, the host vehicle may attempt to "push" toward the desired lane (e.g., at node 1144 as part of a negotiation with vehicles in the desired lane) by aiming at being on the lane mark. Alternatively, the host vehicle may opt to "stay" in the same lane (e.g., at node 1146). Such a process may determine the lateral position for the host vehicle in a natural way. For example, This may enable determination of the desired lateral position in a natural way. For example, if the host vehicle changes lanes from lane 2 to lane 3, the "go" node may set the desired lateral position to 3, the "stay" node may set the desired lateral position to 2, and the "push" node may set the desired lateral position to 2.5. Next, the host vehicle may decide whether to maintain the "same" speed (node 1148), "accelerate" (node 1150), or "decelerate" (node 1152). Next, the host vehicle may enter a "chain like" structure 1154 that goes over the other vehicles and sets their semantic meaning to a value in the set {g, t, o}. This process may set the desires relative to the other vehicles. The parameters of all nodes in this chain may be shared (similar to Recurrent Neural Networks).

A potential benefit of the options is the interpretability of the results. Another potential benefit is that the decomposable structure of the set $\mathcal{V}$ can be relied upon and, therefore, the policy at each node may be chosen from among a small number of possibilities. Additionally, the structure may allow for a reduction in the variance of the policy gradient estimator.

As discussed above, the length of an episode in the double merge scenario may be roughly T=250 steps. Such a value (or any other suitable value depending on a particular navigational scenario) may provide enough time to see the consequences of the host vehicle actions (e.g., if the host vehicle decided to change lanes as a preparation for the merge, the host vehicle will see the benefit only after a successful completion of the merge). On the other hand, due to the dynamic of driving, the host vehicle must make decisions at a fast enough frequency (e.g., 10 Hz in the case described above).

The options graph may enable a decrease in the effective value of T in at least two ways. First, given higher level decisions, a reward can be defined for lower level decisions while taking into account shorter episodes. For example, when the host vehicle has already chosen a "lane change" and the "go" node, a policy can be learned for assigning semantic meaning to vehicles by looking at episodes of 2-3 seconds (meaning that T becomes 20-30 instead of 250). Second, for high level decisions (such as whether to change lanes or to stay in the same lane), the host vehicle may not need to make decisions every 0.1 seconds. Instead, the host vehicle may be able to either make decisions at a lower frequency (e.g., every second), or implement an "option termination" function, and then the gradient may be calculated only after every termination of the option. In both cases, the effective value of T may be an order of magnitude smaller than its original value. All in all, the estimator at every node may depend on a value of T which is an order of magnitude smaller than the original 250 steps, which may immediately transfer to a smaller variance.

As discussed above, hard constraints may promote safer driving, and there may be several different types of constraints. For example, static hard constraints may be defined directly from the sensing state. These may include speed bumps, speed limits, road curvature, junctions, etc., within the environment of the host vehicle that may implicate one or more constraints on vehicle speed, heading, acceleration, breaking (deceleration), etc. Static hard constraints may also include semantic free space where the host vehicle is prohibited from going outside of the free space and from navigating too close to physical barriers, for example. Static hard constraints may also limit (e.g., prohibit) maneuvers that do not comply with various aspects of a kinematic motion of the vehicle, for example, a static hard constraint can be used to prohibit maneuvers that might lead to the host vehicle overturning, sliding, or otherwise losing control.

Hard constraints may also be associated with vehicles. For example, a constraint may be employed requiring that a vehicle maintain a longitudinal distance to other vehicles of at least one meter and a lateral distance from other vehicles of at least 0.5 meters. Constraints may also be applied such that the host vehicle will avoid maintaining a collision course with one or more other vehicles. For example, a time $\tau$ may be a measure of time based on a particular scene. The predicted trajectories of the host vehicle and one or more other vehicles may be considered from a current time to time $\tau$. Where the two trajectories intersect, $(t_i^a, t_i^l)$ may represent the time of arrival and the leaving time of vehicle i to the intersection point. That is, each car will arrive at point when a first part of the car passes the intersection point, and a certain amount of time will be required before the last part of the car passes through the intersection point. This amount of time separates the arrival time from the leaving time. Assuming that $t_1^a < t_2^a$ (i.e., that the arrival time of vehicle 1 is less than the arrival time of vehicle 2), then we will want to ensure that vehicle 1 has left the intersection point prior to vehicle 2 arriving. Otherwise, a collision would result. Thus, a hard constraint may be implemented such that $t_1^l > t_2^a$. Moreover, to ensure that vehicle 1 and vehicle 2 do not miss one another by a minimal amount, an added margin of safety may be obtained by including a buffer time into the constraint (e.g., 0.5 seconds or another suitable value). A hard constraint relating to predicted intersection trajectories of two vehicles may be expressed as $t_1^l > t_2^a + 0.5$.

The amount of time $\tau$ over which the trajectories of the host vehicle and one or more other vehicles are tracked may vary. In junction scenarios, however, where speeds may be lower, $\tau$ may be longer, and $\tau$ may be defined such that a host vehicle will enter and leave the junction in less than $\tau$ seconds.

Applying hard constraints to vehicle trajectories, of course, requires that the trajectories of those vehicles be predicted. For the host vehicle, trajectory prediction may be relatively straightforward, as the host vehicle generally already understands and, indeed, is planning an intended trajectory at any given time. Relative to other vehicles, predicting their trajectories can be less straightforward. For other vehicles, the baseline calculation for determining predicted trajectories may rely on the current speed and heading of the other vehicles, as determined, for example, based on analysis of an image stream captured by one or more cameras and/or other sensors (radar, lidar, acoustic, etc.) aboard the host vehicle.

There can be some exceptions, however, that can simplify the problem or at least provide added confidence in a trajectory predicted for another vehicle. For example, with respect to structured roads in which there is an indication of lanes and where give-way rules may exist, the trajectories of other vehicles can be based, at least in part, upon the position of the other vehicles relative to the lanes and based upon applicable give-way rules. Thus, in some situations, when there are observed lane structures, it may be assumed that next-lane vehicles will respect lane boundaries. That is, the host vehicle may assume that a next-lane vehicle will stay in its lane unless there is observed evidence (e.g., a signal light, strong lateral movement, movement across a lane boundary) indicating that the next-lane vehicle will cut into the lane of the host vehicle.

Other situations may also provide clues regarding the expected trajectories of other vehicles. For example, at stop signs, traffic lights, roundabouts, etc., where the host vehicle may have the right of way, it may be assumed that other vehicles will respect that right of way. Thus, unless there is observed evidence of a rule break, other vehicles may be assumed to proceed along a trajectory that respects the rights of way possessed by the host vehicle.

Hard constraints may also be applied with respect to pedestrians in an environment of the host vehicle. For example, a buffer distance may be established with respect to pedestrians such that the host vehicle is prohibited from navigating any closer than the prescribed buffer distance relative to any observed pedestrian. The pedestrian buffer distance may be any suitable distance. In some embodiments, the buffer distance may be at least one meter relative to an observed pedestrian.

Similar to the situation with vehicles, hard constraints may also be applied with respect to relative motion between pedestrians and the host vehicle. For example, the trajectory of a pedestrian (based on a heading direction and speed) may be monitored relative to the projected trajectory of the host vehicle. Given a particular pedestrian trajectory, with every point p on the trajectory, t(p) may represent the time required for the pedestrian to reach point p. To maintain the required buffer distance of at least 1 meter from the pedestrian, either t(p) must be larger than the time the host vehicle will reach point p (with sufficient difference in time such that the host vehicle passes in front of the pedestrian by a distance of at least one meter) or that t(p) must be less than the time the host vehicle will reach point p (e.g., if the host vehicle brakes to give way to the pedestrian). Still, in the latter example, the hard constraint may require that the host vehicle arrive at point p at a sufficient time later than the pedestrian such that the host vehicle can pass behind the pedestrian and maintain the required buffer distance of at least one meter. Of course, there may be exceptions to the pedestrian hard constraint. For example, where the host vehicle has the right of way or where speeds are very slow, and there is no observed evidence that the pedestrian will decline to give way to the host vehicle or will otherwise navigate toward the host vehicle, the pedestrian hard constraint may be relaxed (e.g., to a smaller buffer of at least 0.75 meters or 0.50 meters).

In some examples, constraints may be relaxed where it is determined that not all can be met. For example, in situations where a road is too narrow to leave desired spacing (e.g., 0.5 meters) from both curbs or from a curb and a parked vehicle, one or more the constraints may be relaxed if there are mitigating circumstances. For example, if there are no pedestrians (or other objects) on the sidewalk one can proceed slowly at 0.1 meters from a curb. In some embodiments, constraints may be relaxed if doing so will improve the user experience. For example, in order to avoid a pothole, constraints may be relaxed to allow a vehicle to navigate closers to the edges of the lane, a curb, or a pedestrian more than might ordinarily be permitted. Furthermore, when determining which constrains to relax, in some embodiments, the one or more constraints chosen to relax are those deemed to have the least available negative impact to safety. For example, a constraint relating to how close the vehicle may travel to the curb or to a concrete barrier may be relaxed before relaxing one dealing with proximity to other vehicles. In some embodiments, pedestrian constraints may be the last to be relaxed, or may never be relaxed in some situations.

Figure 12:
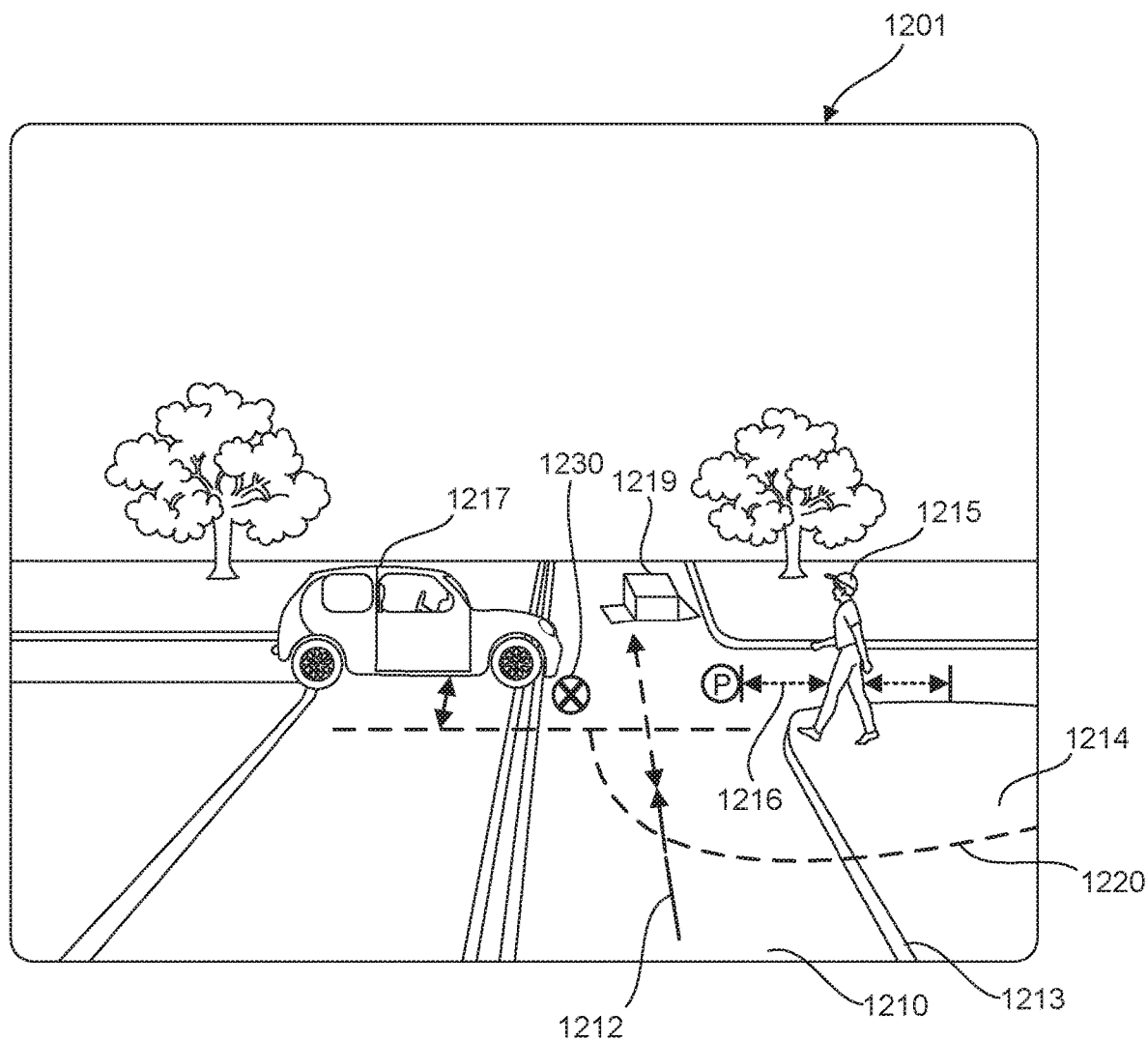
FIG. 12 provides a diagram of a representative image captured of an environment of a host vehicle, along with potential navigational constraints consistent with the disclosed embodiments.

FIG. 12 shows an example of a scene that may be captured and analyzed during navigation of a host vehicle. For example, a host vehicle may include a navigation system (e.g., system 100), as described above, that may receive from a camera (e.g., at least one of image capture device 122, image capture device 124, and image capture device 126) associated with the host vehicle a plurality of images representative of an environment of the host vehicle. The scene shown in FIG. 12 is an example of one of the images that may be captured at time t from an environment of a host vehicle traveling in lane 1210 along a predicted trajectory 1212. The navigation system may include at least one processing device (e.g., including any of the EyeQ processors or other devices described above) that are specifically programmed to receive the plurality of images and analyze the images to determine an action in response to the scene. Specifically, the at least one processing device may implement sensing module 801, driving policy module 803, and control module 805, as shown in FIG. 8. Sensing module 801 may be responsible for collecting and outputting the image information collected from the cameras and providing that information, in the form of an identified navigational state, to driving policy module 803, which may constitute a trained navigational system that has been trained through machine learning techniques, such as supervised learning, reinforcement learning, etc. Based on the navigational state information provided to driving policy module 803 by sensing module 801, driving policy module 803 (e.g., by implementing the options graph approach described above) may generate a desired navigational action for execution by the host vehicle in response to the identified navigational state.

In some embodiments, the at least one processing device may translate the desired navigation action directly into navigational commands using, for example, control module 805. In other embodiments, however, hard constraints may be applied such that the desired navigational action provided by the driving policy module 803 is tested against various predetermined navigational constraints that may be implicated by the scene and the desired navigational action. For example, where driving policy module 803 outputs a desired navigational action that would cause the host vehicle to follow trajectory 1212, this navigational action may be tested relative to one or more hard constraints associated with various aspects of the environment of the host vehicle. For example, a captured image 1201 may reveal a curb 1213, a pedestrian 1215, a target vehicle 1217, and a stationary object (e.g., an overturned box) present in the scene. Each of these may be associated with one or more hard constraints. For example, curb 1213 may be associated with a static constraint that prohibits the host vehicle from navigating into the curb or past the curb and onto a sidewalk 1214. Curb 1213 may also be associated with a road barrier envelope that defines a distance (e.g., a buffer zone) extending away from (e.g., by 0.1 meters, 0.25 meters, 0.5 meters, 1 meter, etc.) and along the curb, which defines a no-navigate zone for the host vehicle. Of course, static constraints may be associated with other types of roadside boundaries as well (e.g., guard rails, concrete pillars, traffic cones, pylons, or any other type of roadside barrier).

It should be noted that distances and ranging may be determined by any suitable method. For example, in some embodiments, distance information may be provided by onboard radar and/or lidar systems. Alternatively or additionally, distance information may be derived from analysis of one or more images captured from the environment of the host vehicle. For example, numbers of pixels of a recognized object represented in an image may be determined and compared to known field of view and focal length geometries of the image capture devices to determine scale and distances. Velocities and accelerations may be determined, for example, by observing changes in scale between objects from image to image over known time intervals. This analysis may indicate the direction of movement toward or away from the host vehicle along with how fast the object is pulling away from or coming toward the host vehicle. Crossing velocity may be determined through analysis of the change in an object's X coordinate position from one image to another over known time periods.

Pedestrian 1215 may be associated with a pedestrian envelope that defines a buffer zone 1216. In some cases, an imposed hard constraint may prohibit the host vehicle from navigating within a distance of 1 meter from pedestrian 1215 (in any direction relative to the pedestrian). Pedestrian 1215 may also define the location of a pedestrian influence zone 1220. Such an influence zone may be associated with a constraint that limits the speed of the host vehicle within the influence zone. The influence zone may extend 5 meters, 10 meters, 20 meters, etc., from pedestrian 1215. Each graduation of the influence zone may be associated with a different speed limit. For example, within a zone of 1 meter to five meters from pedestrian 1215, host vehicle may be limited to a first speed (e.g., 10 mph, 20 mph, etc.) that may be less than a speed limit in a pedestrian influence zone extending from 5 meters to 10 meters. Any graduation for the various stages of the influence zone may be used. In some embodiments, the first stage may be narrower than from 1 meter to five meters and may extend only from one meter to two meters. In other embodiments, the first stage of the influence zone may extend from 1 meter (the boundary of the no-navigate zone around a pedestrian) to a distance of at least 10 meters. A second stage, in turn, may extend from 10 meters to at least about 20 meters. The second stage may be associated with a maximum rate of travel for the host vehicle that is greater than the maximum rate of travel associated with the first stage of the pedestrian influence zone.

One or more stationary object constraints may also be implicated by the detected scene in the environment of the host vehicle. For example, in image 1201, the at least one processing device may detect a stationary object, such as box 1219 present in the roadway. Detected stationary objects may include various objects, such as at least one of a tree, a pole, a road sign, or an object in a roadway. One or more predefined navigational constraints may be associated with the detected stationary object. For example, such constraints may include a stationary object envelope, wherein the stationary object envelope defines a buffer zone about the object within which navigation of the host vehicle may be prohibited. At least a portion of the buffer zone may extend a predetermined distance from an edge of the detected stationary object. For example, in the scene represented by image 1201, a buffer zone of at least 0.1 meters, 0.25 meters, 0.5 meters or more may be associated with box 1219 such that the host vehicle will pass to the right or to the left of the box by at least some distance (e.g., the buffer zone distance) in order to avoid a collision with the detected stationary object.

The predefined hard constraints may also include one or more target vehicle constraints. For example, a target vehicle 1217 may be detected in image 1201. To ensure that the host vehicle does not collide with target vehicle 1217, one or more hard constraints may be employed. In some cases, a target vehicle envelope may be associated with a single buffer zone distance. For example, the buffer zone may be defined by a 1 meter distance surrounding the target vehicle in all directions. The buffer zone may define a region extending from the target vehicle by at least one meter into which the host vehicle is prohibited from navigating.

The envelope surrounding target vehicle 1217 need not be defined by a fixed buffer distance, however. In some cases the predefined hard constraints associate with target vehicles (or any other movable objects detected in the environment of the host vehicle) may depend on the orientation of the host vehicle relative to the detected target vehicle. For example, in some cases, a longitudinal buffer zone distance (e.g., one extending from the target vehicle toward the front or rear of the host vehicle—such as in the case that the host vehicle is driving toward the target vehicle) may be at least one meter. A lateral buffer zone distance (e.g., one extending from the target vehicle toward either side of the host vehicle—such as when the host vehicle is traveling in a same or opposite direction as the target vehicle such that a side of the host vehicle will pass adjacent to a side of the target vehicle) may be at least 0.5 meters.

As described above, other constraints may also be implicated by detection of a target vehicle or a pedestrian in the environment of the host vehicle. For example, the predicted trajectories of the host vehicle and target vehicle 1217 may be considered and where the two trajectories intersect (e.g., at intersection point 1230), a hard constraint may require $t_1^l > t_2^a$ or $t_1^l > t_2^a + 0.5$ where the host vehicle is vehicle 1, and target vehicle 1217 is vehicle 2. Similarly, the trajectory of pedestrian 1215 (based on a heading direction and speed) may be monitored relative to the projected trajectory of the host vehicle. Given a particular pedestrian trajectory, with every point p on the trajectory, t(p) will represent the time required for the pedestrian to reach point p (i.e., point 1231 in FIG. 12). To maintain the required buffer distance of at least 1 meter from the pedestrian, either t(p) must be larger than the time the host vehicle will reach point p (with sufficient difference in time such that the host vehicle passes in front of the pedestrian by a distance of at least one meter) or that t(p) must be less than the time the host vehicle will reach point p (e.g., if the host vehicle brakes to give way to the pedestrian). Still, in the latter example, the hard constraint will require that the host vehicle arrive at point p at a sufficient time later than the pedestrian such that the host vehicle can pass behind the pedestrian and maintain the required buffer distance of at least one meter.

Other hard constraints may also be employed. For example, a maximum deceleration rate of the host vehicle may be employed in at least some cases. Such a maximum deceleration rate may be determined based on a detected distance to a target vehicle following the host vehicle (e.g., using images collected from a rearward facing camera). The hard constraints may include a mandatory stop at a sensed crosswalk or a railroad crossing or other applicable constraints.

Where analysis of a scene in an environment of the host vehicle indicates that one or more predefined navigational constraints may be implicated, those constraints may be imposed relative to one or more planned navigational actions for the host vehicle. For example, where analysis of a scene results in driving policy module 803 returning a desired navigational action, that desired navigational action may be tested against one or more implicated constraints. If the desired navigational action is determined to violate any aspect of the implicated constraints (e.g., if the desired navigational action would carry the host vehicle within a distance of 0.7 meters of pedestrian 1215 where a predefined hard constraint requires that the host vehicle remain at least 1.0 meters from pedestrian 1215), then at least one modification to the desired navigational action may be made based on the one or more predefined navigational constraints. Adjusting the desired navigational action in this way may provide an actual navigational action for the host vehicle in compliance with the constraints implicated by a particular scene detected in the environment of the host vehicle.

After determination of the actual navigational action for the host vehicle, that navigational action may be implemented by causing at least one adjustment of a navigational actuator of the host vehicle in response to the determined actual navigational action for the host vehicle. Such navigational actuator may include at least one of a steering mechanism, a brake, or an accelerator of the host vehicle.

Prioritized Constraints

As described above, various hard constraints may be employed with a navigational system to ensure safe operation of a host vehicle. The constraints may include a minimum safe driving distance with respect to a pedestrian, a target vehicle, a road barrier, or a detected object, a maximum speed of travel when passing within an influence zone of a detected pedestrian, or a maximum deceleration rate for the host vehicle, among others. These constraints may be imposed with a trained system trained based on machine learning (supervised, reinforcement, or a combination), but they also may be useful with non-trained systems (e.g., those employing algorithms to directly address anticipated situations arising in scenes from a host vehicle environment).

In either case, there may be a hierarchy of constraints. In other words, some navigational constraints may have priority over other constraints. Thus, if a situation arose in which a navigational action was not available that would result in all implicated constraints being satisfied, the navigation system may determine the available navigational action that achieves the highest priority constraints first. For example, the system may cause the vehicle to avoid a pedestrian first even if navigation to avoid the pedestrian would result in a collision with another vehicle or an object detected in a road. In another example, the system may cause the vehicle to ride up on a curb to avoid a pedestrian.

Figure 13:
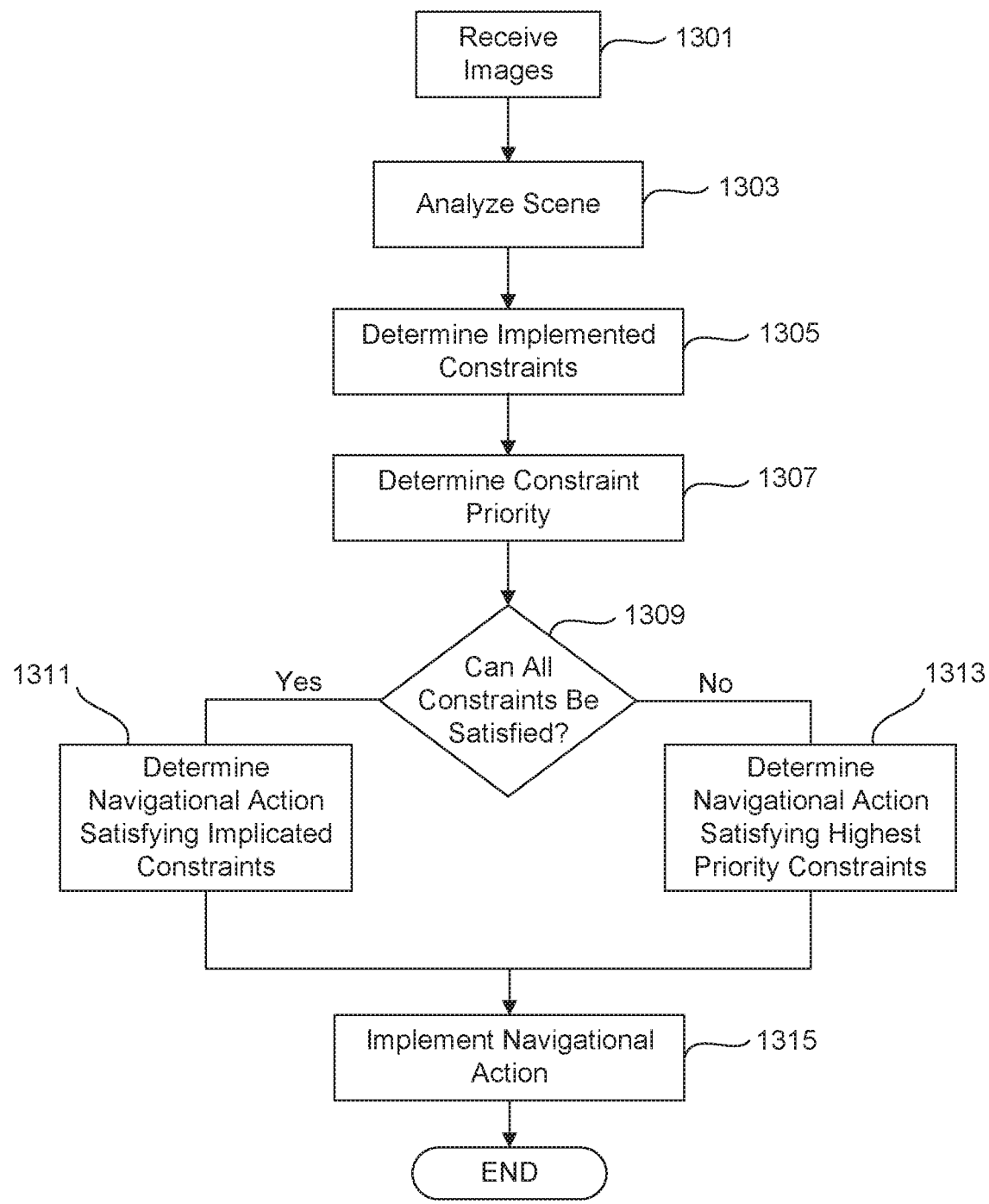
FIG. 13 provides an algorithmic flow chart for navigating a vehicle consistent with the disclosed embodiments.

FIG. 13 provides a flowchart illustrating an algorithm for implementing a hierarchy of implicated constraints determined based on analysis of a scene in an environment of a host vehicle. For example, at step 1301, at least one processing device associated with the navigational system (e.g., an EyeQ processor, etc.) may receive, from a camera mounted on the host vehicle, a plurality of images representative of an environment of the host vehicle. Through analysis of an image or images representative of the scene of the host vehicle environment at step 1303, a navigational state associated with the host vehicle may be identified. For example, a navigational state may indicate that the host vehicle is traveling along a two-lane road 1210, as in FIG. 12, that a target vehicle 1217 is moving through an intersection ahead of the host vehicle, that a pedestrian 1215 is waiting to cross the road on which the host vehicle travels, that an object 1219 is present ahead in the host vehicle lane, among various other attributes of the scene.

At step 1305, one or more navigational constraints implicated by the navigational state of the host vehicle may be determined. For example, the at least one processing device, after analyzing a scene in the environment of the host vehicle represented by one or more captured images may determine one or more navigational constraints implicated by objects, vehicles, pedestrians, etc., recognized through image analysis of the captured images. In some embodiments, the at least one processing device may determine at least a first predefined navigational constraint and a second predefined navigational constraint implicated by the navigational state, and the first predefined navigational constraint may differ from the second predefined navigational constraint. For example, the first navigational constraint may relate to one or more target vehicles detected in the environment of the host vehicle, and the second navigational constraint may relate to a pedestrian detected in the environment of the host vehicle.

At step 1307, the at least one processing device may determine a priority associated with constraints identified in step 1305. In the example described, the second predefined navigational constraint, relating to pedestrians, may have a priority higher than the first predefined navigational constraint, which relates to target vehicles. While priorities associated with navigational constraints may be determined or assigned based on various factors, in some embodiments, the priority of a navigational constraint may be related to its relative importance from a safety perspective. For example, while it may be important that all implemented navigational constraints be followed or satisfied in as many situations as possible, some constraints may be associated with greater safety risks than others and, therefore, may be assigned higher priorities. For example, a navigational constraint requiring that the host vehicle maintain at least a 1 meter spacing from a pedestrian may have a higher priority than a constraint requiring that the host vehicle maintain at least a 1 meter spacing from a target vehicle. This may be because a collision with a pedestrian may have more severe consequences than a collision with another vehicle. Similarly, maintaining a space between the host vehicle and a target vehicle may have a higher priority than a constraint requiring the host vehicle to avoid a box in the road, to drive less than a certain speed over a speed bump, or to expose the host vehicle occupants to no more than a maximum acceleration level.

While driving policy module 803 is designed to maximize safety by satisfying navigational constraints implicated by a particular scene or navigational state, in some situations it may be physically impossible to satisfy every implicated constraint. In such situations, the priority of each implicated constraint may be used to determine which of the implicated constraints should be satisfied first, as shown at step 1309. Continuing with the example above, in a situation where it is not possible satisfy both the pedestrian gap constraint and the target vehicle gap constraint, but rather only one of the constraints can be satisfied, then the higher priority of the pedestrian gap constraint may result in that constraint being satisfied before attempting to maintain a gap to the target vehicle. Thus, in normal situations, the at least one processing device may determine, based on the identified navigational state of the host vehicle, a first navigational action for the host vehicle satisfying both the first predefined navigational constraint and the second predefined navigational constraint where both the first predefined navigational constraint and the second predefined navigational constraint can be satisfied, as shown at step 1311. In other situations, however, where not all the implicated constraints can be satisfied, the at least one processing device may determine, based on the identified navigational state, a second navigational action for the host vehicle satisfying the second predefined navigational constraint (i.e., the higher priority constraint), but not satisfying the first predefined navigational constraint (having a priority lower than the second navigational constraint), where the first predefined navigational constraint and the second predefined navigational constraint cannot both be satisfied, as shown at step 1313.

Next, at step 1315, to implement the determined navigational actions for the host vehicle the at least one processing device can cause at least one adjustment of a navigational actuator of the host vehicle in response to the determined first navigational action or the determined second navigational action for the host vehicle. As in previous example, the navigational actuator may include at least one of a steering mechanism, a brake, or an accelerator.

Constraint Relaxation

As discussed above, navigational constraints may be imposed for safety purposes. The constraints may include a minimum safe driving distance with respect to a pedestrian, a target vehicle, a road barrier, or a detected object, a maximum speed of travel when passing within an influence zone of a detected pedestrian, or a maximum deceleration rate for the host vehicle, among others. These constraints may be imposed in a learning or non-learning navigational system. In certain situations, these constraints may be relaxed. For example, where the host vehicle slows or stops near a pedestrian, then progresses slowly to convey an intention to pass by the pedestrian, a response of the pedestrian can be detected from acquired images. If the response of the pedestrian is to stay still or to stop moving (and/or if eye contact with the pedestrian is sensed), it may be understood that the pedestrian recognizes an intent of the navigational system to pass by the pedestrian. In such situations, the system may relax one or more predefined constraints and implement a less stringent constraint (e.g., allow the vehicle to navigate within 0.5 meters of a pedestrian rather than within a more stringent 1 meter boundary).

Figure 14:
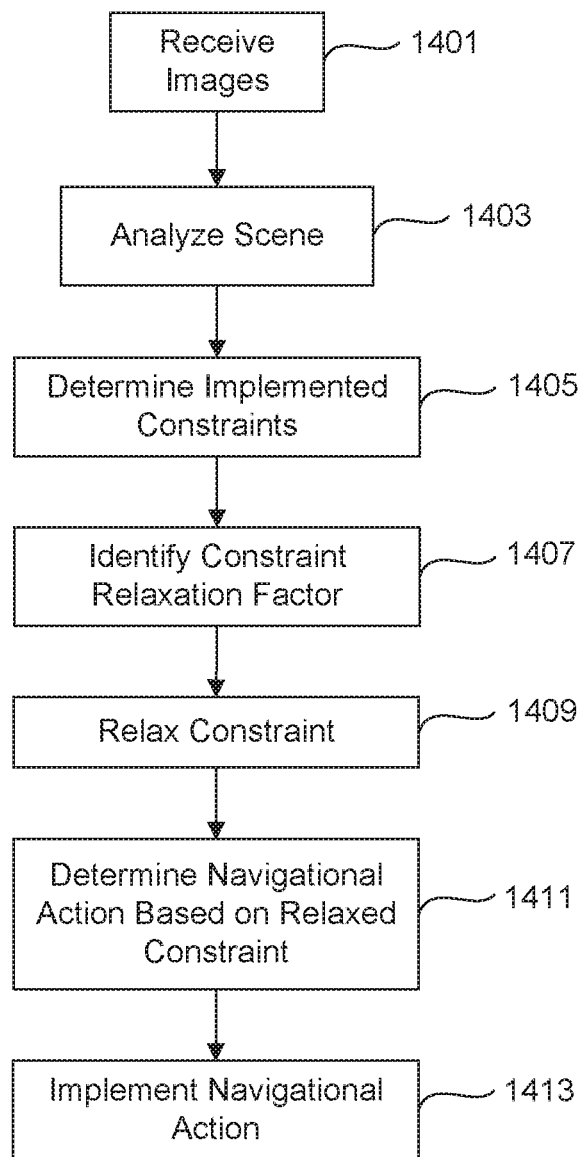
FIG. 14 provides an algorithmic flow chart for navigating a vehicle consistent with the disclosed embodiments.

FIG. 14 provides a flowchart for implementing control of the host vehicle based on relaxation of one or more navigational constraints. At step 1401, the at least one processing device may receive, from a camera associated with the host vehicle, a plurality of images representative of an environment of the host vehicle. Analysis of the images at step 1403 may enable identification of a navigational state associated with the host vehicle. At step 1405, the at least one processor may determine navigational constraints associated with the navigational state of the host vehicle. The navigational constraints may include a first predefined navigational constraint implicated by at least one aspect of the navigational state. At step 1407, analysis of the plurality of images may reveal the presence of at least one navigational constraint relaxation factor.

A navigational constraint relaxation factor may include any suitable indicator that one or more navigational constraints may be suspended, altered, or otherwise relaxed in at least one aspect. In some embodiments, the at least one navigational constraint relaxation factor may include a determination (based on image analysis) that the eyes of a pedestrian are looking in a direction of the host vehicle. In such cases, it may more safely be assumed that the pedestrian is aware of the host vehicle. As a result, a confidence level may be higher that the pedestrian will not engage in unexpected actions that cause the pedestrian to move into a path of the host vehicle. Other constraint relaxation factors may also be used. For example, the at least one navigational constraint relaxation factor may include: a pedestrian determined to be not moving (e.g., one presumed to be less likely of entering a path of the host vehicle); or a pedestrian whose motion is determined to be slowing. The navigational constraint relaxation factor may also include more complicated actions, such as a pedestrian determined to be not moving after the host vehicle has come to a stop and then resumed movement. In such a situation, the pedestrian may be assumed to understand that the host vehicle has a right of way, and the pedestrian coming to a stop may suggest an intent of the pedestrian to give way to the host vehicle. Other situations that may cause one or more constraints to be relaxed include the type of curb stone (e.g., a low curb stone or one with a gradual slope might allow a relaxed distance constraint), lack of pedestrians or other objects on sidewalk, a vehicle with its engine not running may have a relaxed distance, or a situation in which a pedestrian is facing away and/or is moving away from the area towards which the host vehicle is heading.

Where the presence of a navigational constraint relaxation factor is identified (e.g., at step 1407), a second navigational constraint may be determined or developed in response to detection of the constraint relaxation factor. This second navigational constraint may be different from the first navigational constraint and may include at least one characteristic relaxed with respect to the first navigational constraint. The second navigational constraint may include a newly generated constraint based on the first constraint, where the newly generated constraint includes at least one modification that relaxes the first constraint in at least one respect. Alternatively, the second constraint may constitute a predetermined constraint that is less stringent than the first navigational constraint in at least one respect. In some embodiments, such second constraints may be reserved for usage only for situations where a constraint relaxation factor is identified in an environment of the host vehicle. Whether the second constraint is newly generated or selected from a set of fully or partially available predetermined constraints, application of a second navigational constraint in place of a more stringent first navigational constraint (that may be applied in the absence of detection of relevant navigational constraint relaxation factors) may be referred to as constraint relaxation and may be accomplished in step 1409.

Where at least one constraint relaxation factor is detected at step 1407, and at least one constraint has been relaxed in step 1409, a navigational action for the host vehicle may be determined at step 1411. The navigational action for the host vehicle may be based on the identified navigational state and may satisfy the second navigational constraint. The navigational action may be implemented at step 1413 by causing at least one adjustment of a navigational actuator of the host vehicle in response to the determined navigational action.

As discussed above, the usage of navigational constraints and relaxed navigational constraints may be employed with navigational systems that are trained (e.g., through machine learning) or untrained (e.g., systems programmed to respond with predetermined actions in response to specific navigational states). Where trained navigational systems are used, the availability of relaxed navigational constraints for certain navigational situations may represent a mode switching from a trained system response to an untrained system response. For example, a trained navigational network may determine an original navigational action for the host vehicle, based on the first navigational constraint. The action taken by the vehicle, however, may be one that is different from the navigational action satisfying the first navigational constraint. Rather, the action taken may satisfy the more relaxed second navigational constraint and may be an action developed by a non-trained system (e.g., as a response to detection of a particular condition in the environment of the host vehicle, such as the presence of a navigational constraint relaxation factor).

There are many examples of navigational constraints that may be relaxed in response to detection in the environment of the host vehicle of a constraint relaxation factor. For example, where a predefined navigational constraint includes a buffer zone associated with a detected pedestrian, and at least a portion of the buffer zone extends a distance from the detected pedestrian, a relaxed navigational constraint (either newly developed, called up from memory from a predetermined set, or generated as a relaxed version of a preexisting constraint) may include a different or modified buffer zone. For example, the different or modified buffer zone may have a distance relative to the pedestrian that is less than the original or unmodified buffer zone relative to the detected pedestrian. As a result, in view of the relaxed constraint, the host vehicle may be permitted to navigate closer to a detected pedestrian, where an appropriate constraint relaxation factor is detected in the environment of the host vehicle.

A relaxed characteristic of a navigational constraint may include a reduced width in a buffer zone associated with at least one pedestrian, as noted above. The relaxed characteristic, however, may also include a reduced width in a buffer zone associated with a target vehicle, a detected object, a roadside barrier, or any other object detected in the environment of the host vehicle.

The at least one relaxed characteristic may also include other types of modifications in navigational constraint characteristics. For example, the relaxed characteristic may include an increase in speed associated with at least one predefined navigational constraint. The relaxed characteristic may also include an increase in a maximum allowable deceleration/acceleration associated with at least one predefined navigational constraint.

While constraints may be relaxed in certain situations, as described above, in other situations, navigational constraints may be augmented. For example, in some situations, a navigational system may determine that conditions warrant augmentation of a normal set of navigational constraints. Such augmentation may include adding new constraints to a predefined set of constraints or adjusting one or more aspects of a predefined constraint. The addition or adjustment may result in more conservative navigation relative the predefined set of constraints applicable under normal driving conditions. Conditions that may warrant constraint augmentation may include sensor failure, adverse environmental conditions (rain, snow, fog, or other conditions associated with reduced visibility or reduced vehicle traction), etc.

Figure 15:
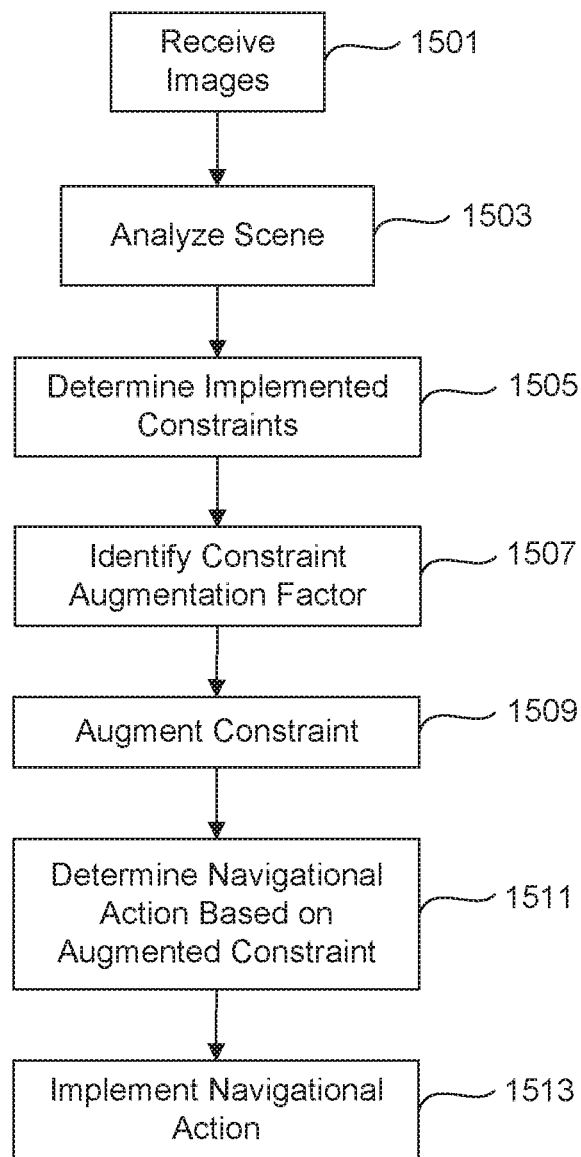
FIG. 15 provides an algorithmic flow chart for navigating a vehicle consistent with the disclosed embodiments.

FIG. 15 provides a flowchart for implementing control of the host vehicle based on augmentation of one or more navigational constraints. At step 1501, the at least one processing device may receive, from a camera associated with the host vehicle, a plurality of images representative of an environment of the host vehicle. Analysis of the images at step 1503 may enable identification of a navigational state associated with the host vehicle. At step 1505, the at least one processor may determine navigational constraints associated with the navigational state of the host vehicle. The navigational constraints may include a first predefined navigational constraint implicated by at least one aspect of the navigational state. At step 1507, analysis of the plurality of images may reveal the presence of at least one navigational constraint augmentation factor.

An implicated navigational constraint may include any of the navigational constraints discussed above (e.g., with respect to FIG. 12) or any other suitable navigational constraints. A navigational constraint augmentation factor may include any indicator that one or more navigational constraints may be supplemented/augmented in at least one aspect. Supplementation or augmentation of navigational constraints may be performed on a per set basis (e.g., by adding new navigational constraints to a predetermined set of constraints) or may be performed on a per constraint basis (e.g., modifying a particular constraint such that the modified constraint is more restrictive than the original, or adding a new constraint that corresponds to a predetermined constraint, wherein the new constraint is more restrictive than the corresponding constraint in at least one aspect). Additionally, or alternatively, supplementation or augmentation of navigational constraints may refer selection from among a set of predetermined constraints based on a hierarchy. For example, a set of augmented constraints may be available for selection based on whether a navigational augmentation factor is detected in the environment of or relative to the host vehicle. Under normal conditions where no augmentation factor is detected, then the implicated navigational constraints may be drawn from constraints applicable to normal conditions. On the other hand, where one or more constraint augmentation factors are detected, the implicated constraints may be drawn from augmented constraints either generated or predefined relative to the one or more augmentation factors. The augmented constraints may be more restrictive in at least one aspect than corresponding constraints applicable under normal conditions.

In some embodiments, the at least one navigational constraint augmentation factor may include a detection (e.g., based on image analysis) of the presence of ice, snow, or water on a surface of a road in the environment of the host vehicle. Such a determination may be based, for example, upon detection of: areas of reflectance higher than expected for dry roadways (e.g., indicative of ice or water on the roadway); white regions on the road indicating the presence of snow; shadows on the roadway consistent with the presence of longitudinal trenches (e.g., tire tracks in snow) on the roadway; water droplets or ice/snow particles on a windshield of the host vehicle; or any other suitable indicator of the presence of water or ice/snow on a surface of a road.

The at least one navigational constraint augmentation factor may also include detection of particulates on an outer surface of a windshield of the host vehicle. Such particulates may impair image quality of one or more image capture devices associated with the host vehicle. While described with respect to a windshield of the host vehicle, which is relevant for cameras mounted behind the windshield of the host vehicle, detection of particulates on other surfaces (e.g., a lens or lens cover of a camera, headlight lens, rear windshield, a tail light lens, or any other surface of the host vehicle visible to an image capture device (or detected by a sensor) associated with the host vehicle may also indicate the presence of a navigational constraint augmentation factor.

The navigational constraint augmentation factor may also be detected as an attribute of one or more image acquisition devices. For example, a detected decrease in image quality of one or more images captured by an image capture device (e.g., a camera) associated with the host vehicle may also constitute a navigational constraint augmentation factor. A decline in image quality may be associated with a hardware failure or partial hardware failure associated with the image capture device or an assembly associated with the image capture device. Such a decline in image quality may also be caused by environmental conditions. For example, the presence of smoke, fog, rain, snow, etc., in the air surrounding the host vehicle may also contribute to reduced image quality relative to the road, pedestrians, target vehicles, etc., that may be present in an environment of the host vehicle.

The navigational constraint augmentation factor may also relate to other aspects of the host vehicle. For example, in some situations, the navigational constraint augmentation factor may include a detected failure or partial failure of a system or sensor associate with the host vehicle. Such an augmentation factor may include, for example, detection of failure or partial failure of a speed sensor, GPS receiver, accelerometer, camera, radar, lidar, brakes, tires, or any other system associated with the host vehicle that may impact the ability of the host vehicle to navigate relative to navigational constraints associated with a navigational state of the host vehicle.

Where the presence of a navigational constraint augmentation factor is identified (e.g., at step 1507), a second navigational constraint may be determined or developed in response to detection of the constraint augmentation factor. This second navigational constraint may be different from the first navigational constraint and may include at least one characteristic augmented with respect to the first navigational constraint. The second navigational constraint may be more restrictive than the first navigational constraint, because detection of a constraint augmentation factor in the environment of the host vehicle or associated with the host vehicle may suggest that the host vehicle may have at least one navigational capability reduced with respect to normal operating conditions. Such reduced capabilities may include lowered road traction (e.g., ice, snow, or water on a roadway; reduced tire pressure; etc.); impaired vision (e.g., rain, snow, dust, smoke, fog etc. that reduces captured image quality); impaired detection capability (e.g., sensor failure or partial failure, reduced sensor performance, etc.), or any other reduction in capability of the host vehicle to navigate in response to a detected navigational state.

Where at least one constraint augmentation factor is detected at step 1507, and at least one constraint has been augmented in step 1509, a navigational action for the host vehicle may be determined at step 1511. The navigational action for the host vehicle may be based on the identified navigational state and may satisfy the second navigational (i.e., augmented) constraint. The navigational action may be implemented at step 1513 by causing at least one adjustment of a navigational actuator of the host vehicle in response to the determined navigational action.

As discussed, the usage of navigational constraints and augmented navigational constraints may be employed with navigational systems that are trained (e.g., through machine learning) or untrained (e.g., systems programmed to respond with predetermined actions in response to specific navigational states). Where trained navigational systems are used, the availability of augmented navigational constraints for certain navigational situations may represent a mode switching from a trained system response to an untrained system response. For example, a trained navigational network may determine an original navigational action for the host vehicle, based on the first navigational constraint. The action taken by the vehicle, however, may be one that is different from the navigational action satisfying the first navigational constraint. Rather, the action taken may satisfy the augmented second navigational constraint and may be an action developed by a non-trained system (e.g., as a response to detection of a particular condition in the environment of the host vehicle, such as the presence of a navigational constraint augmented factor).

There are many examples of navigational constraints that may be generated, supplemented, or augmented in response to detection in the environment of the host vehicle of a constraint augmentation factor. For example, where a predefined navigational constraint includes a buffer zone associated with a detected pedestrian, object, vehicle, etc., and at least a portion of the buffer zone extends a distance from the detected pedestrian/object/vehicle, an augmented navigational constraint (either newly developed, called up from memory from a predetermined set, or generated as an augmented version of a preexisting constraint) may include a different or modified buffer zone. For example, the different or modified buffer zone may have a distance relative to the pedestrian/object/vehicle that is greater than the original or unmodified buffer zone relative to the detected pedestrian/object/vehicle. As a result, in view of the augmented constraint, the host vehicle may be forced to navigate further from the detected pedestrian/object/vehicle, where an appropriate constraint augmentation factor is detected in the environment of the host vehicle or relative to the host vehicle.

The at least one augmented characteristic may also include other types of modifications in navigational constraint characteristics. For example, the augmented characteristic may include a decrease in speed associated with at least one predefined navigational constraint. The augmented characteristic may also include a decrease in a maximum allowable deceleration/acceleration associated with at least one predefined navigational constraint.

Navigation Based on Long Range Planning

In some embodiments, the disclosed navigational system can respond not only to a detected navigational state in an environment of the host vehicle, but may also determine one or more navigational actions based on long range planning. For example, the system may consider the potential impact on future navigational states of one or more navigational actions available as options for navigating with respect to a detected navigational state. Considering the effects of available actions on future states may enable the navigational system to determine navigational actions based not just upon a currently detected navigational state, but also based upon long range planning. Navigation using long range planning techniques may be especially applicable where one or more reward functions are employed by the navigation system as a technique for selecting navigational actions from among available options. Potential rewards may be analyzed with respect to the available navigational actions that may be taken in response to a detected, current navigational state of the host vehicle. Further, however, the potential rewards may also be analyzed relative to actions that may be taken in response to future navigational states projected to result from the available actions to a current navigational state. As a result, the disclosed navigational system may, in some cases, select a navigational action in response to a detected navigational state even where the selected navigational action may not yield the highest reward from among the available actions that may be taken in response to the current navigational state. This may be especially true where the system determines that the selected action may result in a future navigational state giving rise to one or more potential navigational actions offering higher rewards than the selected action or, in some cases, any of the actions available relative to a current navigational state. The principle may be expressed more simply as taking a less favorable action now in order to produce higher reward options in the future. Thus, the disclosed navigational system capable of long range planning may choose a suboptimal short term action where long term prediction indicates that a short term loss in reward may result in long term reward gains.

In general, autonomous driving applications may involve a series of planning problems, where the navigational system may decide on immediate actions in order to optimize a longer term objective. For example, when a vehicle is confronted with a merge situation at a roundabout, the navigational system may decide on an immediate acceleration or braking command in order to initiate navigation into the roundabout. While the immediate action to the detected navigational state at the roundabout may involve an acceleration or braking command responsive to the detected state, the long term objective is a successful merge, and the long term effect of the selected command is the success/failure of the merge. The planning problem may be addressed by decomposing the problem into two phases. First, supervised learning may be applied for predicting the near future based on the present (assuming the predictor will be differentiable with respect to the representation of the present). Second, a full trajectory of the agent may be modeled using a recurrent neural network, where unexplained factors are modeled as (additive) input nodes. This may allow solutions to the long-term planning problem to be determined using supervised learning techniques and direct optimization over the recurrent neural network. Such an approach may also enable the learning of robust policies by incorporating adversarial elements to the environment.

Two of the most fundamental elements of autonomous driving systems are sensing and planning. Sensing deals with finding a compact representation of the present state of the environment, while planning deals with deciding on what actions to take so as to optimize future objectives. Supervised machine learning techniques are useful for solving sensing problems. Machine learning algorithmic frameworks may also be used for the planning part, especially reinforcement learning (RL) frameworks, such as those described above.

RL may be performed in a sequence of consecutive rounds. At round t, the planner (a.k.a. the agent or driving policy module 803) may observe a state, $s_t \in S$, which represents the agent as well as the environment. It then should decide on an action $a_t \in A$. After performing the action, the agent receives an immediate reward, $r_t \in \mathbb{R}$, and is moved to a new state, $s_{t+1}$. As an example, the host vehicle may include an adaptive cruise control (ACC) system, in which the vehicle should autonomously implement acceleration/braking so as to keep an adequate distance to a preceding vehicle while maintaining smooth driving. The state can be modeled as a pair, $s_t=(x_t, v_t) \in \mathbb{R}^2$, where $x_t$ is the distance to the preceding vehicle and $v_t$ is the velocity of the host vehicle relative to the velocity of the preceding vehicle. The action $a_t \in \mathbb{R}$ will be the acceleration command (where the host vehicle slows down if $a_t<0$). The reward can be a function that depends on $|a_t|$ (reflecting the smoothness of driving) and on $s_t$ (reflecting that the host vehicle maintains a safe distance from the preceding vehicle). The goal of the planner is to maximize the cumulative reward (may be up to a time horizon or a discounted sum of future rewards). To do so, the planner may rely on a policy, $\pi: S \rightarrow A$, which maps a state into an action.

Supervised Learning (SL) can be viewed as a special case of RL, in which $s_t$ is sampled from some distribution over S, and the reward function may have the form $r_t=-l(a_t, y_t)$, where l is a loss function, and the learner observes the value of $y_t$ which is the (possibly noisy) value of the optimal action to take when viewing the state $s_t$. There may be several differences between a general RL model and a specific case of SL, and these differences can make the general RL problem more challenging.

In some SL situations, the actions (or predictions) taken by the learner may have no effect on the environment. In other words, $s_{t+1}$ and $a_t$ are independent. This can have two important implications. First, in SL, a sample $(s_1, y_1), \ldots, (s_m, y_m)$ can be collected in advance, and only then can the search begin for a policy (or predictor) that will have good accuracy relative to the sample. In contrast, in RL, the state $s_{t+1}$ usually depends on the action taken (and also on the previous state), which in turn depends on the policy used to generate the action. This ties the data generation process to the policy learning process. Second, because actions do not affect the environment in SL, the contribution of the choice of $a_t$ to the performance of $\pi$ is local. Specifically, $a_t$ only affects the value of the immediate reward. In contrast, in RL, actions that are taken at round t might have a long-term effect on the reward values in future rounds.

In SL, the knowledge of the "correct" answer, $y_t$, together with the shape of the reward, $r_t=-l(a_t, y_t)$ may provide full knowledge of the reward for all possible choices of $a_t$, which may enable calculation of the derivative of the reward with respect to $a_t$. In contrast, in RL, a "one-shot" value of the reward may be all that can be observed for a specific choice of action taken. This may be referred to as a "bandit" feedback. This is one of the most significant reasons for the need of "exploration" as a part of long term navigational planning, because in RL-based systems, if only "bandit" feedback is available, the system may not always know if the action taken was the best action to take.

Many RL algorithms rely, at least in part, on the mathematically elegant model of a Markov Decision Process (MDP). The Markovian assumption is that the distribution of $s_{t+1}$ is fully determined given $s_t$ and $a_t$. This yields a closed form expression for the cumulative reward of a given policy in terms of the stationary distribution over states of the MDP. The stationary distribution of a policy can be expressed as a solution to a linear programming problem. This yields two families of algorithms: 1) optimization with respect to the primal problem, which may be referred to as policy search, and 2) optimization with respect to a dual problem, whose variables are called the value function, $V^\pi$. The value function determines the expected cumulative reward if the MDP begins from the initial state, s, and from there actions are chosen according to $\pi$. A related quantity is the state-action value function, $Q^\pi(s, a)$, which determines the cumulative reward assuming a start from state, s, an immediately chosen action a, and from there on actions chosen according to $\pi$. The Q function may give rise to a characterization of the optimal policy (using the Bellman's equation). In particular, the Q function may show that the optimal policy is a deterministic function from S to A (in fact, it may be characterized as a "greedy" policy with respect to the optimal Q function).

One potential advantage of the MDP model is that it allows coupling of the future into the present using the Q function. For example, given that a host vehicle is now in state, s, the value of $Q^\pi(s, a)$ may indicate the effect of performing action a on the future. Therefore, the Q function may provide a local measure of the quality of an action a, thus making the RL problem more similar to a SL scenario.

Many RL algorithms approximate the V function or the Q function in one way or another. Value iteration algorithms, e.g., the Q learning algorithm, may rely on the fact that the V and Q functions of the optimal policy may be fixed points of some operators derived from Bellman's equation. Actor-critic policy iteration algorithms aim to learn a policy in an iterative way, where at iteration t, the "critic" estimates $Q^{\pi_t}$ and based on this estimate, the "actor" improves the policy.

Despite the mathematical elegancy of MDPs and the convenience of switching to the Q function representation, this approach may have several limitations. For example, an approximate notion of a Markovian behaving state may be all that can be found in some cases. Furthermore, the transition of states may depend not only on the agent's action, but also on actions of other players in the environment. For example, in the ACC example mentioned above, while the dynamic of the autonomous vehicle may be Markovian, the next state may depend on the behavior of the driver of the other car, which is not necessarily Markovian. One possible solution to this problem is to use partially observed MDPs, in which it is assumed that there is a Markovian state, but an observation that is distributed according to the hidden state is what can be seen.

A more direct approach may consider game theoretical generalizations of MDPs (e.g., the Stochastic Games framework). Indeed, algorithms for MDPs may be generalized to multi-agents games (e.g., minimax-Q learning or Nash-Q learning). Other approaches may include explicit modeling of the other players and vanishing regret learning algorithms. Learning in a multi-agent setting may be more complex than in a single agent setting.

A second limitation of the Q function representation may arise by departing from a tabular setting. The tabular setting is when the number of states and actions is small, and therefore, Q can be expressed as a table with |S| rows and |A| columns. However, if the natural representation of S and A includes Euclidean spaces, and the state and action spaces are discretized, the number of states/actions may be exponential in the dimension. In such cases, it may not be practical to employ a tabular setting. Instead, the Q function may be approximated by some function from a parametric hypothesis class (e.g., neural networks of a certain architecture). For example, a deep-Q-network (DQN) learning algorithm may be used. In DQN, the state space can be continuous, but the action space may remain a small discrete set. There may be approaches for dealing with continuous action spaces, but they may rely on approximating the Q function. In any case, the Q function may be complicated and sensitive to noise, and, therefore, may be challenging to learn.

A different approach may be to address the RL problem using a recurrent neural network (RNN). In some cases, RNN may be combined with the notions of multi-agents games and robustness to adversarial environments from game theory. Further, this approach may be one that does not explicitly rely on any Markovian assumption.

The following describes in more detail an approach for navigation by planning based on prediction. In this approach, it may be assumed that the state space, S, is a subset of $\mathbb{R}^d$, and the action space, A, is a subset of $\mathbb{R}^k$. This may be a natural representation in many applications. As noted above, there may be two key differences between RL and SL: (1) because past actions affect future rewards, information from the future may need to be propagated back to the past; and (2) the "bandit" nature of rewards can blur the dependence between (state, action) and reward, which can complicate the learning process.

As a first step in the approach, an observation may be made that there are interesting problems in which the bandit nature of rewards is not an issue. For example, reward value (as will be discussed in more detail below) for the ACC application may be differentiable with respect to the current state and action. In fact, even if the reward is given in a "bandit" manner, the problem of learning a differentiable function, $\hat{r}(s, a)$, such that $\hat{r}(s_t, a_t) \approx r_t$, may be a relatively straightforward SL problem (e.g., a one dimensional regression problem). Therefore, the first step of the approach may be to either define the reward as a function, $\hat{r}(s, a)$, which is differentiable with respect to s and a, or to use a regression learning algorithm in order to learn a differentiable function, $\hat{r}$, that minimizes at least some regression loss over a sample with instance vector being $(s_t, a_t) \in \mathbb{R}^d \times \mathbb{R}^k$ and target scalar being $r_t$. In some situations, in order to create a training set, elements of exploration may be used.

To address the connection between past and future, a similar idea may be used. For example, suppose a differentiable function $\hat{N}(s, a)$ can be learned such that $\hat{N}(s_t, a_t) \approx s_{t+1}$. Learning such a function may be characterized as an SL problem. $\hat{N}$ may be viewed as a predictor for the near future. Next, a policy that maps from S to A may be described using a parametric function $\pi_\theta: S \to A$. Expressing $\pi_\theta$ as a neural network, may enable expression of an episode of running the agent for T rounds using a recurrent neural network (RNN), where the next state is defined as $s_{t+1} = \hat{N}(s_t, a_t) + v_t$. Here, $v_t \in \mathbb{R}^d$ may be defined by the environment and may express unpredictable aspects of the near future. The fact that $s_{t+1}$ depends on $s_t$ and $a_t$ in a differentiable manner may enable a connection between future reward values and past actions. A parameter vector of the policy function, $\pi_\theta$, may be learned by back-propagation over the resulting RNN. Note that explicit probabilistic assumptions need not be imposed on $v_t$. In particular, there need not be a requirement for a Markovian relation. Instead, the recurrent network may be relied upon to propagate "enough" information between past and future. Intuitively, $\hat{N}(s_t, a_t)$ may describe the predictable part of the near future, while $v_t$ may express the unpredictable aspects, which may arise due to the behavior of other players in the environment. The learning system should learn a policy that will be robust to the behavior of other players. If $\|v_t\|$ is large, the connection between past actions and future reward values may be too noisy for learning a meaningful policy. Explicitly expressing the dynamic of the system in a transparent way may enable incorporation of prior knowledge more easily. For example, prior knowledge may simplify the problem of defining $\hat{N}$.

As discussed above, the learning system may benefit from robustness relative to an adversarial environment, such as the environment of a host vehicle, which may include multiple other drivers that may act in unexpected way. In a model that does not impose probabilistic assumptions on $v_t$, environments may be considered in which $v_t$ is chosen in an adversarial manner. In some cases, restrictions may be placed on $\mu_t$, otherwise the adversary can make the planning problem difficult or even impossible. One natural restriction may be to require that $\|\mu_t\|$ is bounded by a constant.

Robustness against adversarial environments may be useful in autonomous driving applications. Choosing $\mu_t$ in an adversarial way may even speed up the learning process, as it can focus the learning system toward a robust optimal policy. A simple game may be used to illustrate this concept. The state is $s_t \in \mathbb{R}$, the action is $a_t \in \mathbb{R}$, and the immediate loss function is $0.1|a_t| + [|s_t| - 2]_+$, where $[x]_+ = \max\{x, 0\}$ is the ReLU (rectified linear unit) function. The next state is $s_{t+1} = s_t + a_t + v_t$, where $v_t \in [-0.5, 0.5]$ is chosen for the environment in an adversarial manner. Here, the optimal policy may be written as a two layer network with ReLU: $a_t = -[s_t - 1.5]_+ + [-s_t - 1.5]_+$. Observe that when $|s_t| \in (1.5, 2)$, the optimal action may have a larger immediate loss than the action a=0. Therefore, the system may plan for the future and may not rely solely on the immediate loss. Observe that the derivative of the loss with respect to $a_t$ is $0.1\mathrm{sign}(a_t)$, and the derivative with respect to $s_t$ is $1[|s_t| > 2]\mathrm{sign}(s_t)$. In a situation in which $s_t \in (1.5, 2)$, the adversarial choice of $v_t$ would be to set $v_t = 0.5$ and, therefore, there may be a non-zero loss on round t+1, whenever $a_t > 1.5 - s_t$. In such cases, the derivative of the loss may back-propagate directly to $a_t$. Thus, the adversarial choice of $v_t$ may help the navigational system obtain a non-zero back-propagation message in cases for which the choice of $a_t$ is sub-optimal. Such a relationship may aid the navigational system in selecting present actions based on an expectation that such a present action (even if that action would result in a suboptimal reward or even a loss) will provide opportunities in the future for more optimal actions that result in higher rewards.

Such an approach may be applied to virtually any navigational situation that may arise. The following describes the approach applied to one example: adaptive cruise control (ACC). In the ACC problem, the host vehicle may attempt to maintain an adequate distance to a target vehicle ahead (e.g., 1.5 seconds to the target car). Another goal may be to drive as smooth as possible while maintaining the desired gap. A model representing this situation may be defined as follows. The state space is $\mathbb{R}^3$, and the action space is $\mathbb{R}$. The first coordinate of the state is the speed of the target car, the second coordinate is the speed of the host vehicle, and the last coordinate is the distance between the host vehicle and target vehicle (e.g., location of the host vehicle minus the location of the target along the road curve). The action to be taken by the host vehicle is the acceleration, and may be denoted by $a_t$. The quantity $\tau$ may denote the difference in time between consecutive rounds. While $\tau$ may be set to any suitable quantity, in one example, $\tau$ may be 0.1 seconds. Position, $s_t$, may be denoted as $s_t=(v_t^{target}, v_t^{host}, x_t)$, and the (unknown) acceleration of the target vehicle may be denoted as $a_t^{target}$.

The full dynamics of the system can be described by:

$$v_t^{target}=[v_{t-1}^{target}+\tau a_{t-1}^{target}]_+$$

$$v_t^{host}=[v_{t-1}^{host}+\tau a_{t-1}]_+$$

$$x_t=[x_{t-1}+\tau(v_{t-1}^{target}-v_{t-1}^{host})]_+$$

This can be described as a sum of two vectors:

$$s_t = ([s_{t-1}[0] + \tau a_{t-1}^{target}]_+, [s_{t-1}[1] + \tau a_{t-1}]_+,$$
$$[s_{t-1}[2] + \tau(s_{t-1}[0] - s_{t-1}[1])]_+)$$
$$= \underbrace{(s_{t-1}[0], [s_{t-1}[1] + \tau a_{t-1}]_+, [s_{t-1}[2] + \tau(s_{t-1}[0] - s_{t-1}[1])]_+)}_{\hat{N}(s_{t-1}, a_t)} +$$
$$\underbrace{([s_{t-1}[0] + \tau a_{t-1}^{target}]_+ - s_{t-1}[0], 0, 0)}_{v_t}$$

The first vector is the predictable part, and the second vector is the unpredictable part. The reward on round t is defined as follows:

$$-r_t=0.1|a_t|+[|x_t/x^*_t-1|-0.3]_+ \text{ where } x^*_t=\max\{1, 1.5v_t^{host}\}$$

The first term may result in a penalty for non-zero accelerations, thus encouraging smooth driving. The second term depends on the ratio between the distance to the target car, $x_t$, and the desired distance, $x^*_t$, which is defined as the maximum between a distance of 1 meter and break distance of 1.5 seconds. In some cases, this ratio may be exactly 1, but as long as this ratio is within [0.7, 1.3], the policy may forego any penalties, which may allow the host vehicle some slack in navigation—a characteristic that may be important in achieving a smooth drive.

Implementing the approach outlined above, the navigation system of the host vehicle (e.g., through operation of driving policy module 803 within processing unit 110 of the navigation system) may select an action in response to an observed state. The selected action may be based on analysis not only of rewards associated with the responsive actions available relative to a sensed navigational state, but may also be based on consideration and analysis of future states, potential actions in response to the futures states, and rewards associated with the potential actions.

Figure 16:
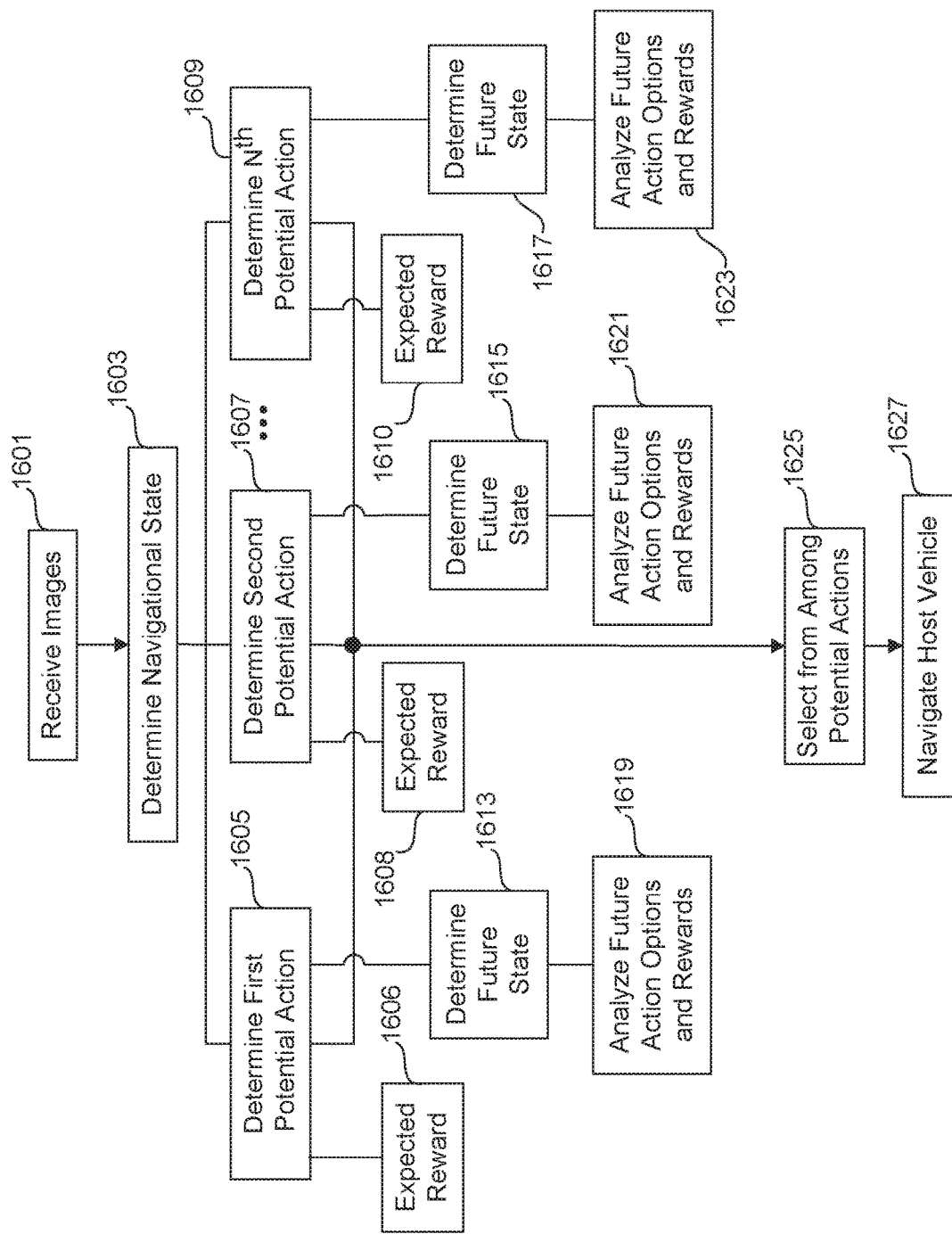
FIG. 16 provides an algorithmic flow chart for navigating a vehicle consistent with the disclosed embodiments.

FIG. 16 illustrates an algorithmic approach to navigation based on detection and long range planning. For example, at step 1601, the at least one processing device 110 of the navigation system for the host vehicle may receive a plurality of images. These images may capture scenes representative of an environment of the host vehicle and may be supplied by any of the image capture devices (e.g., cameras, sensors, etc.) described above. Analysis of one or more of these images at step 1603 may enable the at least one processing device 110 to identify a present navigational state associated with the host vehicle (as described above).

At steps 1605, 1607, and 1609, various potential navigational actions responsive to the sensed navigational state may be determined. These potential navigational actions (e.g., a first navigational action through an $N^{th}$ available navigational action) may be determined based on the sensed state and the long range goals of the navigational system (e.g., to complete a merge, follow a lead vehicle smoothly, pass a target vehicle, avoid an object in the roadway, slow for a detected stop sign, avoid a target vehicle cutting in, or any other navigational action that may advance the navigational goals of the system).

For each of the determined potential navigational actions, the system may determine an expected reward. The expected reward may be determined according to any of the techniques described above and may include analysis of a particular potential action relative to one or more reward functions. Expected rewards 1606, 1608, and 1610 may be determined for each of the potential navigational actions (e.g., the first, second, and $N^{th}$) determined in steps 1605, 1607, and 1609, respectively.

In some cases, the navigational system of the host vehicle may select from among the available potential actions based on values associated with expected rewards 1606, 1608, and 1610 (or any other type of indicator of an expected reward). For example, in some situations, the action that yields the highest expected reward may be selected.

In other cases, especially where the navigation system engages in long range planning to determine navigational actions for the host vehicle, the system may not choose the potential action that yields the highest expected reward. Rather, the system may look to the future to analyze whether there may be opportunities for realizing higher rewards later if lower reward actions are selected in response to a current navigational state. For example, for any or all of the potential actions determined at steps 1605, 1607, and 1609, a future state may be determined. Each future state, determined at steps 1613, 1615, and 1617, may represent a future navigational state expected to result based on the current navigational state as modified by a respective potential action (e.g., the potential actions determined at steps 1605, 1607, and 1609).

For each of the future states predicted at steps 1613, 1615, and 1617, one or more future actions (as navigational options available in response to determined future state) may be determined and evaluated. At steps 1619, 1621, and 1623, for example, values or any other type of indicator of expected rewards associated with one or more of the future actions may be developed (e.g., based on one or more reward functions). The expected rewards associated with the one or more future actions may be evaluated by comparing values of reward functions associated with each future action or by comparing any other indicators associated with the expected rewards.

At step 1625, the navigational system for the host vehicle may select a navigational action for the host vehicle based on a comparison of expected rewards, not just based on the potential actions identified relative to a current navigational state (e.g., at steps 1605, 1607, and 1609), but also based on expected rewards determined as a result of potential future actions available in response to predicted future states (e.g., determined at steps 1613, 1615, and 1617). The selection at step 1625 may be based on the options and rewards analysis performed at steps 1619, 1621, and 1623.

The selection of a navigational action at step 1625 may be based on a comparison of expected rewards associated with future action options only. In such a case, the navigational system may select an action to the current state based solely on a comparison of expected rewards resulting from actions to potential future navigational states. For example, the system may select the potential action identified at step 1605, 1607, or 1609 that is associated with a highest future reward value as determined through analysis at steps 1619, 1621, and 1623.

The selection of a navigational action at step 1625 may also be based on comparison of current action options only (as noted above). In this situation, the navigational system may select the potential action identified at step 1605, 1607, or 1609 that is associated with a highest expected reward, 1606, 1608, or 1610. Such a selection may be performed with little or no consideration of future navigational states or future expected rewards to navigational actions available in response to expected future navigational states.

On the other hand, in some cases, the selection of a navigational action at step 1625 may be based on a comparison of expected rewards associated with both future action options and with current action options. This, in fact, may be one of the principles of navigation based on long range planning. For example, expected rewards to future actions may be analyzed to determine if any may warrant a selection of a lower reward action in response to the current navigational state in order to achieve a potential higher reward in response to a subsequent navigational action expected to be available in response to future navigational states. As an example, a value or other indicator of an expected reward 1606 may indicate a highest expected reward from among rewards 1606, 1608, and 1610. On the other hand, expected reward 1608 may indicate a lowest expected reward from among rewards 1606, 1608, and 1610. Rather than simply selecting the potential action determined at step 1605 (i.e., the action giving rise to the highest expected reward 1606), analysis of future states, potential future actions, and future rewards may be used in making a navigational action selection at step 1625. In one example, it may be determined that a reward identified at step 1621 (in response to at least one future action to a future state determined at step 1615 based on the second potential action determined at step 1607) may be higher than expected reward 1606. Based on this comparison, the second potential action determined at step 1607 may be selected rather than the first potential action determined at step 1605 despite expected reward 1606 being higher than expected reward 1608. In one example, the potential navigational action determined at step 1605 may include a merge in front of a detected target vehicle, while the potential navigational action determined at step 1607 may include a merge behind the target vehicle. While the expected reward 1606 of merging in front of the target vehicle may be higher than the expected reward 1608 associated with merging behind the target vehicle, it may be determined that merging behind the target vehicle may result in a future state for which there may be action options yielding even higher potential rewards than expected reward 1606, 1608, or other rewards based on available actions in response to a current, sensed navigational state.

Selection from among potential actions at step 1625 may be based on any suitable comparison of expected rewards (or any other metric or indicator of benefits associated with one potential action over another). In some cases, as described above, a second potential action may be selected over a first potential action if the second potential action is projected to provide at least one future action associated with an expected reward higher than a reward associated with the first potential action. In other cases, more complex comparisons may be employed. For example, rewards associated with action options in response to projected future states may be compared to more than one expected reward associated with a determined potential action.

In some scenarios, actions and expected rewards based on projected future states may affect selection of a potential action to a current state if at least one of the future actions is expected to yield a reward higher than any of the rewards expected as a result of the potential actions to a current state (e.g., expected rewards 1606, 1608, 1610, etc.). In some cases, the future action option that yields the highest expected reward (e.g., from among the expected rewards associated with potential actions to a sensed current state as well as from among expected rewards associated with potential future action options relative to potential future navigational states) may be used as a guide for selection of a potential action to a current navigational state. That is, after identifying a future action option yielding the highest expected reward (or a reward above a predetermined threshold, etc.), the potential action that would lead to the future state associated with the identified future action yielding the highest expected reward may be selected at step 1625.

In other cases, selection of available actions may be made based on determined differences between expected rewards. For example, a second potential action determined at step 1607 may be selected if a difference between an expected reward associated with a future action determined at step 1621 and expected reward 1606 is greater than a difference between expected reward 1608 and expected reward 1606 (assuming+sign differences). In another example, a second potential action determined at step 1607 may be selected if a difference between an expected reward associated with a future action determined at step 1621 and an expected reward associated with a future action determined at step 1619 is greater than a difference between expected reward 1608 and expected reward 1606.

Several examples have been described for selecting from among potential actions to a current navigational state. Any other suitable comparison technique or criteria, however, may be used for selecting an available action through long range planning based on action and reward analysis extending to projected future states. Additionally, while FIG. 16 represents two layers in the long range planning analysis (e.g., a first layer considering the rewards resulting from potential actions to a current state, and a second layer considering the rewards resulting from future action options in response to projected future states), analysis based on more layers may be possible. For example, rather than basing the long range planning analysis upon one or two layers, three, four or more layers of analysis could be used in selecting from among available potential actions in response to a current navigational state.

After a selection is made from among potential actions in response to a sensed navigational state, at step 1627, the at least one processor may cause at least one adjustment of a navigational actuator of the host vehicle in response to the selected potential navigational action. The navigational actuator may include any suitable device for controlling at least one aspect of the host vehicle. For example, the navigational actuator may include at least one of a steering mechanism, a brake, or an accelerator.

Navigation Based on Inferred Aggression of Others

Target vehicles may be monitored through analysis of an acquired image stream to determine indicators of driving aggression. Aggression is described herein as a qualitative or quantitative parameter, but other characteristics may be used: perceived level of attention (potential impairment of driver, distracted—cell phone, asleep, etc.). In some cases, a target vehicle may be deemed to have a defensive posture, and in some cases, the target vehicle may be determined to have a more aggressive posture. Navigational actions may be selected or developed based on indicators of aggression. For example, in some cases, the relative velocity, relative acceleration, increases in relative acceleration, following distance, etc., relative to a host vehicle may be tracked to determine if the target vehicle is aggressive or defensive. If the target vehicle is determined to have a level of aggression exceeding a threshold, for example, the host vehicle may be inclined to give way to the target vehicle. A level of aggression of the target vehicle may also be discerned based on a determined behavior of the target vehicle relative to one or more obstacles in a path of or in a vicinity of the target vehicle (e.g., a leading vehicle, obstacle in the road, traffic light, etc.).

As an introduction to this concept, an example experiment will be described with respect to a merger of the host vehicle into a roundabout, in which a navigational goal is to pass through and out of the roundabout. The situation may begin with the host vehicle approaches an entrance of the roundabout and may end with the host vehicle reaches an exit of the roundabout (e.g., the second exit). Success may be measured based on whether the host vehicle maintains a safe distance from all other vehicles at all times, whether the host vehicle finishes the route as quickly as possible, and whether the host vehicle adheres to a smooth acceleration policy. In this illustration, $N_T$ target vehicles may be placed at random on the roundabout. To model a blend of adversarial and typical behavior, with probability p, a target vehicle may be modeled by an "aggressive" driving policy, such that the aggressive target vehicle accelerates when the host vehicle attempts to merge in front of the target vehicle. With probability 1−p, the target vehicle may be modeled by a "defensive" driving policy, such that the target vehicle decelerates and lets the host vehicle merge in. In this experiment, p=0.5, and the navigation system of the host vehicle may be provided with no information about the type of the other drivers. The types of other drivers may be chosen at random at the beginning of the episode.

The navigational state may be represented as the velocity and location of the host vehicle (the agent), and the locations, velocities, and accelerations of the target vehicles. Maintaining target acceleration observations may be important in order to differentiate between aggressive and defensive drivers based on the current state. All target vehicles may move on a one-dimensional curve that outlines the roundabout path. The host vehicle may move on its own one-dimensional curve, which intersects the target vehicles' curve at the merging point, and this point is the origin of both curves. To model reasonable driving, the absolute value of all vehicles' accelerations may be upper bounded by a constant. Velocities may also be passed through a ReLU because driving backward is not allowed. Note that by not allowing driving backwards, long-term planning may become a necessity, as the agent cannot regret on its past actions.

Figure 17A:
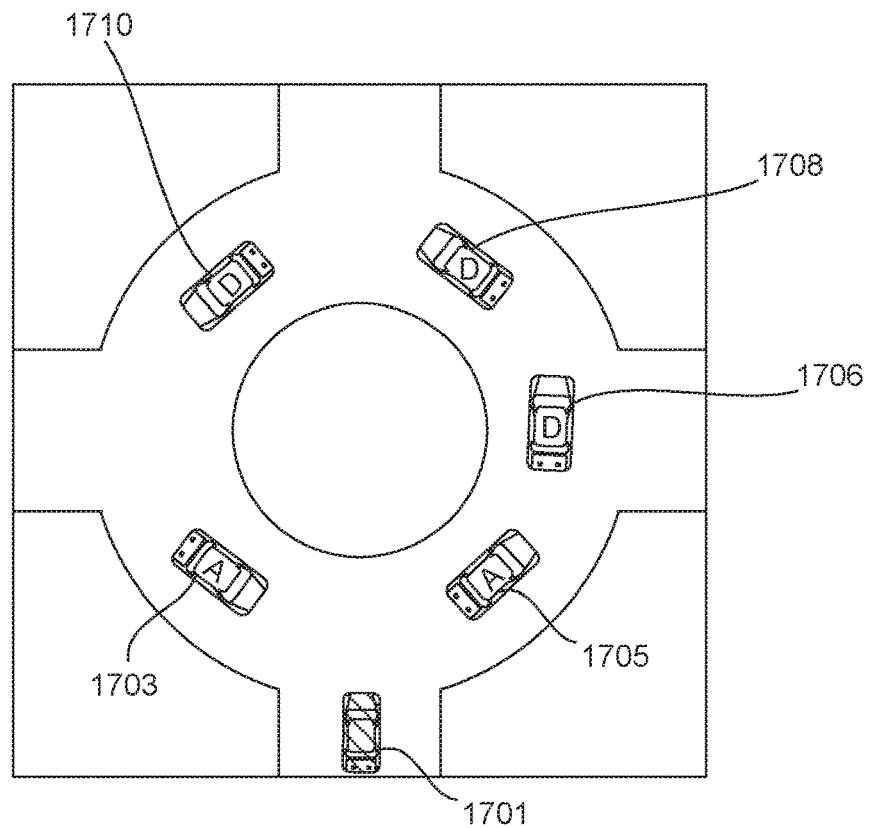
FIGS. 17A and 17B provide a diagrammatic illustration of a host vehicle navigating into a roundabout consistent with the disclosed embodiments.
Figure 17B:
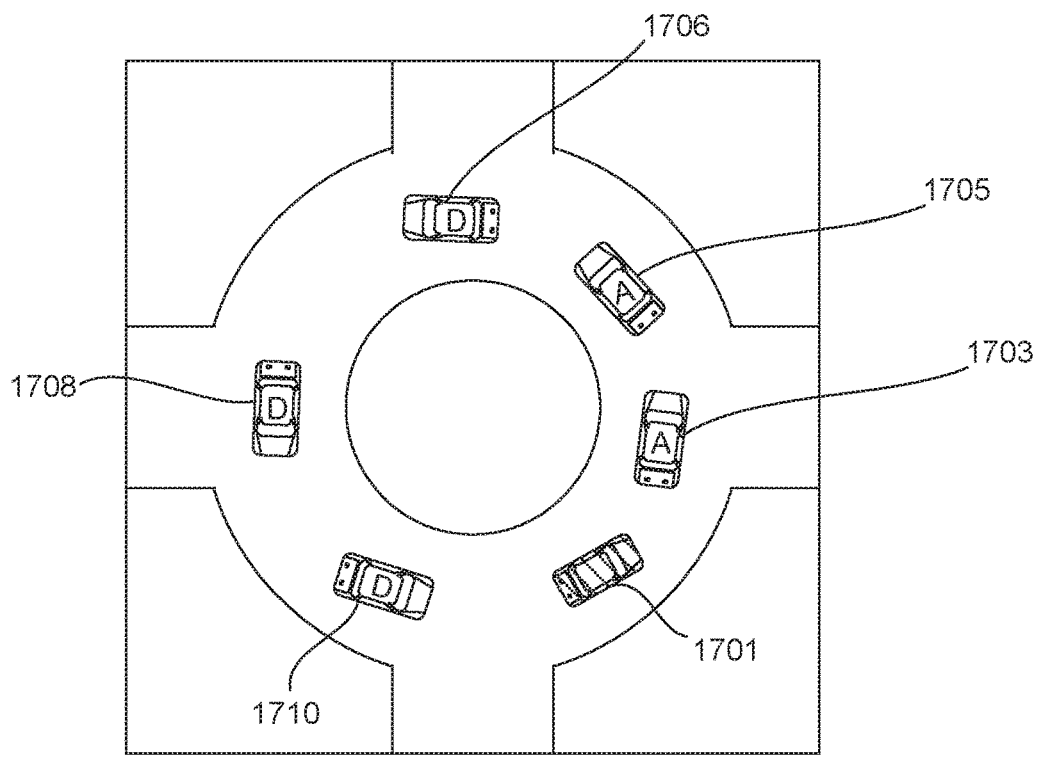

As described above, the next state, $s_{t+1}$, may be decomposed into a sum of a predictable part, $\hat{N}(s_t, a_t)$, and a non-predictable part, $v_t$. The expression, $\hat{N}(s_t, a_t)$, may represent the dynamics of vehicle locations and velocities (which may be well-defined in a differentiable manner), while $v_t$ may represent the target vehicles' acceleration. It may be verified that $\hat{N}(s_t, a_t)$ can be expressed as a combination of ReLU functions over an affine transformation, hence it is differentiable with respect to $s_t$ and $a_t$. The vector $v_t$ may be defined by a simulator in a non-differentiable manner, and may implement aggressive behavior for some targets and defensive behavior for other targets. Two frames from such a simulator are shown in FIGS. 17A and 17B. In this example experiment, a host vehicle 1701 learned to slowdown as it approached the entrance of the roundabout. It also learned to give way to aggressive vehicles (e.g., vehicles 1703 and 1705), and to safely continue when merging in front of defensive vehicles (e.g., vehicles 1706, 1708, and 1710). In the example represented by FIGS. 17A and 17B, the navigation system of host vehicle 1701 is not provided with the type of target vehicles. Rather, whether a particular vehicle is determined to be aggressive or defensive is determined through inference based on observed position and acceleration, for example, of the target vehicles. In FIG. 17A, based on position, velocity, and/or relative acceleration, host vehicle 1701 may determine that vehicle 1703 has an aggressive tendency and, therefore, host vehicle 1701 may stop and wait for target vehicle 1703 to pass rather than attempting to merge in front of target vehicle 1703. In FIG. 17B, however, target vehicle 1701 recognized that the target vehicle 1710 traveling behind vehicle 1703 exhibited defensive tendencies (again, based on observed position, velocity, and/or relative acceleration of vehicle 1710) and, therefore, completed a successful merge in front of target vehicle 1710 and behind target vehicle 1703.

Figure 18:
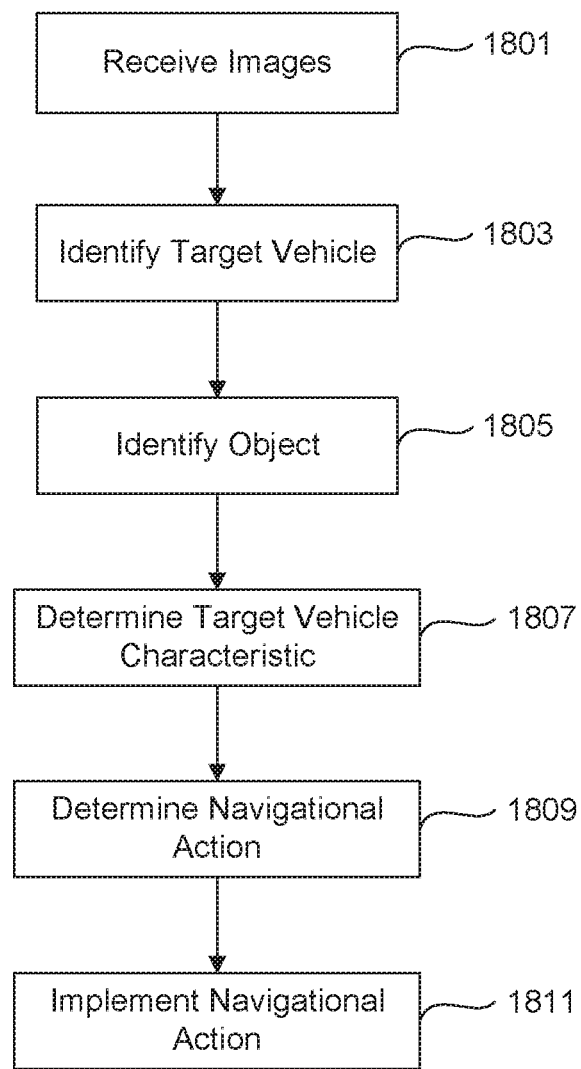
FIG. 18 provides an algorithmic flow chart for navigating a vehicle consistent with the disclosed embodiments.

FIG. 18 provides a flowchart representing an example algorithm for navigating a host vehicle based on predicted aggression of other vehicles. In the example of FIG. 18, a level of aggression associated with at least one target vehicle may be inferred based on observed behavior of the target vehicle relative to an object in the environment of the target vehicle. For example, at step 1801, at least one processing device (e.g., processing device 110) of the host vehicle navigation system may receive, from a camera associated with the host vehicle, a plurality of images representative of an environment of the host vehicle. At step 1803, analysis of one or more of the received images may enable the at least one processor to identify a target vehicle (e.g., vehicle 1703) in the environment of the host vehicle 1701. At step 1805, analysis of one or more of the received images may enable the at least one processing device to identify in the environment of the host vehicle at least one obstacle to the target vehicle. The object may include debris in a roadway, a stoplight/traffic light, a pedestrian, another vehicle (e.g., a vehicle traveling ahead of the target vehicle, a parked vehicle, etc.), a box in the roadway, a road barrier, a curb, or any other type of object that may be encountered in an environment of the host vehicle. At step 1807, analysis of one or more of the received images may enable the at least one processing device to determine at least one navigational characteristic of the target vehicle relative to the at least one identified obstacle to the target vehicle.

Various navigational characteristics may be used to infer a level of aggression of a detected target vehicle in order to develop an appropriate navigational response to the target vehicle. For example, such navigational characteristics may include a relative acceleration between the target vehicle and the at least one identified obstacle, a distance of the target vehicle from the obstacle (e.g., a following distance of the target vehicle behind another vehicle), and/or a relative velocity between the target vehicle and the obstacle, etc.

In some embodiments, the navigational characteristics of the target vehicles may be determined based on outputs from sensors associated with the host vehicle (e.g., radar, speed sensors, GPS, etc.). In some cases, however, the navigational characteristics of the target vehicles may be determined partially or fully based on analysis of images of an environment of the host vehicle. For example, image analysis techniques described above and in, for example, U.S. Pat. No. 9,168,868, which is incorporated herein by reference, may be used to recognize target vehicles within an environment of the host vehicle. And, monitoring a location of a target vehicle in the captured images over time and/or monitoring locations in the captured images of one or more features associated with the target vehicle (e.g., tail lights, head lights, bumper, wheels, etc.) may enable a determination of relative distances, velocities, and/or accelerations between the target vehicles and the host vehicle or between the target vehicles and one or more other objects in an environment of the host vehicle.

An aggression level of an identified target vehicle may be inferred from any suitable observed navigational characteristic of the target vehicle or any combination of observed navigational characteristics. For example, a determination of aggressiveness may be made based on any observed characteristic and one or more predetermined threshold levels or any other suitable qualitative or quantitative analysis. In some embodiments, a target vehicle may be deemed as aggressive if the target vehicle is observed to be following the host vehicle or another vehicle at a distance less than a predetermined aggressive distance threshold. On the other hand, a target vehicle observed to be following the host vehicle or another vehicle at a distance greater than a predetermined defensive distance threshold may be deemed defensive. The predetermined aggressive distance threshold need not be the same as the predetermined defensive distance threshold. Additionally, either or both of the predetermined aggressive distance threshold and the predetermined defensive distance threshold may include a range of values, rather than a bright line value. Further, neither of the predetermined aggressive distance threshold nor the predetermined defensive distance threshold must be fixed. Rather these values, or ranges of values, may shift over time, and different thresholds/ranges of threshold values may be applied based on observed characteristics of a target vehicle. For example, the thresholds applied may depend on one or more other characteristics of the target vehicle. Higher observed relative velocities and/or accelerations may warrant application of larger threshold values/ranges. Conversely, lower relative velocities and/or accelerations, including zero relative velocities and/or accelerations, may warrant application of smaller distance threshold values/ranges in making the aggressive/defensive inference.

The aggressive/defensive inference may also be based on relative velocity and/or relative acceleration thresholds. A target vehicle may be deemed aggressive if its observed relative velocity and/or its relative acceleration with respect to another vehicle exceeds a predetermined level or range. A target vehicle may be deemed defensive if its observed relative velocity and/or its relative acceleration with respect to another vehicle falls below a predetermined level or range.

While the aggressive/defensive determination may be made based on any observed navigational characteristic alone, the determination may also depend on any combination of observed characteristics. For example, as noted above, in some cases, a target vehicle may be deemed aggressive based solely on an observation that it is following another vehicle at a distance below a certain threshold or range. In other cases, however, the target vehicle may be deemed aggressive if it both follows another vehicle at less than a predetermined amount (which may be the same as or different than the threshold applied where the determination is based on distance alone) and has a relative velocity and/or a relative acceleration of greater than a predetermined amount or range. Similarly, a target vehicle may be deemed defensive based solely on an observation that it is following another vehicle at a distance greater than a certain threshold or range. In other cases, however, the target vehicle may be deemed defensive if it both follows another vehicle at greater than a predetermined amount (which may be the same as or different than the threshold applied where the determination is based on distance alone) and has a relative velocity and/or a relative acceleration of less than a predetermined amount or range. System 100 may make an aggressive/defensive if, for example, a vehicle exceeds 0.5 G acceleration or deceleration (e.g., jerk 5 m/s3), a vehicle has a lateral acceleration of 0.5 G in a lane change or on a curve, a vehicle causes another vehicle to do any of the above, a vehicle changes lanes and causes another vehicle to give way by more than 0.3 G deceleration or jerk of 3 m/s3, and/or a vehicle changes two lanes without stopping.

It should be understood that references to a quantity exceeding a range may indicate that the quantity either exceeds all values associated with the range or falls within the range. Similarly, references to a quantity falling below a range may indicate that the quantity either falls below all values associated with the range or falls within the range. Additionally, while the examples described for making an aggressive/defensive inference are described with respect to distance, relative acceleration, and relative velocity, any other suitable quantities may be used. For example, a time to collision may calculation may be used or any indirect indicator of distance, acceleration, and/or velocity of the target vehicle. It should also be noted that while the examples above focus on target vehicles relative to other vehicles, the aggressive/defensive inference may be made by observing the navigational characteristics of a target vehicle relative to any other type of obstacle (e.g., a pedestrian, road barrier, traffic light, debris, etc.).

Returning to the example shown in FIGS. 17A and 17B, as host vehicle 1701 approaches the roundabout, the navigation system, including its at least one processing device, may receive a stream of images from a camera associated with the host vehicle. Based on analysis of one or more of the received images, any of target vehicles 1703, 1705, 1706, 1708, and 1710 may be identified. Further, the navigation system may analyze the navigational characteristics of one or more of the identified target vehicles. The navigation system may recognize that the gap between target vehicles 1703 and 1705 represents the first opportunity for a potential merge into the roundabout. The navigation system may analyze target vehicle 1703 to determine indicators of aggression associated with target vehicle 1703. If target vehicle 1703 is deemed aggressive, then the host vehicle navigation system may choose to give way to vehicle 1703 rather than merging in front of vehicle 1703. On the other hand, if target vehicle 1703 is deemed defensive, then the host vehicle navigation system may attempt to complete a merge action ahead of vehicle 1703.

As host vehicle 1701 approaches the roundabout, the at least one processing device of the navigation system may analyze the captured images to determine navigational characteristics associated with target vehicle 1703. For example, based on the images, it may be determined that vehicle 1703 is following vehicle 1705 at a distance that provides a sufficient gap for the host vehicle 1701 to safely enter. Indeed, it may be determined that vehicle 1703 is following vehicle 1705 by a distance that exceeds an aggressive distance threshold, and therefore, based on this information, the host vehicle navigation system may be inclined to identify target vehicle 1703 as defensive. In some situations, however, more than one navigational characteristic of a target vehicle may be analyzed in making the aggressive/defensive determination, as discussed above. Furthering the analysis, the host vehicle navigation system may determine that, while target vehicle 1703 is following at a non-aggressive distance behind target vehicle 1705, vehicle 1703 has a relative velocity and/or a relative acceleration with respect to vehicle 1705 that exceeds one or more thresholds associated with aggressive behavior. Indeed, host vehicle 1701 may determine that target vehicle 1703 is accelerating relative to vehicle 1705 and closing the gap that exists between vehicles 1703 and 1705. Based on further analysis of the relative velocity, acceleration, and distance (and even a rate that the gap between vehicles 1703 and 1705 is closing), host vehicle 1701 may determine that target vehicle 1703 is behaving aggressively. Thus, while there may be a sufficient gap into which host vehicle may safely navigate, host vehicle 1701 may expect that a merge in front of target vehicle 1703 would result in an aggressively navigating vehicle directly behind the host vehicle. Further, target vehicle 1703 may be expected, based on the observed behavior through image analysis or other sensor output, that target vehicle 1703 would continue accelerating toward host vehicle 1701 or continuing toward host vehicle 1701 at a non-zero relative velocity if host vehicle 1701 was to merge in front of vehicle 1703. Such a situation may be undesirable from a safety perspective and may also result in discomfort to passengers of the host vehicle. For such reasons, host vehicle 1701 may choose to give way to vehicle 1703, as shown in FIG. 17B, and merge into the roundabout behind vehicle 1703 and in front of vehicle 1710, deemed defensive based on analysis of one or more of its navigational characteristics.

Returning to FIG. 18, at step 1809, the at least one processing device of the navigation system of the host vehicle may determine, based on the identified at least one navigational characteristic of the target vehicle relative to the identified obstacle, a navigational action for the host vehicle (e.g., merge in front of vehicle 1710 and behind vehicle 1703). To implement the navigational action (at step 1811), the at least one processing device may cause at least one adjustment of a navigational actuator of the host vehicle in response to the determined navigational action. For example, a brake may be applied in order to give way to vehicle 1703 in FIG. 17A, and an accelerator may be applied along with steering of the wheels of the host vehicle in order to cause the host vehicle to enter the roundabout behind vehicle 1703, as shown if FIG. 17B.

As described in the examples above, navigation of the host vehicle may be based on the navigational characteristics of a target vehicle relative to another vehicle or object. Additionally, navigation of the host vehicle may be based on navigational characteristics of the target vehicle alone without a particular reference to another vehicle or object. For example, at step 1807 of FIG. 18, analysis of a plurality of images captured from an environment of a host vehicle may enable determination of at least one navigational characteristic of an identified target vehicle indicative of a level of aggression associated with the target vehicle. The navigational characteristic may include a velocity, acceleration, etc. that need not be referenced with respect to another object or target vehicle in order to make an aggressive/defensive determination. For example, observed accelerations and/or velocities associated with a target vehicle that exceed a predetermined threshold or fall within or exceed a range of values may indicate aggressive behavior. Conversely, observed accelerations and/or velocities associated with a target vehicle that fall below a predetermined threshold or fall within or exceed a range of values may indicate defensive behavior.

Of course, in some instances the observed navigational characteristic (e.g., a location, distance, acceleration, etc.) may be referenced relative to the host vehicle in order to make the aggressive/defensive determination. For example, an observed navigational characteristic of the target vehicle indicative of a level of aggression associated with the target vehicle may include an increase in relative acceleration between the target vehicle and the host vehicle, a following distance of the target vehicle behind the host vehicle, a relative velocity between the target vehicle and the host vehicle, etc.

Navigation at Alternating Merge Zones

In some embodiments, a navigation system of a host vehicle may analyze an image stream to determine when an alternate merge situation exists (e.g., when two lanes converge on account of a narrowing road or construction, at a traffic circle, at a merge zone, etc.). This may allow the host vehicle to merge safely and without human intervention unlike extant systems.

In such embodiments, the navigation system may track the order at which vehicles from merging traffic flows should proceed. Accordingly, the host vehicle may open a gap ahead to allow a vehicle from the other lane to proceed ahead of the host vehicle. The host vehicle may also proceed to nudge forward assuming that the host vehicle will follow the vehicle allowed into the gap opened ahead of the host vehicle. In another example, the host vehicle may detect a gap ahead and proceed to nudge forward assuming that the host vehicle will fill the gap ahead.

Figure 19:
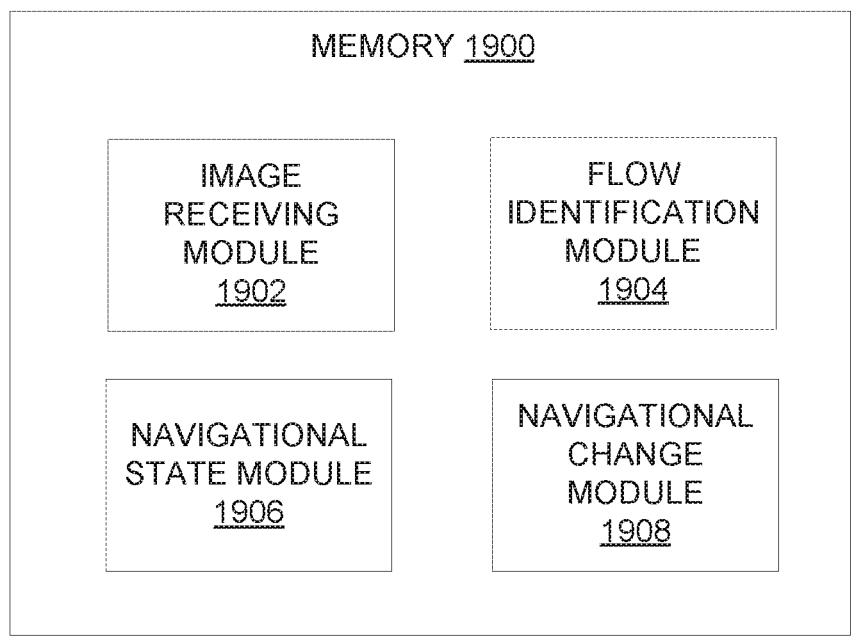
FIG. 19 is an exemplary block diagram of a memory configured to store instructions for navigating at an alternating merge zone consistent with the disclosed embodiments.

FIG. 19 is a block diagram of memory 1900 configured to store instructions for navigating at an alternating merge zone. Although depicted as a single memory in FIG. 19, memory 1900 may comprise one or more non-volatile (e.g., hard disk drive, flash memory, etc.) and/or volatile (e.g., RAM or the like) memories. In some embodiments, memory 1900 may be included in system 100. For example, memory 1900 may comprise, at least in part, a portion of one or more memory units 140, 150.

As depicted in FIG. 19, memory 1900 may include an image receiving module 1902. Image receiving module 1902 may receive, from a camera, a plurality of images representative of an environment of the host vehicle. The plurality of images may be received directly from the camera (e.g., using one or more buses), retrieved from one or more memories storing images from the camera, and/or over one or more computer networks, whether from the camera directly or from one or more memories connected to the network(s).

In some embodiments, module 1902 may receive alternative or additional information from other sensors in the host vehicle. For example, module 1902 may receive information from at least one of a speedometer, a GPS, an accelerometer, a radar, a lidar, a suspension sensor, or the like.

As further depicted in FIG. 19, memory 1900 may include a flow identification module 1904. Flow identification module 1904 may analyze the plurality of images received via image receiving module 1902 to identify a first flow of traffic and a second flow of traffic. For example, flow identification module 1904 may apply one or more image classifiers (optionally cascading classifiers) to identify traffic flows in the plurality of images. The image classifiers may, for example, identify vehicles in addition to a direction of motion of identified vehicles to derive the traffic flows. Additionally or alternatively, the image classifiers may identify one or more road markings (e.g., dashed lines, solid lines, concrete barriers, etc.) as the boundaries of the traffic flows. In addition to or in lieu of the one or more classifiers, flow identification module 1904 may determine an optical flow within a temporal sequence of the plurality of images and determine the flows based thereon. For example, the optical flow may be used to identify one or more vehicles moving on a trajectory, the trajectory then being used to determine a traffic flow.

One or more neural networks may be used in combination with or in lieu of any of the techniques described above. For example, the one or more neural networks may be trained using a training set of images having associated traffic flows and minimizing a loss function associated therewith. The one or more neural networks may continue to be trained using real data. For example, feedback from human drivers may be received and incorporated into the one or more neural networks to improve accuracy. In some embodiments, the training and/or feedback incorporation may be performed remotely from the host vehicle (e.g., on one or more remote servers). Accordingly, the one or more neural networks (as well as updates thereto) may be sent to the host vehicle from the one or more remote servers. Alternatively, the host vehicle may send images to the one or more remote servers for processing on the one or more neural networks.

In some embodiments, the second flow of traffic may include the host vehicle. In such embodiments, flow identification module 1904 may identify the second flow and/or the first flow based, at least in part, on angle. For example, the second flow may be identified as a traffic flow with an angle closest to an angle of 0° ahead of the host vehicle, and the first flow may be identified as a traffic flow at an acute angle ahead of the host vehicle. In embodiments where optical flow is used, flow identification module 1904 may identify the second flow by using an optical flow of the environment to determine the traffic flow in which the host vehicle is traveling. Additionally or alternatively, flow identification module 1904 may identify the second flow based on a historical trajectory of the host vehicle and/or a predicted trajectory of the host vehicle (optionally with feedback from one or more sensors such as a speedometer in addition to the plurality of images).

In embodiments where lidar and/or radar are used in addition to or in lieu of a camera, flow identification module 1904 may analyze output from the lidar and/or the radar to determine the first flow and the second flow. For example, the lidar and/or the radar may output indicators of the locations of identified objects, such as other vehicles and/or road markings. Based on these locations, the first flow and the second flow may be determined. Additionally or alternatively, an optical flow may be determined using a temporal sequence of outputs from the lidar and/or the radar. For example, the optical flow may be used to identify one or more vehicles moving on a trajectory, the trajectory then being used to determine a traffic flow.

As depicted in FIG. 19, memory 1900 may further include a navigational state module 1906. Navigational state module 1906 determine a presence in the environment of the vehicle of at least one navigational state characteristic indicative of an alternating merging of the first flow of traffic and the second flow of traffic into a merged lane. For example, the navigational state characteristic may include a sensed traffic circle, a sensed ending of a lane, traffic congestion and at least one lane merge condition, or the like.

Navigational state module 1906 may use the plurality of images to determine the at least one navigational state characteristic. For example, navigational state module 1906 may use one or more image classifiers to identify road markings, signs, and/or construction barriers (such as cones, barrels, an arrow board, etc.) indicative of merging lanes. In another example, navigational state module 1906 may use one or more image classifiers to identify road boundaries (e.g., curbs, concrete barriers, etc.) and, based on the shape formed by the identified boundaries, determine the presence of a traffic circle. Similarly, navigational state module 1906 may use one or more image classifiers to identify road boundaries (e.g., curbs, concrete barriers, etc.) and road signs; based on the shape formed by the identified boundaries and a lack of road signs, navigational state module 1906 may determine the presence of an uncontrolled intersection. One or more neural networks may be used in combination with or in lieu of any of the techniques described above.

Additionally, in some embodiments, navigational state module 1906 may identify a gap in the first flow of traffic. For example, navigational state module 1906 may use one or more image classifiers to identify vehicles within the first flow of traffic as well as gaps between identified vehicles. Additionally or alternatively, navigational state module 1906 may identify the types of vehicles in the first flow of traffic and determine the gaps based on one or more identified portions of the vehicles along with known information about the identified types. For example, navigational state module 1906 may identify a headlight of a Honda CR-V, identify a headlight of a Chevy Malibu ahead of the Honda CR-V, and, based on a known length of the Chevy Malibu, determine a gap between the Chevy Malibu and the Honda CR-V. One or more neural networks may be used in combination with or in lieu of any of the techniques described above.

Finally, memory 1900 may include a navigational change module 1908. Navigational change module 1908 may cause at least a first navigational change in the host vehicle to allow one target vehicle from the first flow of traffic to proceed ahead of the host vehicle. For example, the first navigational change may include slowing the host vehicle or may include slowing the host vehicle to allow a gap to open between the host vehicle and behind a vehicle ahead of the host vehicle in the second flow of traffic. Alternatively, navigational change module 1908 may cause at least a first navigational change in the host vehicle to proceed towards a gap in front of one target vehicle from the first flow of traffic. For example, the first navigational change may include an acceleration of the host vehicle to proceed towards the gap.

Further, navigational change module 1908 may cause at least a second navigational change in the host vehicle to cause the host vehicle to follow the target vehicle into the merged lane ahead of a second target vehicle from the first flow of traffic. For example, the second navigational change may, for example, include an acceleration of the host vehicle to follow the target vehicle. Alternatively, navigational change module 1908 may cause at least a second navigational change in the host vehicle to cause the host vehicle to follow a second target vehicle ahead of the target vehicle into the merged lane. For example, the first navigational change may include slowing the host vehicle to avoid colliding with the second target vehicle during or after moving into the merged land ahead of the target vehicle.

In embodiments where the host vehicle follows the target vehicle into the merged lane ahead of the second target vehicle, navigational state module 1906 and/or navigational change module 1908 may further monitor the second target vehicle for an indication that the second target vehicle is opening a gap to allow the host vehicle to follow the first target vehicle. Alternatively, in embodiments where the host vehicle follows the second target vehicle ahead of the target vehicle into the merged lane, navigational state module 1906 and/or navigational change module 1908 may further monitor the first target vehicle for an indication that the first target vehicle is allowing the host vehicle to enter a detected gap behind the second target vehicle. Any of the above indications may be determined from the plurality of images. For example, the plurality of images may be analyzed (e.g., using one or more classifiers, optical flow analysis, one or more neural networks, or any combination thereof) to determine if the second target vehicle is slowing (i.e., opening a gap) or if the first target vehicle is slowing (i.e., allowing the host vehicle to enter the detected gap).

Figure 20A:
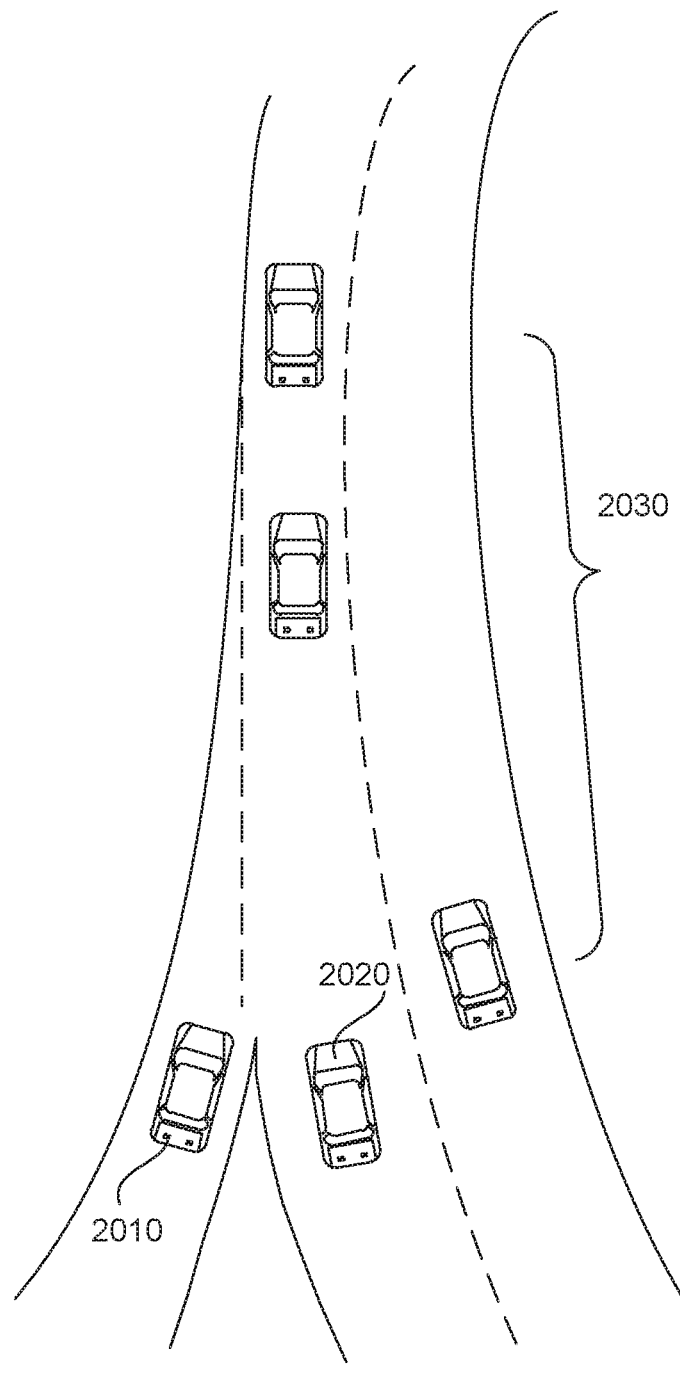
FIG. 20A provides a diagrammatic illustration of a host vehicle navigating based on a sensed ending of a lane consistent with the disclosed embodiments.

FIG. 20A is a diagram of a host vehicle 2020 navigating based on a sensed ending of a lane. In the example of FIG. 20A, host vehicle 2020 may identify a merging 2030 of a first flow of traffic and a second flow of traffic into a merged lane merge. Moreover, in the example of FIG. 20A, host vehicle 2020 may slow to allow target vehicle 2010 from the first flow of traffic to proceed ahead of host vehicle 2020. Although not depicted in FIG. 20A, host vehicle 2020 may then accelerate to follow target vehicle 2010 ahead of another target vehicle (not shown) behind target vehicle 2010. Host vehicle 2020 may include memory 1900 described above and use the modules therein to perform the decisions depicted in FIG. 20A. Additionally or alternatively, host vehicle 2020 may execute method 2100 described below to perform the decisions depicted in FIG. 20A.

Figure 20B:
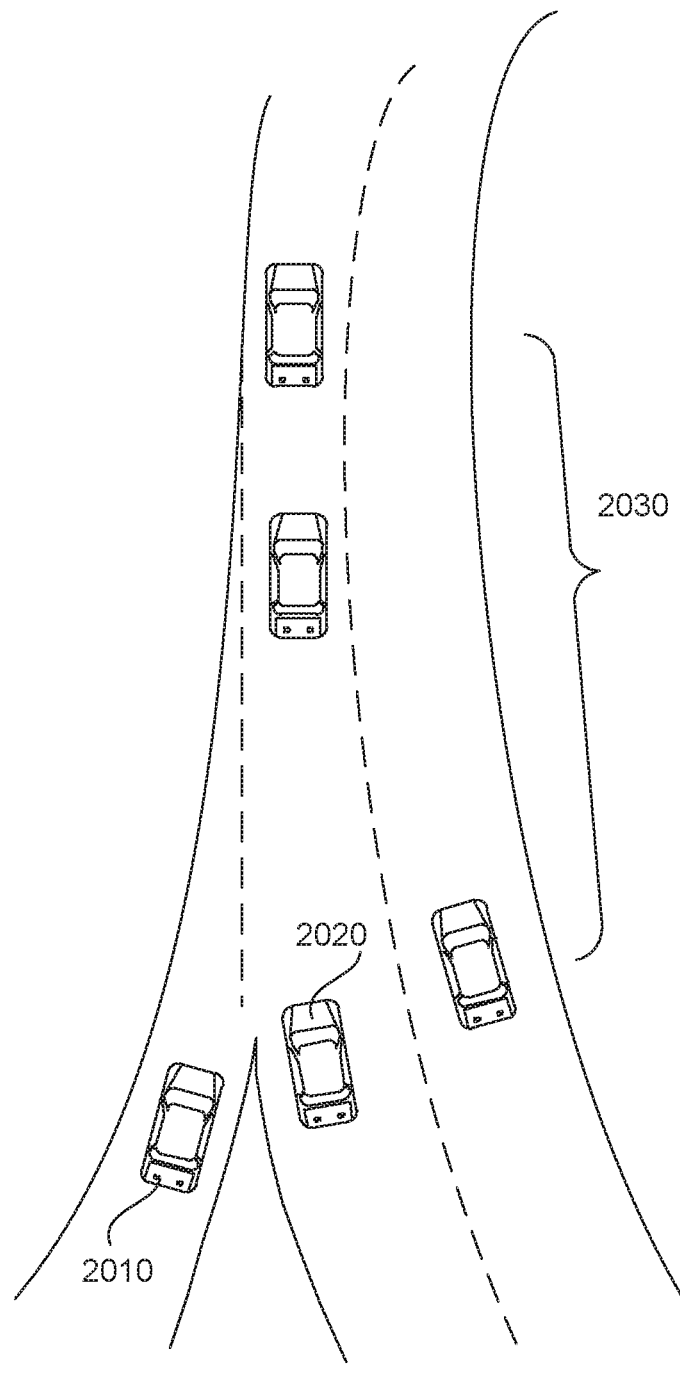
FIG. 20B provides another diagrammatic illustration of a host vehicle navigating based on a sensed ending of a lane consistent with the disclosed embodiments.

FIG. 20B is another diagram of host vehicle 2020 navigating based on a sensed ending of a lane. In the example of FIG. 20B, host vehicle 2020 may identify a merging 2030 of a first flow of traffic and a second flow of traffic into a merged lane merge. Moreover, in the example of FIG. 20B, host vehicle 2020 may accelerate towards an identified gap ahead of target vehicle 2010 from the first flow of traffic. Although not depicted in FIG. 20B, host vehicle 2020 may then slow down to follow another target vehicle (not shown) ahead of the identified gap.

Figure 20C:
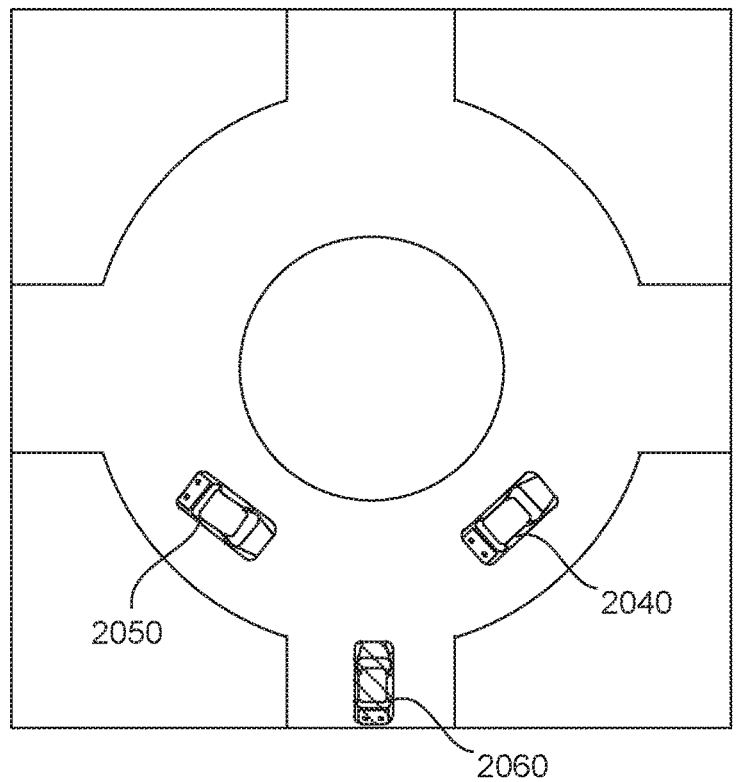
FIG. 20C provides a diagrammatic illustration of a host vehicle navigating based on a sensed traffic circle consistent with the disclosed embodiments.

FIG. 20C is a diagram of a host vehicle 2060 navigating based on a sensed traffic circle. In the example of FIG. 20C, host vehicle 2060 may identify an upcoming traffic circle. Moreover, in the example of FIG. 20C, host vehicle 2060 may accelerate towards an identified gap between target vehicle 2040 and target vehicle 2050 in the first flow of traffic.

Figure 20D:
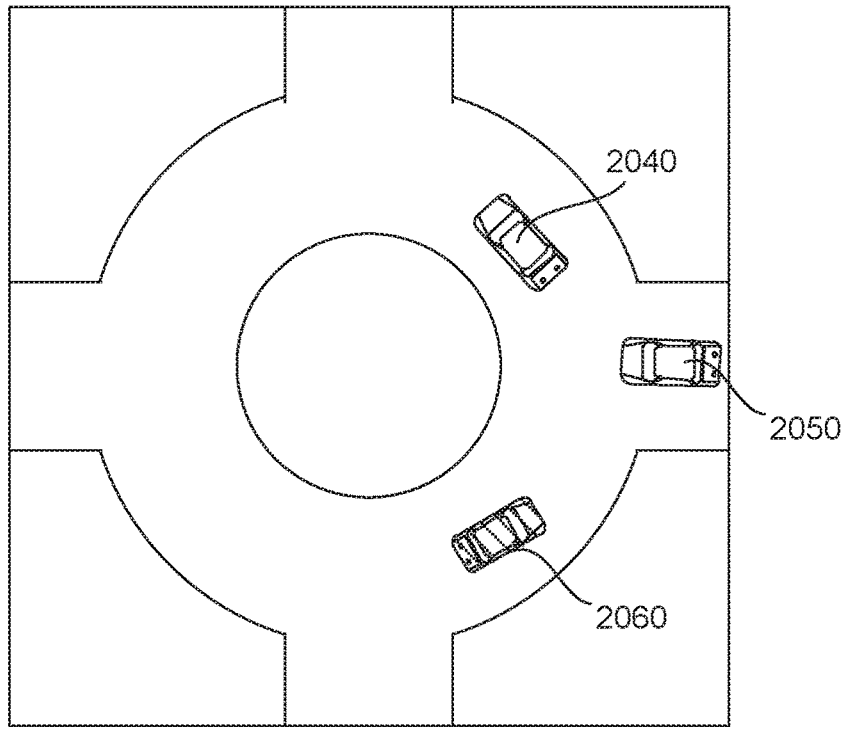
FIG. 20D provides another diagrammatic illustration of a host vehicle navigating based on a sensed traffic circle consistent with the disclosed embodiments.

FIG. 20D is another diagram of host vehicle 2060 navigating based on a sensed traffic circle. In the example of FIG. 20D, host vehicle 2060 may identify that it is in traffic circle. Moreover, in the example of FIG. 20D, host vehicle 2060 may slow to allow target vehicle 2050 from the first flow of traffic to proceed ahead of host vehicle 2060. Although not depicted in FIG. 20D, host vehicle 2060 may then accelerate to follow target vehicle 2050.

Host vehicle 2060 may include memory 1900 described above and use the modules therein to perform the decisions depicted in FIGS. 20A-20D. Additionally or alternatively, host vehicle 2060 may execute method 2100 described below to perform the decisions depicted in FIGS. 20A-20D.

Figure 21:
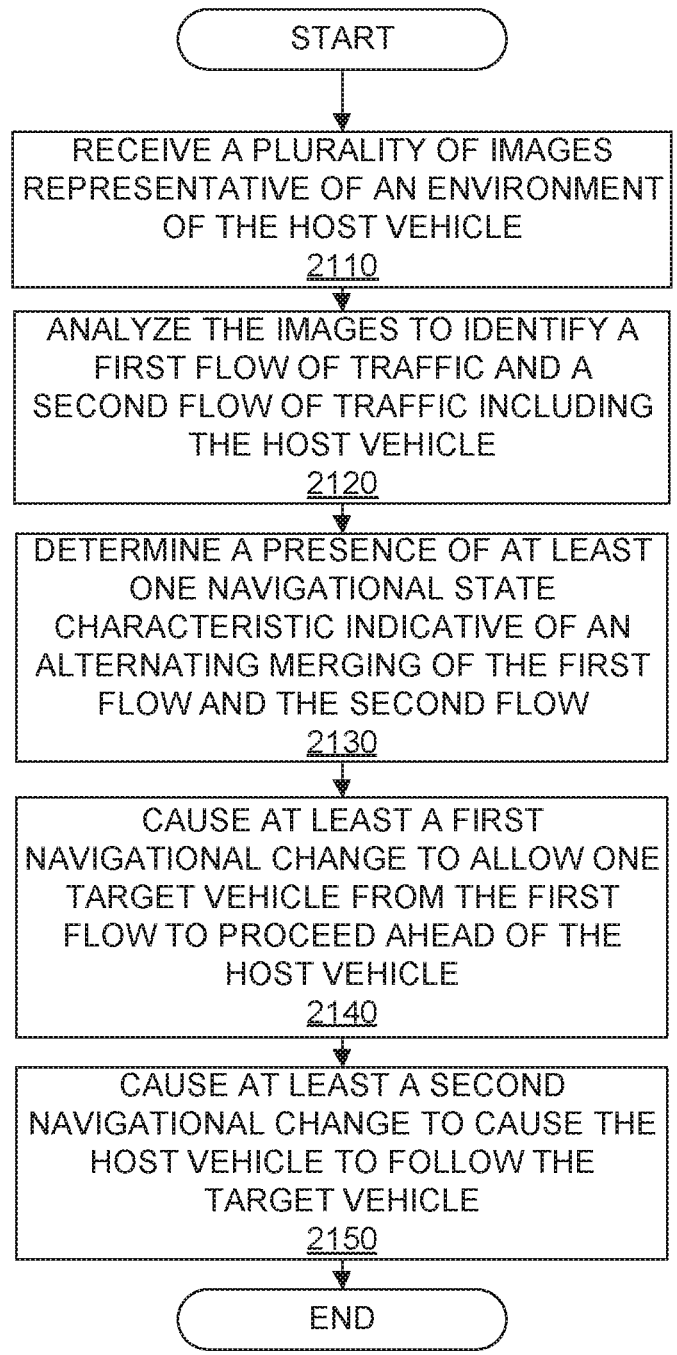
FIG. 21 provides an algorithmic flow chart for navigating a vehicle in an alternating merge zone consistent with the disclosed embodiments.

FIG. 21 depicts a flow chart of method 2100 for navigating a host vehicle in an alternating merge zone. Method 2100 may, for example, be implemented by at least one processing device (e.g., processing device 110) of the host vehicle.

At step 2110, processing device 110 may receive, from a camera, a plurality of images representative of an environment of the host vehicle. For example, the camera may be at least one of image capture device 122, image capture device 124, and image capture device 126. The plurality of images may be captured from different angles (e.g., using different cameras) and/or at different times. In one particular example, the plurality of images may represent a plurality of temporal sequences of frames, each sequence covering the same period of time but at a unique angle.

In some embodiments, processing device 110 may receive additional information from other sensors in the host vehicle. For example, processing device 110 may receive information from a speedometer, a GPS, an accelerometer, a radar, a lidar, a suspension sensor, or the like.

At step 2120, processing device 110 may analyze the plurality of images to identify a first flow of traffic and a second flow of traffic. For example, processing device 110 may apply one or more image classifiers and/or cascading classifiers to identify the traffic flows in. The image classifiers may, for example, identify vehicles in one or more of the plurality of images. Additionally, the image classifiers may identify directions of motion of the identified vehicles across a temporal sequence of the plurality of images. The identified vehicles and directions of motion may be used to derive the first traffic flow and the second traffic flow.

Additionally or alternatively, the image classifiers may identify one or more road markings, such as dashed yellow lines, dashed white lines, solid white lines, double solid yellow lines, concrete barriers, guard rails, or the like. The identified road markings may be the boundaries of the first traffic flow and the second traffic flow. In an embodiment combining identified vehicles with identified road markings, processing device 110 may identify the first traffic flow and the second traffic flow using identified vehicles and then use corresponding lane markings to delineate the boundaries of the already-identified first traffic flow and second traffic flow.

In addition to or in lieu of using image classifiers, processing device 110 may determine an optical flow within the plurality of images and determine the first traffic flow and the second traffic flow based thereon. For example, an optical flow may be identified based on one or more vehicles moving on a trajectory. In an embodiment combining optical flows with identified road markings, processing device 110 may identify the first traffic flow and the second traffic flow using optical flows and then use corresponding lane markings to delineate the boundaries of the already-identified first traffic flow and second traffic flow. One or more neural networks may be used in combination with or in lieu of any of the techniques described above.

In some embodiments, the second flow of traffic may include the host vehicle. Accordingly, processing device 110 may identify the second traffic flow (and/or the first traffic flow) based, at least in part, on angle. For example, processing device 110 may identify the second traffic flow as a traffic flow with an angle closest to an angle of 0° ahead of the host vehicle. On the other hand, processor device 110 may identify the first traffic flow as a traffic flow at an acute angle ahead of the host vehicle. In embodiments where processing device 110 uses optical flow, processing device 110 may identify the second traffic flow using an optical flow of the environment to determine a traffic flow in which the host vehicle is traveling. Additionally or alternatively, processing device 110 may identify the second traffic flow based on a historical trajectory of the host vehicle (e.g., received from a GPS of the host vehicle) and/or a predicted trajectory of the host vehicle (e.g., based on information received from a steering sensor, a speedometer, an accelerometer, or any combination thereof).

At step 2130, processing device 110 may determine a presence in the environment of the vehicle of at least one navigational state characteristic indicative of an alternating merging of the first flow of traffic and the second flow of traffic into a merged lane. For example, processing device 110 may use one or more image classifiers to identify the at least one navigational state characteristics. In one particular example, the one or more classifiers may identify road markings indicative of merging lanes, such as terminating solid or dashed lines, narrowing lanes, etc. Additionally or alternatively, the one or more classifiers may identify signs indicative of merging lanes, such as a yield sign, a merge sign, a lane ends sign, a traffic does not stop sign, an entering roadway merge sign, etc. Additionally or alternatively, the one or more classifiers may identify construction barriers indicative of merging lanes, such as cones, barrels, an arrow board, etc.

In another example, processing device 110 may use one or more image classifiers to identify road boundaries (e.g., curbs, concrete barriers, etc.) and, based on the shape formed by the identified boundaries, determine the presence of a traffic circle. Similarly, processing device 110 may use one or more image classifiers to identify road boundaries (e.g., curbs, concrete barriers, etc.) and road signs; based on the shape formed by the identified boundaries and a lack of road signs, processing device 110 may determine the presence of an uncontrolled intersection.

In any of the above examples, processing device 110 may further determine an order at which vehicles from merging traffic flows should proceed. For example, based on one or more image classifiers identifying vehicles and their movement and/or based on one or more optical flows of identified vehicles, processing device 110 may determine whether the first traffic flow or the second traffic flow must yield or stop or whether the first traffic flow and the second traffic flow represent an alternating merge situation. In one particular example, processing device 110 may determine that the first traffic flow (or the second traffic flow) must yield when a yield sign is present and/or when one of the traffic flows slows down while the other traffic flow does not or may determine that the first traffic flow (or the second traffic flow) must stop when a stop sign is present and/or when one of the traffic flows stops while the other traffic flow does not. In a similar example, processing device 110 may determine that an alternating merge situation exists if both traffic flows slow down and/or stop in response to each other and/or if the first traffic flow and the second traffic flow enter the merged lane at an approximately alternating pace. (As used herein, "approximately" may refer to a general pattern with one or more outliers; for example, two vehicles from the first traffic flow and two vehicles from the second traffic flow may alternate followed by an outlier of two vehicles from the first traffic flow both entering the merged lane.) One or more neural networks may be used in combination with or in lieu of any of the techniques described above.

Additionally, in some embodiments, processing device 110 may identify a gap in the first flow of traffic. For example, processing device 110 may use one or more image classifiers to identify vehicles within the first flow of traffic as well as gaps between identified vehicles. Additionally or alternatively, processing device 110 may identify the types of vehicles in the first flow of traffic and determine the gaps based on one or more identified portions of the vehicles along with known information about the identified types. The known information may be stored in one or more memories. For example, the known information may include dimensions (such as lengths or widths) of vehicle types in a database indexed by year, make, and/or model of vehicle. Accordingly, processing device may identify a 2000 Lincoln LS in front of a 2010 GMC Sierra 1500 and then identify a gap between the two based on identified headlights and a length of the 2000 Lincoln LS extracted from the database and/or based on identified taillights and a length of the 2010 GMC Sierra 1500 extracted from the database. One or more neural networks may be used in combination with or in lieu of any of the techniques described above.

At step 2140, processing device 110 may cause at least a first navigational change in the host vehicle to allow one target vehicle from the first flow of traffic to proceed ahead of the host vehicle. For example, the first navigational change may include slowing the host vehicle or may include slowing the host vehicle to allow a gap to open between the host vehicle and behind a vehicle ahead of the host vehicle in the second flow of traffic.

In embodiments where processing device 110 identifies a gap in the first flow of traffic, processing device 110 may cause at least a first navigational change in the host vehicle to proceed towards the identified gap in front of one target vehicle from the first flow of traffic. For example, the first navigational change may include an acceleration of the host vehicle to proceed towards the gap.

At step 2150, processing device 110 may cause at least a second navigational change in the host vehicle to cause the host vehicle to follow the target vehicle into the merged lane ahead of a second target vehicle from the first flow of traffic. For example, the second navigational change may, for example, include an acceleration of the host vehicle to follow the target vehicle.

In embodiments where processing device 110 identifies a gap in the first flow of traffic, processing device 110 may cause at least a second navigational change in the host vehicle to cause the host vehicle to follow a second target vehicle ahead of the target vehicle into the merged lane. For example, the first navigational change may include slowing the host vehicle to avoid colliding with the second target vehicle during or after moving into the merged land ahead of the target vehicle.

Method 2100 may include additional steps. For example, method 2100 may include monitoring the second target vehicle for an indication that the second target vehicle is opening a gap to allow the host vehicle to follow the first target vehicle. For example, processing device 110 may receive an updated plurality of images that may be analyzed (e.g., using one or more classifiers, optical flow analysis, one or more neural networks, or any combination thereof) to determine if the second target vehicle is slowing (i.e., opening the gap).

In embodiments where processing device 110 causes at least a first navigational change in the host vehicle to proceed towards the identified gap in front of one target vehicle from the first flow of traffic, processing device 2100 may further monitor the first target vehicle for an indication that the first target vehicle is allowing the host vehicle to enter a detected gap behind the second target vehicle. For example, processing device 110 may receive an updated plurality of images that may be analyzed (e.g., using one or more classifiers, optical flow analysis, one or more neural networks, or any combination thereof) to determine if the first target vehicle retains a constant speed or is slowing (i.e., allowing the host vehicle to enter the detected gap).

Navigating in the Presence of Emergency Vehicles

In some embodiments, a navigation system of a host vehicle may analyze an image stream as well as input from one or more other sensors to determine when an emergency vehicle (e.g., in an emergency mode) is present. This may allow the host vehicle to maintain safety in emergency situations without relying on human intervention unlike extant systems.

In some embodiments, the navigation system may identify the emergency vehicle in one or more images received from a camera (e.g., based on a detected presence of flashing lights, a determined color of the emergency vehicle, one or more detected markings on the emergency vehicle, one or more recognized logos and/or text on the emergency vehicle, etc.). Additionally or alternatively, the navigation system may identify emergency vehicles through detection of sounds (e.g., sirens) using (optionally directional) microphones.

Figure 22:
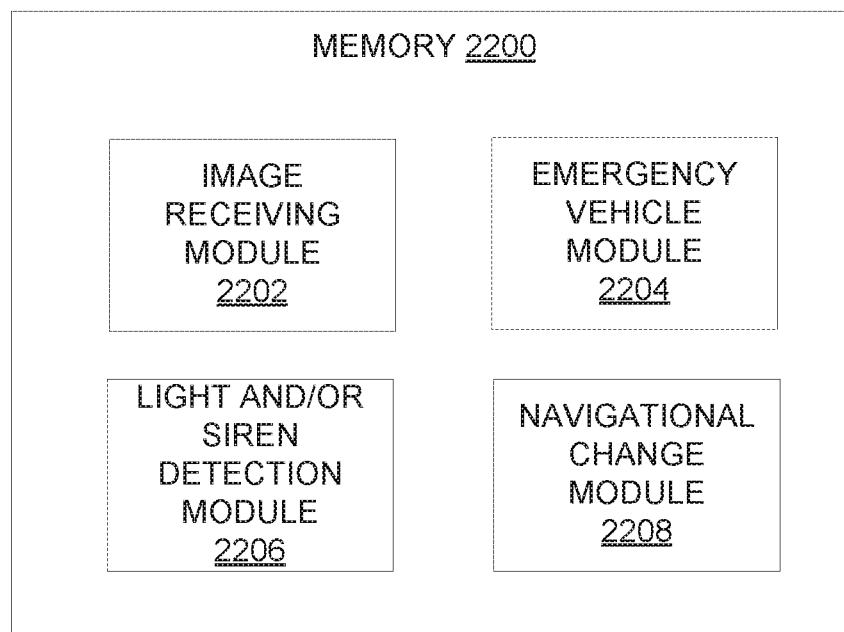
FIG. 22 is an exemplary block diagram of a memory configured to store instructions for navigating in the presence of emergency vehicles consistent with the disclosed embodiments.

FIG. 22 is a block diagram of memory 2200 configured to store instructions for navigating in the presence of emergency vehicles. Although depicted as a single memory in FIG. 22, memory 2200 may comprise one or more non-volatile (e.g., hard disk drive, flash memory, etc.) and/or volatile (e.g., RAM or the like) memories. In some embodiments, memory 2200 may be included in system 100. For example, memory 2200 may comprise, at least in part, a portion of one or more memory units 140, 150.

As depicted in FIG. 22, memory 2200 may include an image receiving module 2202. Image receiving module 2202 may receive, from a camera associated with the host vehicle, an indication of a presence of an emergency vehicle in an environment of the host vehicle. The plurality of images may be received directly from the camera (e.g., using one or more buses), retrieved from one or more memories storing images from the camera, and/or over one or more computer networks, whether from the camera directly or from one or more memories connected to the network(s).

Additionally or alternatively, module 2202 may receive indications from at least one sensor associated with the host vehicle. For example, in addition to or in lieu of a camera, module 2202 may receive indications from a (optionally directional) microphone. In another example, module 2202 may receive information from at least one of a speedometer, a GPS, an accelerometer, a radar, a lidar, a suspension sensor, or the like. Additionally or alternatively, module 2202 may a signal (such as a radio frequency signal) being broadcast from the emergency vehicle.

As further depicted in FIG. 22, memory 2200 may include an emergency vehicle module 2204. Emergency vehicle module 2204 may use the indication from module 2202 to detect the presence of the emergency vehicle. Additionally or alternatively, emergency vehicle module 2204 may use one or more detections from light and/or siren detection module 2206 to confirm the presence of the emergency vehicle.

As depicted in FIG. 22, memory 2200 may further include a light and/or siren detection module 2206. In one example, module 2206 may detect flashing lights in a stream of images received by image receiving module 2202. Additionally or alternatively, module 2206 may detect, in at least one image received by image receiving module 2202, an emergency light associated with a vehicle. Additionally or alternatively, module 2206 may detect, in at least one image received by image receiving module 2202, a logo and/or text on a vehicle, the logo or text being associated with a recognized emergency vehicle. Additionally or alternatively, module 2206 may detect, in at least one image received by image receiving module 2202, a color or marking on a vehicle, the color or marking being associated with a recognized emergency vehicle. In these examples, module 2206 may further detect at least one of an active light associated with the emergency vehicle (e.g., in the stream of images and/or in the at least one image) or detect a siren associated with the emergency vehicle (e.g., using a microphone).

In embodiments where module 2202 receives audio from a microphone, module 2206 may additionally or alternatively detect a siren. Moreover, in embodiments where the microphone is a directional microphone, module 2206 may also determine the siren to be in front of the host vehicle, to the side of the host vehicle, or behind the host vehicle.

Finally, memory 2200 may include a navigational change module 2208. Navigational change module 2208 may cause at least one navigational change in the host vehicle in response to the indication of the presence of an emergency vehicle in the environment of the host vehicle. For example, the at least one navigational change may include slowing the host vehicle, moving the host vehicle to a roadside, moving the host vehicle to a different lane of travel, or any combination thereof.

Figure 23:
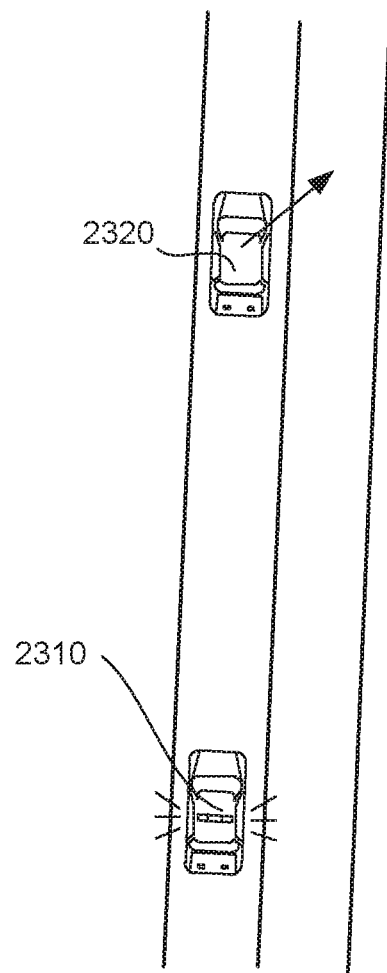
FIG. 23 provides a diagrammatic illustration of a host vehicle navigating based on a presence of an emergency vehicle consistent with the disclosed embodiments.

FIG. 23 is a diagram of a host vehicle 2320 navigating based on a presence of emergency vehicle 2310. In the example of FIG. 23, emergency vehicle 2310 has lights associated with being an emergency vehicle. Moreover, in the example of FIG. 23, emergency vehicle 2310 has flashing lights associated with being an emergency vehicle. Although not depicted in FIG. 23, additional or alternative indicators of the presence of emergency vehicle 2310 could be detected by host vehicle 2320, such as detection of one or more logos, text, one or more colors, one or more markings, or any combination thereof and/or detection of a siren. In embodiments where text is detected in the images, at least on processing device of host vehicle 2320 may perform optical character recognition (OCR) on the text in order to compare the recognized text to known text patterns associated with emergency vehicles.

In the example of FIG. 23, host vehicle 2320 moves to another lane of travel in response to the presence of emergency vehicle 2310. Although not depicted in FIG. 23, additional or alternative navigational changes may be caused, such as moving host vehicle 2320 to a roadside, slowing host vehicle 2320, or the like. Host vehicle 2320 may include memory 2200 described above and use the modules therein to perform the decisions depicted in FIG.

23. Additionally or alternatively, host vehicle 2320 may execute method 2400 described below to perform the decisions depicted in FIG. 23.

Figure 24:
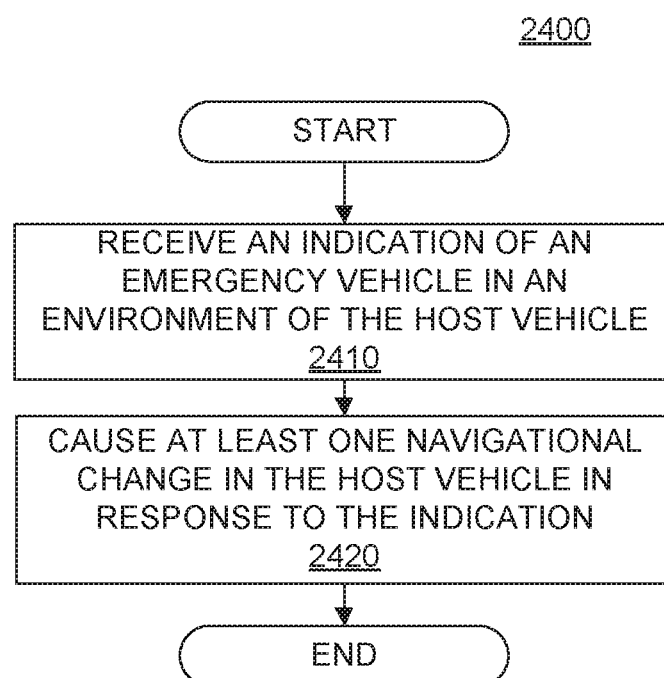
FIG. 24 provides an algorithmic flow chart for navigating a vehicle in the presence of an emergency vehicle consistent with the disclosed embodiments.

FIG. 24 depicts a flow chart of method 2400 for navigating a vehicle in the presence of an emergency vehicle. Method 2400 may, for example, be implemented by at least one processing device (e.g., processing device 110) of the host vehicle.

At step 2410, processing device 110 may receive, from at least one sensor associated with the host vehicle, an indication of a presence of an emergency vehicle in an environment of the host vehicle. For example, the at least one sensor may include a camera, a (optionally directional) microphone, a radar, a lidar, or any combination thereof.

In one example, the indication of the presence of an emergency vehicle may include a detection of flashing lights in a stream of images captured by a camera and provided to the at least one processing device (e.g., processing device 110). Such an indication may be detected using one or more image classifiers applied to the stream of images. The one or more image classifiers may optionally be used with one or more neural networks.

Additionally or alternatively, the indication of the presence of the emergency vehicle may include a detection in at least one image captured by a camera and supplied to the at least one processing device (e.g., processing device 110) of an emergency light associated with a vehicle. Such an indication may be detected using one or more image classifiers applied to the stream of images. The one or more image classifiers may optionally be used with one or more neural networks.

Additionally or alternatively, the indication of the presence of the emergency vehicle may include a detection in at least one image captured by a camera and supplied to the at least one processing device (e.g., processing device 110) of a logo or text on a vehicle, the logo or text being associated with a recognized emergency vehicle. Additionally or alternatively, the indication of the presence of the emergency vehicle may include a detection in at least one image captured by a camera and supplied to the at least one processing device (e.g., processing device 110) of a color or marking on a vehicle, the color or marking being associated with a recognized emergency vehicle. In such examples, the indication of the presence of the emergency vehicle may further include detection of at least one of an active light associated with the emergency vehicle (e.g., using the camera) or detection of a siren associated with the emergency vehicle (e.g., using a microphone).

In embodiments where the indication of the presence of the emergency vehicle includes detection of at least one of an active light associated with the emergency vehicle or detection of a siren associated with the emergency vehicle, the at least one processing device (e.g., processing device 110) may further track the at least one of an active light or detection of a siren over a period of time. For example, the active light may be tracked (e.g., using the camera) by monitoring the size of the detected light and/or the intensity of the detected light over time. Additionally or alternatively, a lateral displacement of the active light (e.g., relative to the host vehicle) may be monitored (e.g., using the camera) over time. In embodiments including a detected siren, the frequency and/or amplitude of the siren may be monitored over time.

Additionally, the at least one processing device (e.g., processing device 110) may determine, based on the tracking, whether the emergency vehicle is moving towards the host vehicle. For example, if the size and/or intensity increases over time (optionally up until a saturation level), processing device 110 may determine that the emergency vehicle is moving towards the host vehicle. Additionally or alternatively, if the lateral displacement of the active light approaches zero over time, processing device 110 may determine that the emergency vehicle is moving towards the host vehicle. In embodiments including a detected siren, if the frequency of the siren is blue-shifted and/or the amplitude of the siren increases over time, processing device 110 may determine that the emergency vehicle is moving towards the host vehicle. Any of the above examples may have one or more thresholds used to make the determination. For example, the size and/or intensity may have to increase by more than a threshold, increase for more than a threshold length of time, and/or increase at a rate above a threshold. Similarly, the lateral displacement may have to decrease below a threshold, approach zero for more than a threshold length of time, and/or decrease at a rate below a threshold. In embodiments including a detected siren, the frequency of the siren may have to be blueshifted above a threshold and/or for more than a threshold length of time. Additionally or alternatively, the amplitude may have to increase by more than a threshold, increase for more than a threshold length of time, and/or increase at a rate above a threshold.

Additionally or alternatively, the indication of the presence of the emergency vehicle may include a detection of a siren. For example, the detection may be provided by a directional microphone, and the siren may be determined to be behind the host vehicle (or in front of the host vehicle or to the side of the host vehicle). Additionally or alternatively, processing device 110 may determine, based on a waveshift present in the detected siren, whether the emergency vehicle is approaching the host vehicle.

At step 2420, processing device 110 may cause at least one navigational change in the host vehicle in response to the indication of the presence of an emergency vehicle in the environment of the host vehicle. For example, processing device 110 may slow the host vehicle, move the host vehicle to a roadside, move the host vehicle to a different lane of travel, or any combination thereof.

In some embodiments, the at least one navigational change may depend on the location of a detected siren. For example, in embodiments where the siren is determined to be behind the host vehicle, the at least one navigational change may include moving the host vehicle to a roadside and/or moving the host vehicle to a different lane of travel. In another example, in embodiments where the siren is determined to be to the side of the host vehicle, the at least one navigational change may include slowing the host vehicle. In yet another example, in embodiments where the siren is determined to be in front of the host vehicle, the at least one navigational change may include maintaining a speed of the host vehicle or slowing the host vehicle.

Additionally or alternatively, the at least one navigational change may depend on the waveshift of a detected siren. For example, in embodiments where the siren is determined to be approaching the host vehicle, the at least one navigational change may include moving the host vehicle away from the siren (e.g., slowing if the siren is in front of the vehicle and approaching). In another example, in embodiments where the siren is determined to be moving away from the host vehicle, the at least one navigational change may include moving the host vehicle further away from the siren (e.g., moving to another lane of travel if the siren is to the side of the vehicle and receding).

Additionally or alternatively, the at least one navigational change may be determined by overriding one or more comfort parameters in order to maintain one or more safety parameters. For example, a comfort parameter may include a limit on lateral g-forces and may be overridden in order to quickly move the host vehicle, e.g., to avoid a collision with the emergency vehicle. In another example, a comfort parameter may include a limit on deceleration and may be overridden in order to quickly slow down the host vehicle.

Method 2400 may include additional steps. For example, method 2400 may further include monitoring the environment of the host vehicle for an indication that the emergency vehicle has passed the host vehicle. In such an example, processing device 110 may receive one or more updated images that may be analyzed (e.g., using one or more classifiers optionally with one or more neural networks) to determine if a detected light(s), a detected logo or text, a detected color or marking, or the like are moving away from the host vehicle. Additionally or alternatively, processing device 110 may receive updated audio from a microphone that may be analyzed for indicia that the emergency vehicle is moving away from the host vehicle (e.g., if the volume of the audio is decreasing). Moreover, method 2400 may further include causing at least one additional navigational change in the host vehicle in response to an indication that the emergency vehicle has passed the host vehicle. For example, processing device 110 may accelerate the host vehicle, move the host vehicle back to a road, move the host vehicle back to an original lane of travel, or any combination thereof.

In another example, method 2400 may further include, in response to the indication, overriding a normal operation of the host vehicle in order to cause the at least one navigational change. For example, processing device 110 may override a trajectory of the host vehicle in order to move the host vehicle to a roadside, move the host vehicle to a different lane of travel. In another example, processing device 110 may override a speed control of the host vehicle in order to slow the host vehicle in response to the indication of the presence of the emergency vehicle.

Navigating Through Automated Negotiation with Other Vehicles

In some embodiments, a navigation system of a host vehicle may automatically undertake certain actions to convey a navigational intent to other vehicles in an environment of the host vehicle. This may allow the host vehicle to safely emulate the navigational negotiations of human drivers while not relying on human intervention, unlike extant systems.

For example, by taking an initial action, the host vehicle may convey a desire or intent to change lanes ahead of a target vehicle, to merge into a merged lane or traffic circle ahead of a target vehicle, to allow a target vehicle to change lanes ahead of the host vehicle, to allow a target vehicle to merge into a merged lane or traffic circle ahead of the host vehicle, etc. In such examples, the initial action may include a slight movement toward a lane the host vehicle wishes to enter, a slight nudge forward into a line of traffic (e.g., at a lane merge, a traffic circle, etc.), a slight braking action, a headlight flash, etc. A full navigational action of the host vehicle may then be determined by tracking a response of at least one target vehicle to the initial action. In some embodiments, the initial action may be accompanied by one or more additional indicators of intent, such as flashing a turn signal of the host vehicle, flashing a brake light of the host vehicle, flashing the headlights of the host vehicle, an informational signal wirelessly (e.g., via 4G, via LTE, via WiFi, or the like) transmitted to one or more target vehicles, etc.

Figure 25:
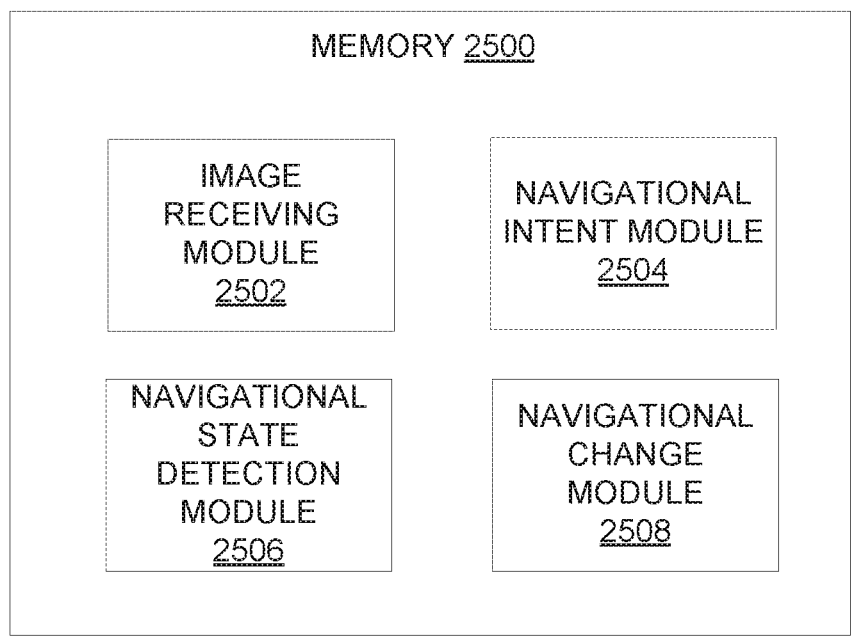
FIG. 25 is an exemplary block diagram of a memory configured to store instructions for navigating through automated negotiation with other vehicles consistent with the disclosed embodiments.

FIG. 25 is a block diagram of memory 2500 configured to store instructions for navigating through automated negotiation with other vehicles. Although depicted as a single memory in FIG. 25, memory 2500 may comprise one or more non-volatile (e.g., hard disk drive, flash memory, etc.) and/or volatile (e.g., RAM or the like) memories. In some embodiments, memory 2500 may be included in system 100. For example, memory 2500 may comprise, at least in part, a portion of one or more memory units 140, 150.

As depicted in FIG. 25, memory 2500 may include an image receiving module 2502. Image receiving module 2502 may receive, from a camera, a plurality of images representative of an environment of the host vehicle. The plurality of images may be received directly from the camera (e.g., using one or more buses), retrieved from one or more memories storing images from the camera, and/or over one or more computer networks, whether from the camera directly or from one or more memories connected to the network(s).

In some embodiments, module 2502 may receive alternative or additional information from other sensors in the host vehicle. For example, module 2502 may receive information from at least one of a speedometer, a GPS, an accelerometer, a radar, a lidar, a suspension sensor, or the like.

As further depicted in FIG. 25, memory 2500 may include a navigational intent module 2504. Navigational intent module 2504 may analyze the plurality of images received by image receiving module 2502 to identify at least one target vehicle in the environment of the host vehicle. For example, navigational intent module 2504 may apply one or more image classifiers (optionally cascading classifiers) to identify the at least one target vehicle.

One or more neural networks may be used in combination with or in lieu of the image classifiers. For example, the one or more neural networks may be trained using a training set of images having associated target vehicles and minimizing a loss function associated therewith. The one or more neural networks may continue to be trained using real data. For example, feedback from human drivers may be received and incorporated into the one or more neural networks to improve accuracy. In some embodiments, the training and/or feedback incorporation may be performed remotely from the host vehicle (e.g., on one or more remote servers). Accordingly, the one or more neural networks (as well as updates thereto) may be sent to the host vehicle from the one or more remote servers. Alternatively, the host vehicle may send images to the one or more remote servers for processing on the one or more neural networks.

The target vehicle may have a location that impacts at least one planned navigational action of the host vehicle. In some embodiments, navigational intent module 2504 may determine and/or receive the at least one planned navigational action and determine, based on the at least one planned navigational action, one or more zones that impact the at least one planned navigational action. In an example where the at least one planned navigation action includes changing lanes, navigational intent module 2504 may determine a portion of a new lane (optionally with a portion of a current lane) as a zone that impacts the at least one planned navigational action. In another example where the at least one planned navigation action includes a left turn, navigational intent module 2504 may determine a portion of an intersection (optionally with a portion of a current lane and/or an intended lane) as a zone that impacts the at least one planned navigational action.

Accordingly, navigational intent module 2504 may identify the at least one target vehicle by limiting the one or more image classifiers (either ex ante or ex post) to identified vehicles within the one or more zones. In some embodiments, locations of the identified vehicles may be points (e.g., an identified or estimated center of the vehicle, an identified or estimate location of one or more wheels of the vehicle, or the like; GPS coordinates; etc.), and the identified vehicles may be classified as target vehicles only if the points are within the one or more zones. In other embodiments, locations of the identified vehicles may be points with an expected variance or margin of error, and the identified vehicles may be classified as target vehicles only if the expected variances or margins overlap with the one or more zones (optionally with a threshold of overlap, e.g., at least 0.5 m of overlap, at least 1 m of overlap, or the like). In yet another embodiment, locations of the identified vehicles may be regions (e.g., bounding boxes), and the identified vehicles may be classified as target vehicles only if the regions overlap with the one or more zones (optionally with a threshold of overlap, e.g., at least 10% of the region overlaps, at least 20% of the region overlaps, or the like).

In an alternative embodiment, navigational intent module 2504 may analyze the plurality of images to identify a first target vehicle and a second target vehicle in the environment of the host vehicle. For example, navigational intent module 2504 may apply one or more image classifiers (optionally cascading classifiers) to identify the first target vehicle and the second target vehicle. One or more neural networks may be used in combination with or in lieu of the image classifiers, as discussed above. The first target vehicle may be traveling behind the second target vehicle in a travel lane adjoining a travel lane in which the host vehicle is traveling.

In such an embodiment, navigational intent module 2504 may analyze the plurality of images to determine a distance between the first target vehicle and the second target vehicle. For example, the one or more classifiers may identify one or more portions (e.g., a headlight, a taillight, a wheel, or the like) of the first target vehicle and the second target vehicle. A distance between the identified portions may be estimated using the plurality of images. Additionally or alternatively, the one or more classifiers may estimate a bounding box of the first target vehicle and a bounding box of the second target vehicle and determine a distance between the two estimated bounding boxes.

Optionally, navigational intent module 2504 may use known information about types of vehicles (e.g., dimensions such as widths and lengths) to estimate the distance. For example, navigational intent module 2504 may identify the first target vehicle as a 2010 Chevy Silverado and the second target vehicle as a 2016 Hyundai Sonata and use a known length of the 2010 Chevy Silverado and/or the 2016 Hyundai Sonata to estimate the distance between the first target vehicle and the second target vehicle. One or more neural networks may be used in combination with or in lieu of the image classifiers, as discussed above.

In this embodiment, navigational intent module 2504 may further determine, from the plurality of images, a time to reach a boundary associated with one of the first target vehicle and the second target vehicle. For example, the boundary may include a boundary of a bounding box of the first target vehicle or the second target vehicle. In another example, the boundary may include a determined safe distance from the first target vehicle or the second target vehicle. The safe distance may be determined based on known or determined properties of the target vehicle (such as length, width, maximum deceleration, or the like), a speed of the target vehicle, a heading of the target vehicle, or the like. The determined time may exceed a first threshold and not exceed a second threshold, the second threshold being greater than the first threshold.

In any of the embodiments above, navigational intent module 2504 may also determine a navigational action for the host vehicle based on a detected change in navigational state of the target vehicle. For example, if the detected reaction of the target vehicle includes the target vehicle slowing, the at least one navigational change of the host vehicle may include an application of brakes of the host vehicle to slow the host vehicle. In another example, if the detected reaction of the target vehicle includes the target vehicle changing lanes, the at least one navigational change of the host vehicle may include moving the host vehicle laterally within a lane of travel. In embodiments having a first target vehicle and a second target vehicle, the target vehicle may be at least one of the first target vehicle and the second target vehicle.

As depicted in FIG. 25, memory 2500 may further include a navigational state detection module 2506. Navigational state detection module 2506 may analyze the plurality of images to detect a change in a navigational state of the target vehicle in response to at least one navigational change in the host vehicle. For example, navigational state detection module 2506 may detect if the target vehicle accelerates, slows, changes lanes, begins turning, or otherwise moves after the at least one navigational change in the host vehicle. Additionally of alternatively, navigational state detection module 2506 may detect if the target vehicle flashes headlights, flashes brake lights, flashes a turn signal, or otherwise issues another indicator after the at least one navigational change in the host vehicle. Any of the above changes may be detected using one or more image classifiers (optionally with one or more neural networks). In embodiments having a first target vehicle and a second target vehicle, the target vehicle may be at least one of the first target vehicle and the second target vehicle.

In some embodiments, the at least one navigational change may be determined, at least in part, based on a predicted change in a navigational state of the target vehicle. For example, navigational state detection module 2506 may predict the change based on detected properties of the target vehicle, such as if the target vehicle accelerates, slows, changes lanes, is turning, or otherwise moves in a detectable manner. Additionally of alternatively, navigational state detection module 2506 may detect if the target vehicle flashes headlights, flashes brake lights, flashes a turn signal, or otherwise issues another indicator. Any of the above changes may be detected using one or more image classifiers (optionally with one or more neural networks).

Finally, memory 2500 may include a navigational change module 2508. Navigational change module 2508 may cause at least one navigational change of the host vehicle to signal to the target vehicle an intent of the host vehicle to make a subsequent navigational maneuver. For example, the at least one navigational change of the host vehicle may include an application of brakes of the host vehicle to slow the host vehicle, changing a speed of the host vehicle, moving the host vehicle laterally within a lane of travel, moving the host vehicle toward a path of travel of the target vehicle, or any combination thereof.

Additionally or alternatively, navigational change module 2508 may determine the at least one navigational change, at least in part, based on one or more safety constraints. For example, any of the safety constraints described above (e.g., hard constraints such as no-drive zones surrounding various types of detected objects like target vehicles, pedestrians, stationary objects on the side of a road or in a roadway, moving objects on the side of a road or in a roadway, guard rails, or the like; a maximum speed of travel when passing within an influence zone of a pedestrian; a maximum deceleration, optionally determined to account for a target vehicle spacing behind the host vehicle; a mandatory stop at a sensed crosswalk or railroad crossing; or the like).

In a similar embodiment, the at least one navigational change may comprise a partial implementation of the subsequent navigational maneuver. For example, if the subsequent navigational maneuver is a lane change, the at least one navigational change may comprise a slight movement into an intended lane. In another example, if the subsequent navigational maneuver is a slow down of the host vehicle, the at least one navigational change may comprise a slight application of brakes of the host vehicle.

In an alternative embodiment, navigational change module 2508 may cause, based on a determined time to reach a boundary associated with one of a first target vehicle and a second target vehicle, at least one navigational change of the host vehicle to signal to the target vehicle an intent of the host vehicle to make a subsequent navigational maneuver. For example, if the boundary is an overlap between the host vehicle and the target vehicle, the at least one navigational change may be an acceleration or a slowing down of the host vehicle (e.g., to avoid the boundary).

In any of the embodiments above, navigational change module 2508 may also cause at least one adjustment of a navigational actuator of the host vehicle in response to a determined navigational action for the host vehicle. As explained above, a navigational actuator may include at least one of a steering mechanism, a brake, or an accelerator.

In any of the embodiments above, the navigational action may be based on whether the detected change in the navigational state of the target vehicle either provides an opportunity to complete the subsequent navigational maneuver without violating one or more safety constraints or renders the subsequent navigational maneuver in violation of the one or more safety constraints. As explained above, the safety constraints may include hard constraints such as no-drive zones surrounding various types of detected objects like target vehicles, pedestrians, stationary objects on the side of a road or in a roadway, moving objects on the side of a road or in a roadway, guard rails, or the like; a maximum speed of travel when passing within an influence zone of a pedestrian; a maximum deceleration, optionally determined to account for a target vehicle spacing behind the host vehicle; a mandatory stop at a sensed crosswalk or railroad crossing; or the like. In one example, if the at least one navigational action comprises a slight movement into an intended lane, and the target vehicle in the intended lane is behind the host vehicle and accelerates, the navigational action may move the host vehicle back to the original lane because changing lanes may encroach on a no-drive zone between the host vehicle and the target vehicle. In a similar example, if the at least one navigational action comprises a slight movement into an intended lane, and the target vehicle in the intended lane is in front of the host vehicle and accelerates, the navigational action may complete the lane change because changing lanes would not encroach on a no-drive zone between the host vehicle and the target vehicle.

Figure 26A:
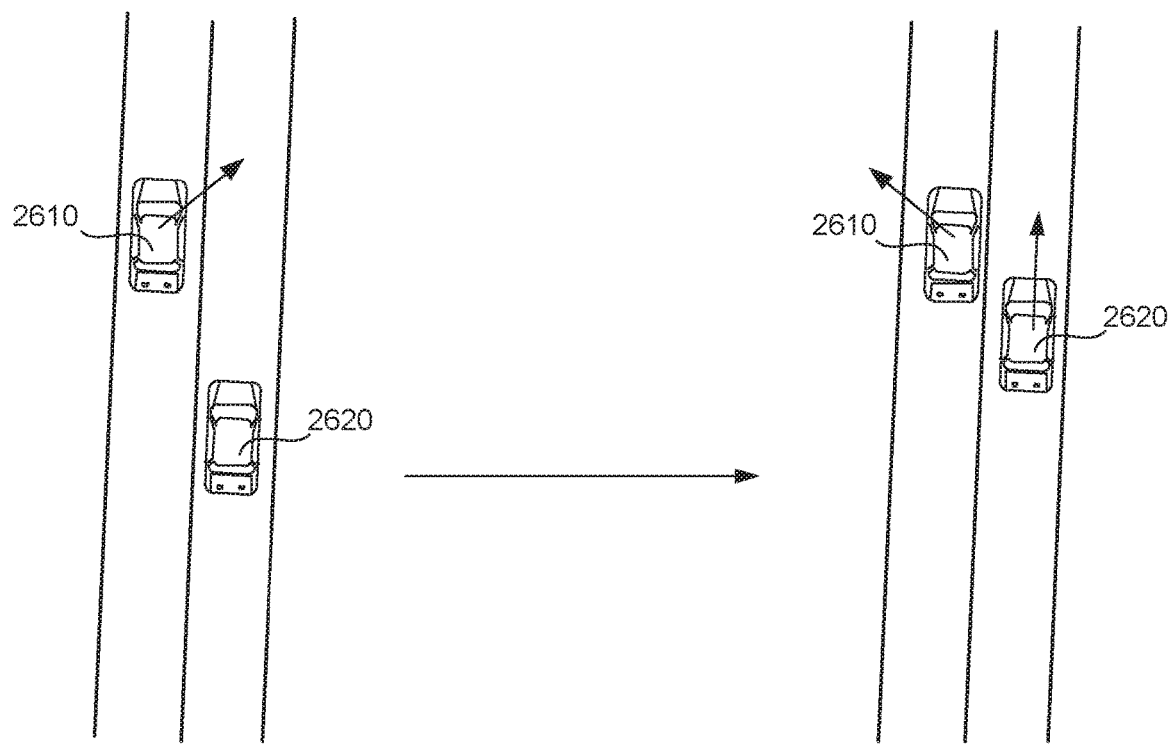
FIG. 26A provides a diagrammatic illustration of a host vehicle navigating based on automated negotiation with another vehicle consistent with the disclosed embodiments.

FIG. 26A is a diagram of host vehicle 2610 navigating based on automated negotiation with another vehicle 2620. In the example of FIG. 26A, host vehicle 2610 moves slightly into an adjoining lane as a navigational change to signal to target vehicle 2620 an intent to make a subsequent navigational maneuver of changing lanes (into the adjoining lane). In the example of FIG. 26A, target vehicle 2620 then changes its navigational state by accelerating. Accordingly, host vehicle 2620 moves back into its original lane based on the detected change in the navigational state of target vehicle 2620.

Figure 26B:
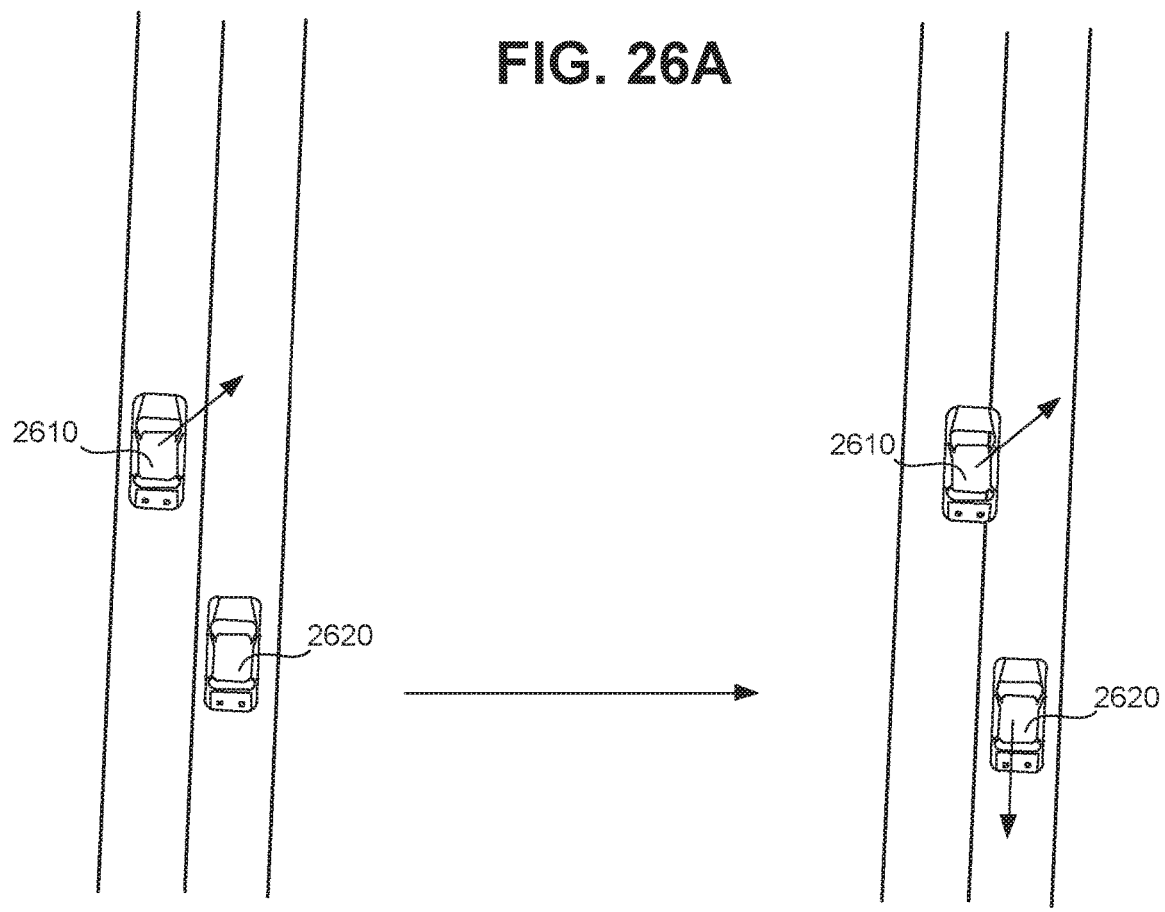
FIG. 26B provides another diagrammatic illustration of a host vehicle navigating based on automated negotiation with another vehicle consistent with the disclosed embodiments.

FIG. 26B is another diagram of host vehicle 2610 navigating based on automated negotiation with another vehicle 2620. In the example of FIG. 26B, host vehicle 2610 moves slightly into an adjoining lane as a navigational change to signal to target vehicle 2620 an intent to make a subsequent navigational maneuver of changing lanes (into the adjoining lane). In the example of FIG. 26B, target vehicle 2620 then changes its navigational state by slowing down. Accordingly, host vehicle 2620 completes its intended lane change into the adjoining lane based on the detected change in the navigational state of target vehicle 2620.

Figure 26C:
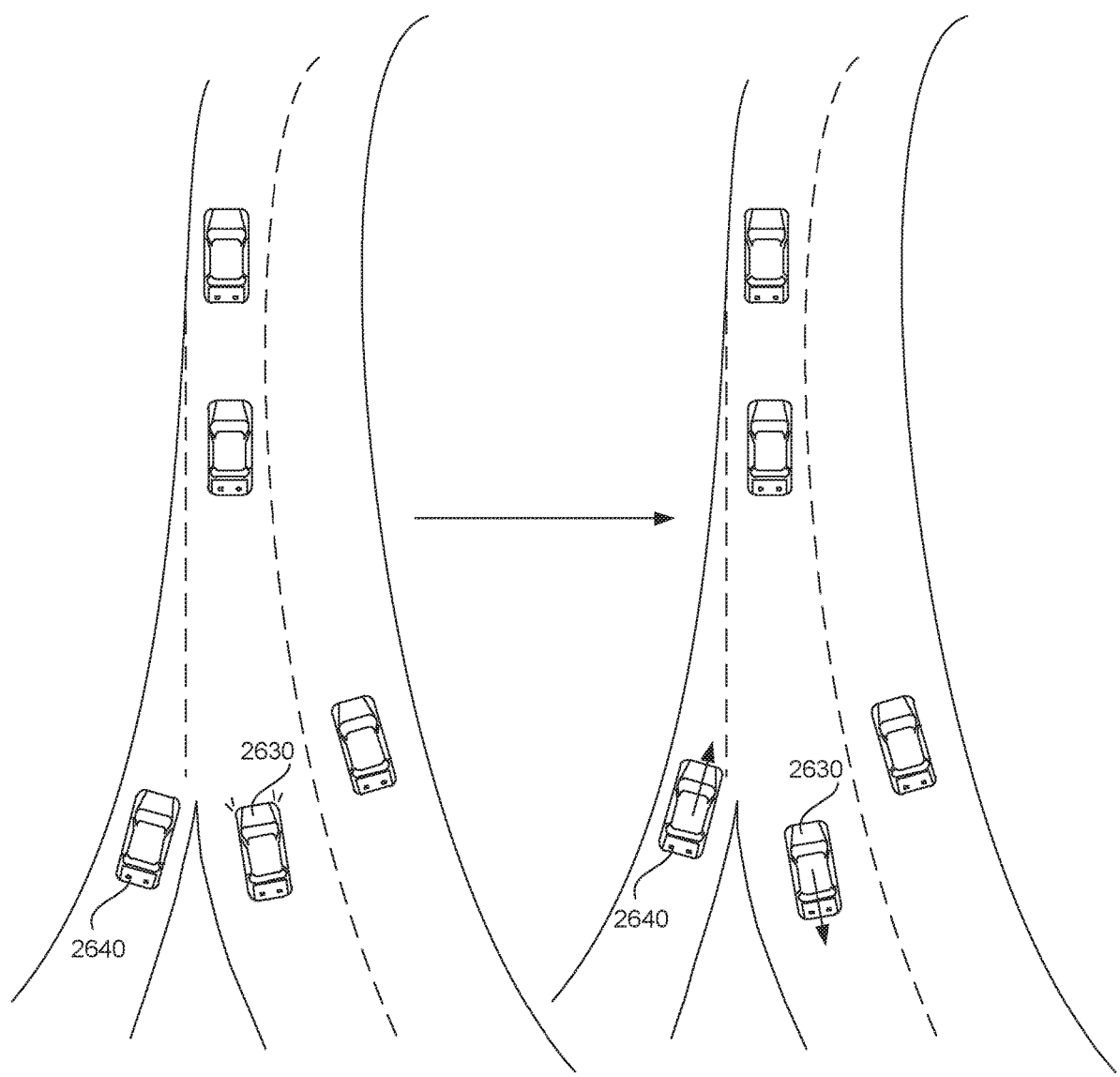
FIG. 26C provides a diagrammatic illustration of a host vehicle navigating based on automated negotiation with another vehicle in a lane into which the host vehicle is merging consistent with the disclosed embodiments.

FIG. 26C is a diagram of host vehicle 2630 navigating based on automated negotiation with another vehicle 2640 in a lane into which the host vehicle is merging. In the example of FIG. 26C, host vehicle 2630 flashes its headlights to signal to target vehicle 2640 an intent to make a subsequent navigational maneuver of yielding to target vehicle 2640. In the example of FIG. 26C, target vehicle 2640 then changes its navigational state by accelerating. Accordingly, host vehicle 2630 completes its intended yield (by slowing down) based on the detected change in the navigational state of target vehicle 2640. In an alternative example not depicted in FIG. 26C, target vehicle 2640 may change its navigational state by slowing down. Accordingly, host vehicle 2630 may cancel its intended yield (e.g., by accelerating) based on the detected change in the navigational state of target vehicle 2640.

Figure 26D:
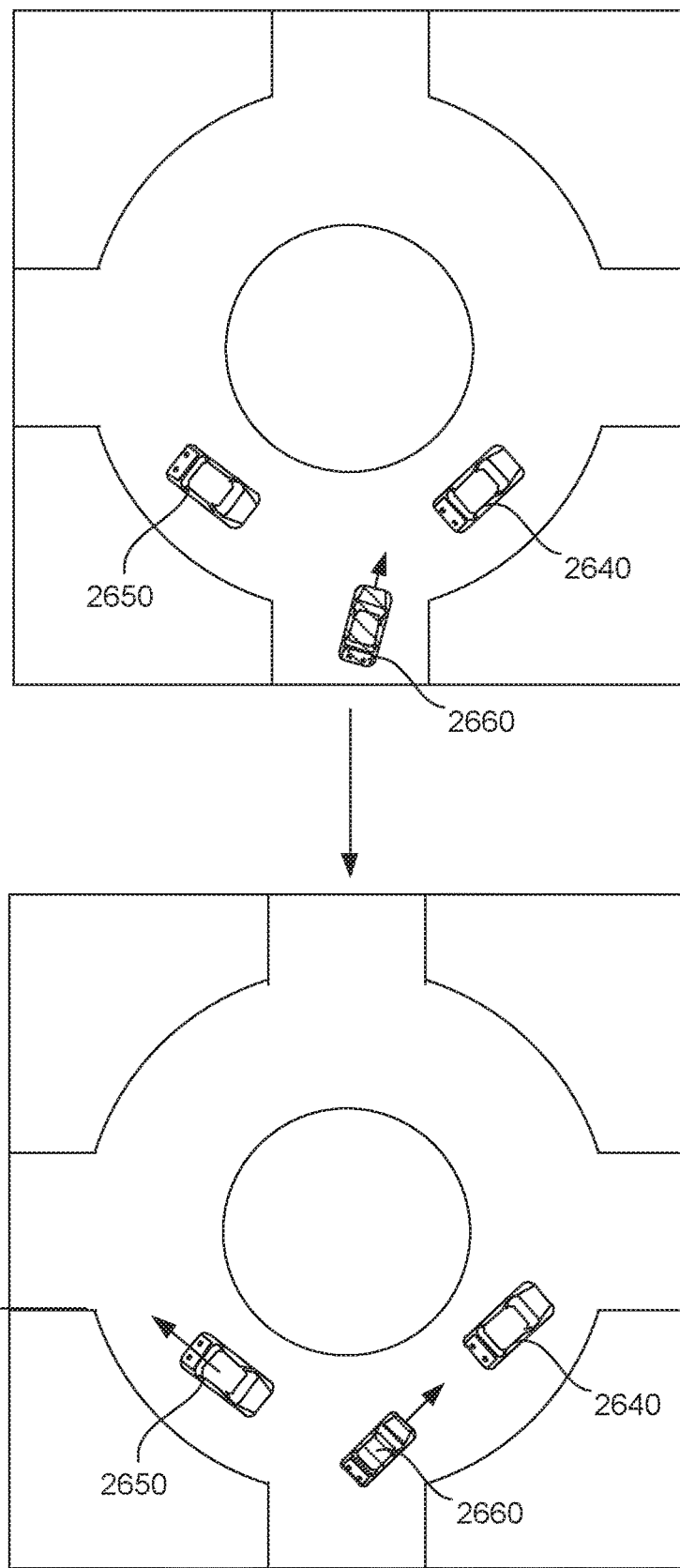
FIG. 26D provides a diagrammatic illustration of a host vehicle navigating based on automated negotiation with a first target vehicle and a second target vehicle in a traffic circle consistent with the disclosed embodiments.

FIG. 26D is a diagram of host vehicle 2660 navigating based on automated negotiation with a first target vehicle 2640 and a second target vehicle 2650 in a traffic circle. In the example of FIG. 26D, host vehicle 2660 determines a time for which the traffic circle will be open based on a distance between first target vehicle 2640 and second target vehicle 2650. Based on the determined time, host vehicle 2660 moves slightly into the traffic circle to signal to target vehicle 2650 an intent to make a subsequent navigational maneuver of entering the traffic circle. In the example of FIG. 26D, target vehicle 2650 then changes its navigational state by slowing down. Accordingly, host vehicle 2660 completes its intended entrance (by accelerating and full entering the traffic circle) based on the detected change in the navigational state of target vehicle 2650. In an alternative example not depicted in FIG. 26D, target vehicle 2650 may change its navigational state by accelerating. Accordingly, host vehicle 2660 may cancel its intended entrance (e.g., by braking) based on the detected change in the navigational state of target vehicle 2650.

Host vehicle 2660 may include memory 2500 described above and use the modules therein to perform the decisions depicted in FIGS. 26A-26D. Additionally or alternatively, host vehicle 2660 may execute method 2700 and/or method 2750 described below to perform the decisions depicted in FIGS. 26A-26D.

Figure 27A:
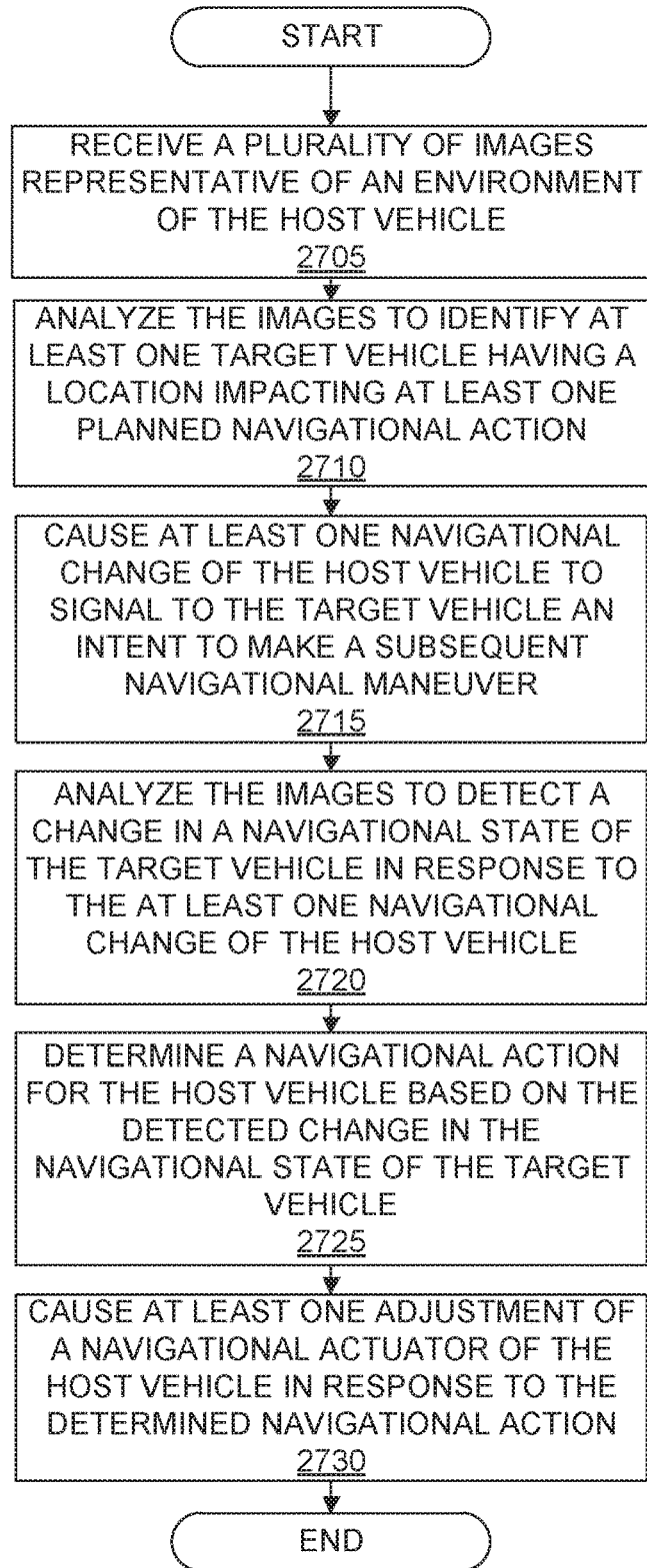
FIG. 27A provides an algorithmic flow chart for navigating a vehicle based on automated negotiation with other vehicles consistent with the disclosed embodiments.

FIG. 27A depicts a flow chart of method 2700 for navigating a vehicle based on automated negotiation with other vehicles. Method 2700 may, for example, be implemented by at least one processing device (e.g., processing device 110) of the host vehicle.

At step 2705, processing device 110 may receive, from a camera, a plurality of images representative of an environment of the host vehicle. For example, the camera may be at least one of image capture device 122, image capture device 124, and image capture device 126. The plurality of images may be captured from different angles (e.g., using different cameras) and/or at different times. In one particular example, the plurality of images may represent a plurality of temporal sequences of frames, each sequence covering the same period of time but at a unique angle.

In some embodiments, processing device 110 may receive additional information from other sensors in the host vehicle. For example, processing device 110 may receive information from a speedometer, a GPS, an accelerometer, a radar, a lidar, a suspension sensor, or the like.

At step 2710, processing device 110 may analyze the plurality of images to identify at least one target vehicle in the environment of the host vehicle. For example, processing device 110 may apply one or more image classifiers (optionally cascading classifiers) to identify the at least one target vehicle. One or more neural networks may be used in combination with or in lieu of the image classifiers.

In some embodiments, the target vehicle may have a location that impacts at least one planned navigational action of the host vehicle. For example, processing device 110 may determine the at least one planned navigational action and/or receive the at least one planned navigational action from one or more memories (e.g., after being determined by a different processing device on the host vehicle) and/or over one or more networks (e.g., from a remote server). Based on the at least one planned navigational action, processing device 110 may determine one or more zones that impact the at least one planned navigational action. In an example where the at least one planned navigation action includes merging into a lane, processing device 110 may determine a portion of the lane as a zone that impacts the at least one planned navigational action. In another example where the at least one planned navigation action includes entering a traffic circle, processing device 110 may determine a portion of the traffic circle (optionally with a portion of an entrance to the traffic circle) as a zone that impacts the at least one planned navigational action.

Accordingly, processing device 110 may identify the at least one target vehicle by applying one or more image classifiers only to the one or more zones (or within a margin of error of the one or more zones). Additionally or alternatively, processing device 110 may apply the one or more image classifiers to the whole images and then determine the at least one target vehicle as a subset of identified vehicles that are within the one or more zones. As explained previously, locations of the identified vehicles may be points (e.g., an identified or estimated center of the vehicle, an identified or estimate location of one or more wheels of the vehicle, or the like) optionally with an expected variance or margin of error. Accordingly, the identified vehicles may be classified as target vehicles if the points are within the one or more zones and/or if the expected variances or margins overlap with the one or more zones (optionally with a threshold of overlap, e.g., at least 0.5 m of overlap, at least 1 m of overlap, or the like). In other embodiments, locations of the identified vehicles may be regions (e.g., bounding boxes). Accordingly, the identified vehicles may be classified as target vehicles only if the regions overlap with the one or more zones (optionally with a threshold of overlap, e.g., at least 10% of the region overlaps, at least 20% of the region overlaps, or the like).

The at least one target vehicle may be in different locations of interest. For example, the target vehicle may be traveling in a lane adjacent to the host vehicle, included in a line of cars traversing a traffic circle, included in a line of cars in a lane into which a lane including the host vehicle is merging, or any combination thereof.

At step 2715, processing device 110 may cause at least one navigational change of the host vehicle to signal to the target vehicle an intent of the host vehicle to make a subsequent navigational maneuver. For example, the at least one navigational change of the host vehicle may include an application of brakes of the host vehicle to slow the host vehicle, changing a speed of the host vehicle, moving the host vehicle laterally within a lane of travel, moving the host vehicle toward a path of travel of the target vehicle, or any combination thereof. In one example, if the at least one planned navigational action includes changing lanes, the at least one navigational change may include a slight movement laterally towards (optionally into) an intended lane. In another example, if the at least one planned navigational action includes exiting a highway or interstate, the at least one navigational change may include application of brakes of the host vehicle. In yet another example, if the at least one planned navigational action includes merging into a merged lane, the at least one navigational change may include acceleration of the host vehicle and/or slight movement laterally towards (optionally into) the merged lane. In still a further example, if the at least one planned navigational action includes entering a traffic circle, the at least one navigational change may include acceleration of the host vehicle and/or slight movement into the traffic circle. In another example, if the at least one planned navigational action includes exiting a traffic circle, the at least one navigational change may include braking of the host vehicle and/or slight movement out of the traffic circle.

At step 2720, processing device 110 may analyze the plurality of images to detect a change in a navigational state of the target vehicle in response to the at least one navigational change in the host vehicle. For example, the detected reaction of the target vehicle may include the target vehicle slowing, the target vehicle changing lanes, or any combination thereof.

At step 2725, processing device 110 may determine a navigational action for the host vehicle based on the detected change in the navigational state of the target vehicle. For example, processing device 110 may receive an updated plurality of images used to detect the change. Similar to the at least one target vehicle, processing device 110 may apply one or more image classifiers (optionally cascading classifiers) to the updated images to identify the detected change. Additionally or alternatively, processing device 110 may calculate an optical flow of the updated images to detect a change such as an acceleration of the target vehicle, a slowing down of the target vehicle, a lateral movement of the target vehicle, or the like. One or more neural networks may be used in combination with or in lieu of the image classifiers and/or optical flow algorithms.

In embodiments where the detected change indicates that the target vehicle is allowing the at least one planned navigational action, the determined navigational action may be calculated to complete the at least one planned navigational action. For example, if the at least one navigational change includes a slight movement laterally towards (optionally into) an intended lane, a detected change of an acceleration of or a slowing down of the target vehicle such that a gap opens in the intended lane may indicate allowance of the intended lane change. In another example, if the at least one navigational change includes application of brakes of the host vehicle, a detected change of lateral movement into another lane may indicate allowance of the intended exit off a highway or interstate. In yet another example, if the at least one navigational change includes acceleration of the host vehicle and/or slight movement laterally towards (optionally into) a merged lane, a detected change of slowing down of the target vehicle such that a gap opens in the intended lane and/or a flashing of headlights of the target vehicle may indicate allowance of the intended merge. In still a further example, if the at least one navigational change includes acceleration of the host vehicle and/or slight movement into a traffic circle, a detected change of slowing down of the target vehicle such that a gap opens in the intended lane and/or a flashing of headlights of the target vehicle may indicate allowance of the intended entrance to the traffic circle. In another example, if the at least one navigational change includes braking of the host vehicle and/or slight movement out of a traffic circle, a detected change of lateral movement into another lane may indicate allowance of the intended exit out of the traffic circle.

On the other hand, in embodiments where the detected change indicates that the target vehicle is denying the at least one planned navigational action, the determined navigational action may be calculated to cancel the at least one planned navigational action. For example, if the at least one navigational change includes a slight movement laterally towards (optionally into) an intended lane, a detected change of an acceleration of or a slowing down of the target vehicle such that the target vehicle impedes movement of the host vehicle into the intended lane may indicate denial of the intended lane change. In another example, if the at least one navigational change includes application of brakes of the host vehicle, a detected change of an acceleration of or a slowing down of the target vehicle such that the target vehicle impedes the host vehicle from exiting a highway or interstate may indicate denial of the intended exit off the highway or interstate. In yet another example, if the at least one navigational change includes acceleration of the host vehicle and/or slight movement laterally towards (optionally into) a merged lane, a detected change of accelerating of the target vehicle such that the target vehicle impedes movement of the host vehicle into the merged lane may indicate denial of the intended merge. In still a further example, if the at least one navigational change includes acceleration of the host vehicle and/or slight movement into a traffic circle, a detected change of acceleration of the target vehicle such that the target vehicle impedes entry of the host vehicle into the traffic circle may indicate denial of the intended entrance to the traffic circle. In another example, if the at least one navigational change includes braking of the host vehicle and/or slight movement out of a traffic circle, a detected change of an acceleration of or a slowing down of the target vehicle such that the target vehicle impedes the host vehicle from exiting the traffic circle may indicate denial of the intended exit out of the traffic circle.

At step 2730, processing device 110 may cause at least one adjustment of a navigational actuator of the host vehicle in response to the determined navigational action for the host vehicle. For example, if the determined navigational action is a lateral movement of the host vehicle, processing device 110 may adjust a steering mechanism of the host vehicle. Similarly, if the determined navigational action is an acceleration of the host vehicle, processing device 110 may adjust an accelerator of the host vehicle. Moreover, if the determined navigational action is a slowing down of the host vehicle, processing device 110 may adjust a brake of the host vehicle.

Method 2700 may include additional steps. For example, method 2700 may further include issuing one or more additional indicators to the target vehicle of an intent for making the subsequent maneuver. The one or more additional indicators may include a light flash (e.g., from a headlight, a taillight, a brake light, a turn signal, or the like). For example, a slight braking of the host vehicle may be coupled with a flashing of the brake light to signal an intention to slow down (e.g., if the host vehicle is exiting a highway or interstate or a traffic circle). In another example, a slight braking of the host vehicle may be coupled with a flashing of the headlights to signal an intention to yield to the target vehicle. In yet another example, a slight acceleration, slight braking, and/or slight movement laterally may be coupled with a flashing of the turn signal to signal an intention to change lanes.

Additionally or alternatively, the one or more additional indicators include an informational signal wirelessly transmitted to the target vehicle. For example, the informational signal may be transmitted using a cellular network (such as 4G, LTE, or the like), a limited-area wireless network (such as Bluetooth, Wi-Fi, or the like), a direct radio frequency signal, or any combination thereof.

Figure 27B:
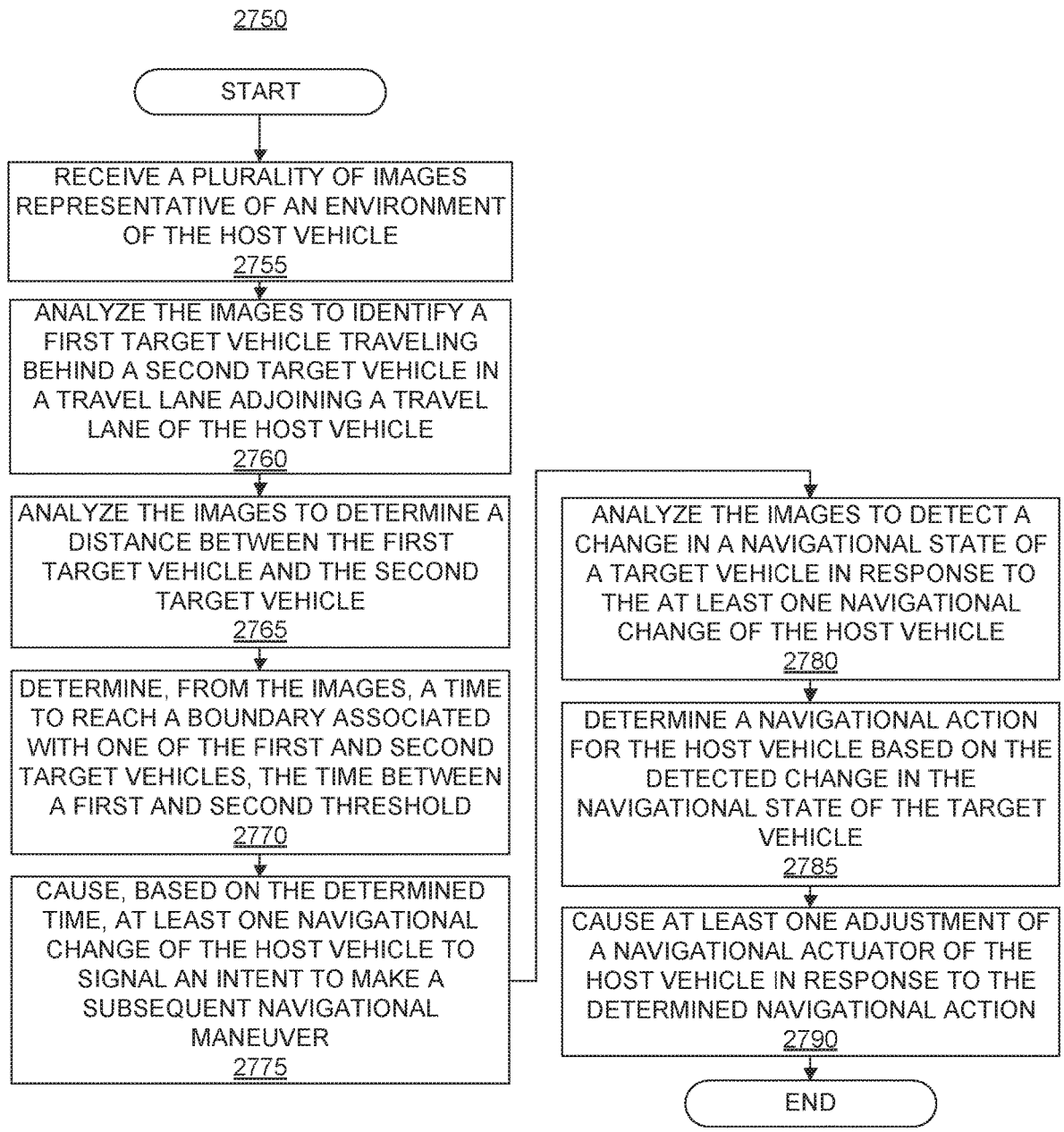
FIG. 27B provides another algorithmic flow chart for navigating a vehicle based on automated negotiation with other vehicles consistent with the disclosed embodiments.

FIG. 27B depicts a flow chart of method 2750 for navigating a vehicle based on automated negotiation with other vehicles. Method 2750 may, for example, be implemented by at least one processing device (e.g., processing device 110) of the host vehicle.

At step 2755, processing device 110 may receive, from a camera, a plurality of images representative of an environment of the host vehicle. For example, step 2755 of method 2750 may be executed similarly to step 2705 of method 2700, described above.

At step 2760, processing device 110 may analyze the plurality of images to identify a first target vehicle and a second target vehicle in the environment of the host vehicle. For example, processing device 110 may apply one or more image classifiers (optionally cascading classifiers) to identify the first target vehicle and the second target vehicle. One or more neural networks may be used in combination with or in lieu of the image classifiers.

The first target vehicle may be traveling behind the second target vehicle in a travel lane adjoining a travel lane in which the host vehicle is traveling. For example, processing device 110 may apply one or more image classifiers (optionally cascading classifiers) to identify lane boundaries (e.g., by identifying one or more road markings, as discussed previously) and classifying the travel lane of the first target vehicle and the second target vehicle (and/or the travel lane of the host vehicle) accordingly. Additionally or alternatively, the travel lane of the first target vehicle and the second target vehicle may be determined using one or more optical flows of the plurality of images, allowing for a determination of predicted trajectories of the first target vehicle and the second target vehicle and a determination of the associated travel lane based on the trajectories. Additionally or alternatively, the travel lane of the host vehicle may be determined using a historical trajectory of the host vehicle and/or a predicted trajectory of the host vehicle (optionally with feedback from one or more sensors such as a speedometer and/or a GPS in addition to the plurality of images).

At step 2765, processing device 110 may analyze the plurality of images to determine a distance between the first target vehicle and the second target vehicle. For example, as explained above, processing device 110 may apply one or more classifiers to identify one or more portions (e.g., a headlight, a taillight, a wheel, or the like) of the first target vehicle and the second target vehicle. A distance between the identified portions may be estimated using the plurality of images. Additionally or alternatively, the one or more classifiers may estimate a bounding box of the first target vehicle and a bounding box of the second target vehicle and determine a distance between the two estimated bounding boxes. Additionally or alternatively, processing device 110 may apply one or more classifiers to determine a year, make, and/or model of the first target vehicle and the second target vehicle and then use known information about types of vehicles (e.g., dimensions such as widths and lengths) to estimate the distance. In one particular example, processing device 110 may identify the first target vehicle as a 2014 Toyota Corolla and the second target vehicle as a 2018 Lexus RX 350 and use a known length of the 2014 Toyota Corolla and/or the 2018 Lexus RX 350 to estimate the distance between the first target vehicle and the second target vehicle. One or more neural networks may be used in combination with or in lieu of the image classifiers.

At step 2770, processing device 110 may determine, from the plurality of images, a time to reach a boundary associated with one of the first target vehicle and the second target vehicle. For example, the boundary may include the expected closing of a gap between the first target vehicle and the second target vehicle. The determined time may exceed a first threshold and not exceed a second threshold, the second threshold being greater than the first threshold.

At step 2775, processing device 110 may cause, based on the determined time, at least one navigational change of the host vehicle to signal to the target vehicle an intent of the host vehicle to make a subsequent navigational maneuver. For example, step 2775 of method 2750 may be executed similarly to step 2715 of method 2700, described above, but may cause the at least one navigational change based on the determined time. The at least one navigational change may include a slight movement into a gap between the first target vehicle and the second target vehicle, the quickness of the movement being calculated based on the determined time.

At step 2780, processing device 110 may analyze the plurality of images to detect a change in a navigational state of the target vehicle in response to the at least one navigational change in the host vehicle. For example, step 2780 of method 2750 may be executed similarly to step 2720 of method 2700, described above.

At step 2785, processing device 110 may determine a navigational action for the host vehicle based on the detected change in the navigational state of the target vehicle. For example, step 2785 of method 2750 may be executed similarly to step 2725 of method 2700, described above.

At step 2790, processing device 110 may cause at least one adjustment of a navigational actuator of the host vehicle in response to the determined navigational action for the host vehicle. For example, step 2790 of method 2750 may be executed similarly to step 2730 of method 2700, described above.

Method 2750 may include additional steps. For example, method 2750 may further include issuing one or more additional indicators to the target vehicle of an intent for making the subsequent maneuver. The one or more additional indicators may include a light flash, as explained above with respect to method 2700. Additionally or alternatively, the one or more additional indicators include an informational signal wirelessly transmitted to the target vehicle, as explained above with respect to method 2700.

Navigating Based on Behaviors of Following Vehicles

In some embodiments, a navigation system of a host vehicle may monitor a following vehicle and determine parameters such as a following distance, relative velocity, and/or relative acceleration. Based on values associated with any of these parameters, a combination of these parameters, or quantities dependent on these parameters (e.g., a time to collision should the host vehicle brake), the host vehicle may make one or more navigational changes. This may allow the host vehicle to increase safety and efficiency as well as increase passenger comfort by accounting for following vehicles in addition to leading vehicles. Such a capability may reduce the need for human intervention as well as increase safety beyond the limits of humans, at least in part because the human brain is limited in its ability to account for and react to leading vehicles and following vehicles in a seamless (and near simultaneous) manner.

In some embodiments, the navigation system may cause navigational changes of the host vehicle in response to monitoring the following vehicle. For example, the host vehicle may change lanes, slow down to increase a distance to a leading vehicle, reduce a maximum allowable braking rate, or the like when an indicator of a time to collision with the following vehicle is less than a predetermined threshold.

Figure 28:
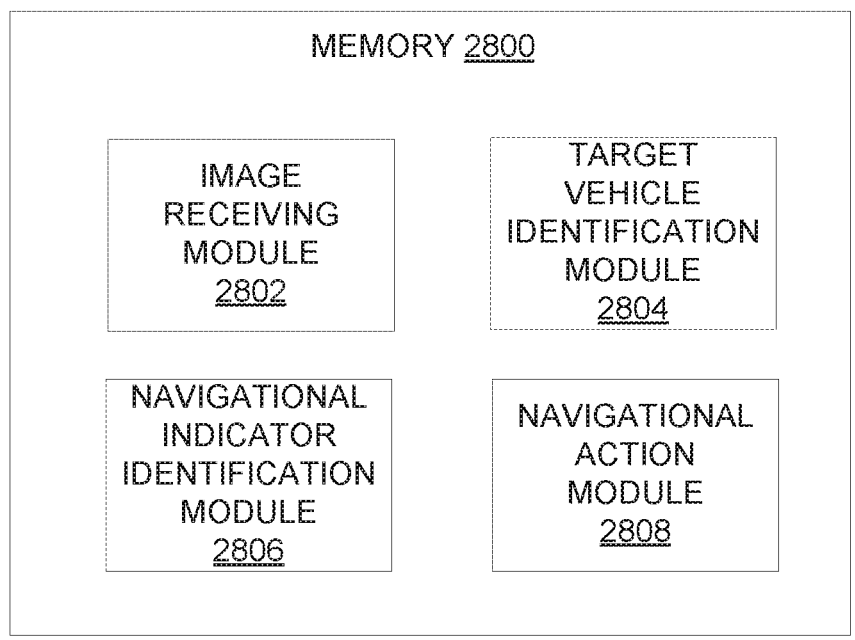
FIG. 28 is an exemplary block diagram of a memory configured to store instructions for navigating using behavior of a following vehicle consistent with the disclosed embodiments.

FIG. 28 is a block diagram of memory 2800 configured to store instructions for navigating using behavior of a following vehicle. Although depicted as a single memory in FIG. 28, memory 2800 may comprise one or more non-volatile (e.g., hard disk drive, flash memory, etc.) and/or volatile (e.g., RAM or the like) memories. In some embodiments, memory 2800 may be included in system 100. For example, memory 2800 may comprise, at least in part, a portion of one or more memory units 140, 150.

As depicted in FIG. 28, memory 2800 may include an image receiving module 2802. Image receiving module 2802 may receive, from a rearward-facing camera, a plurality of images representative of an environment behind the host vehicle. The plurality of images may be received directly from the rearward-facing camera (e.g., using one or more buses), retrieved from one or more memories storing images from the rearward-facing camera, and/or over one or more computer networks, whether from the rearward-facing camera directly or from one or more memories connected to the network(s).

In some embodiments, module 2802 may receive alternative or additional information from other sensors in the host vehicle. For example, module 2802 may receive information from at least one of a speedometer, a GPS, an accelerometer, a radar, a lidar, a suspension sensor, or the like.

As further depicted in FIG. 28, memory 2800 may include a target vehicle identification module 2804. Target vehicle identification module 2804 may analyze the plurality of images received via image receiving module 2802 to identify at least one target vehicle in the environment behind the host vehicle. For example, target vehicle identification module 2804 may apply one or more image classifiers (optionally cascading classifiers) to identify the at least one target vehicle in the plurality of images. One or more neural networks may be used in combination with or in lieu of any of the techniques described above. As depicted in FIG. 28, memory 2800 may further include a navigational indicator identification module 2806. Navigational indicator identification module 2806 may identify, based on analysis of the plurality of images, an indicator of at least one navigational characteristic of the target vehicle. For example, the at least one navigational characteristic of the target vehicle may include a relative acceleration between the target vehicle and the host vehicle, a relative velocity between the target vehicle and the host vehicle, a follow distance between the target vehicle and the host vehicle, a time to collision between the target vehicle and the host vehicle, or the like.

In some embodiments, navigational indicator identification module 2806 may apply one or more image classifiers (optionally cascading classifiers) to identify the navigational indicator in the plurality of images. The one or more image classifiers may be applied to a portion of the images including the at least one target vehicle. For example, identifying the target vehicle may include calculating a bounding box for the identified vehicle such that the one or more classifiers for identifying the navigational indicator may be applied to the bounding box (or to an area including the bounding box and a buffer around the bounding box).

Additionally or alternatively, navigational indicator identification module 2806 may calculate an optical flow between the images to identify the at least one navigational characteristic. For example, the optical flow may allow for calculation of an absolute and/or a relative velocity of the target vehicle. Further processing may be performed on the results of the one or more classifiers and/or optical flow algorithms. For example, navigational indicator identification module 2806 may calculate a relative acceleration, a time to collision, a braking distance, or the like based on a velocity of the target vehicle. In another example, navigational indicator identification module 2806 may calculate a follow distance based on a location (e.g., a point location, a bounding box, or the like) of the target vehicle. One or more neural networks may be used in combination with or in lieu of any of the techniques described above.

Finally, memory 2800 may include a navigational action module 2808. Navigational action module 2808 may determine a navigational action for the host vehicle based on the identified at least one navigational characteristic of the target vehicle. For example, the determined navigational action for the host vehicle may include slowing the host vehicle to increase a gap between the host vehicle and a leading vehicle ahead of the host vehicle, navigating the host vehicle from a current travel lane to a different travel lane, reducing a maximum allowable braking rate for the host vehicle, or the like. In one example, if the at least one navigational characteristic includes a time to collision that is less than a threshold, the determined navigational action may include slowing the host vehicle and/or navigating the host vehicle from a current travel lane to a different travel lane. In another example, if the at least one navigational characteristic includes a follow distance that is less than a threshold, the determined navigational action may include accelerating the host vehicle and/or navigating the host vehicle from a current travel lane to a different travel lane. In yet another example, if the at least one navigational characteristic includes a relative velocity that is higher than a threshold, the determined navigational action may include reducing a maximum allowable braking rate for the host vehicle and/or navigating the host vehicle from a current travel lane to a different travel lane. In still a further example, if the at least one navigational characteristic includes a relative acceleration that is higher than a threshold, the determined navigational action may include slowing the host vehicle and/or navigating the host vehicle from a current travel lane to a different travel lane.

In some embodiments, navigational action module 2808 may also cause at least one adjustment of a navigational actuator of the host vehicle in response to the determined navigational action for the host vehicle. As explained above, a navigational actuator may include at least one of a steering mechanism, a brake, or an accelerator.

Figure 29A:
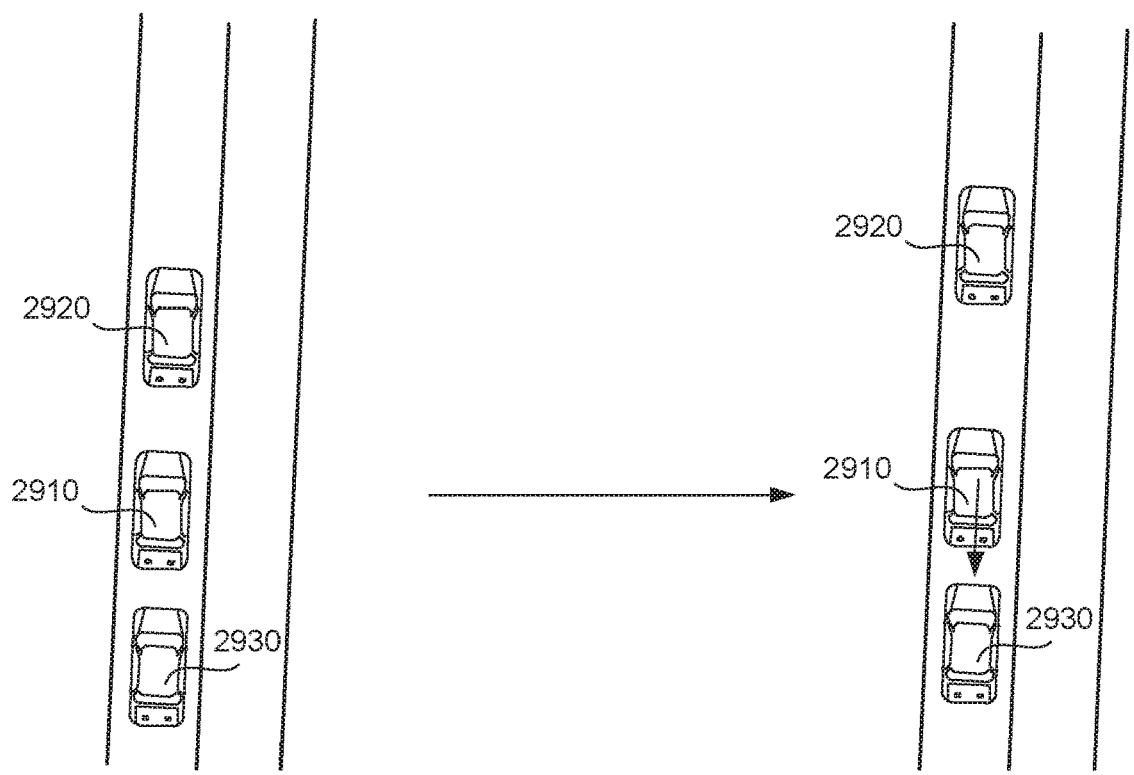
FIG. 29A provides a diagrammatic illustration of a host vehicle navigating based on behavior of a following vehicle consistent with the disclosed embodiments.

FIG. 29A is a diagram of host vehicle 2910 navigating based on behavior of a following vehicle 2930. In the example of FIG. 29A, host vehicle 2910 slows down in response to an indicator that a time to collision with following vehicle 2930 is less than a predetermined threshold. Accordingly, host vehicle 2910 may prevent a cascading collision by ensuring that host vehicle 2910 will not be pushed into leading vehicle 2920 if following vehicle 2930 collides with host vehicle 2910. Moreover, host vehicle 2910 may encourage following vehicle 2930 to change lanes in order to safety pass host vehicle 2910 rather than continue tailgating host vehicle 2910.

Figure 29B:
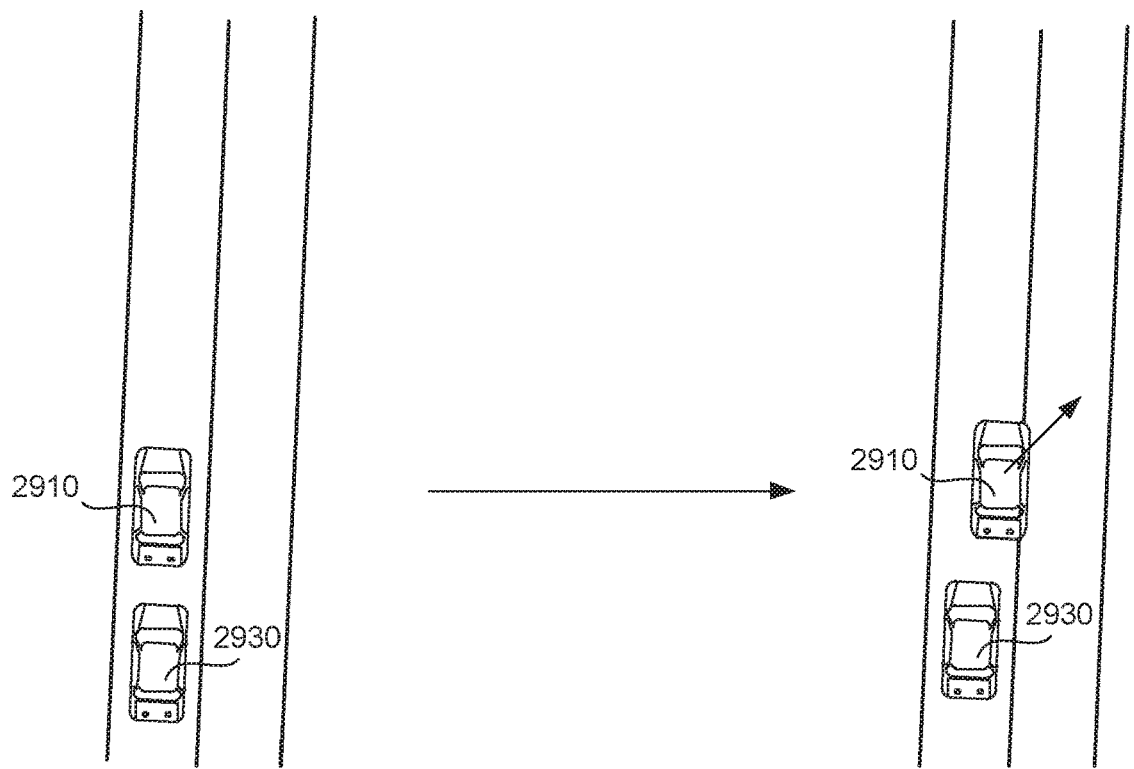
FIG. 29B provides another diagrammatic illustration of a host vehicle navigating based on behavior of a following vehicle consistent with the disclosed embodiments.

FIG. 29B is another diagram of host vehicle 2910 navigating based on behavior of a following vehicle 2930. In the example of FIG. 29B, host vehicle 2910 changes lanes in response to an indicator that a time to collision with following vehicle 2930 is less than a predetermined threshold. Accordingly, host vehicle 2910 may prevent a collision by changing lanes. Moreover, host vehicle 2910 may encourage following vehicle 2630 to safety pass host vehicle 2910 rather than change lanes and continue tailgating host vehicle 2910.

Host vehicle 2910 may include memory 2800 described above and use the modules therein to perform the decisions depicted in FIGS. 29A and 29B. Additionally or alternatively, host vehicle 2910 may execute method 3000 described below to perform the decisions depicted in FIGS. 29A and 29B.

Figure 30:
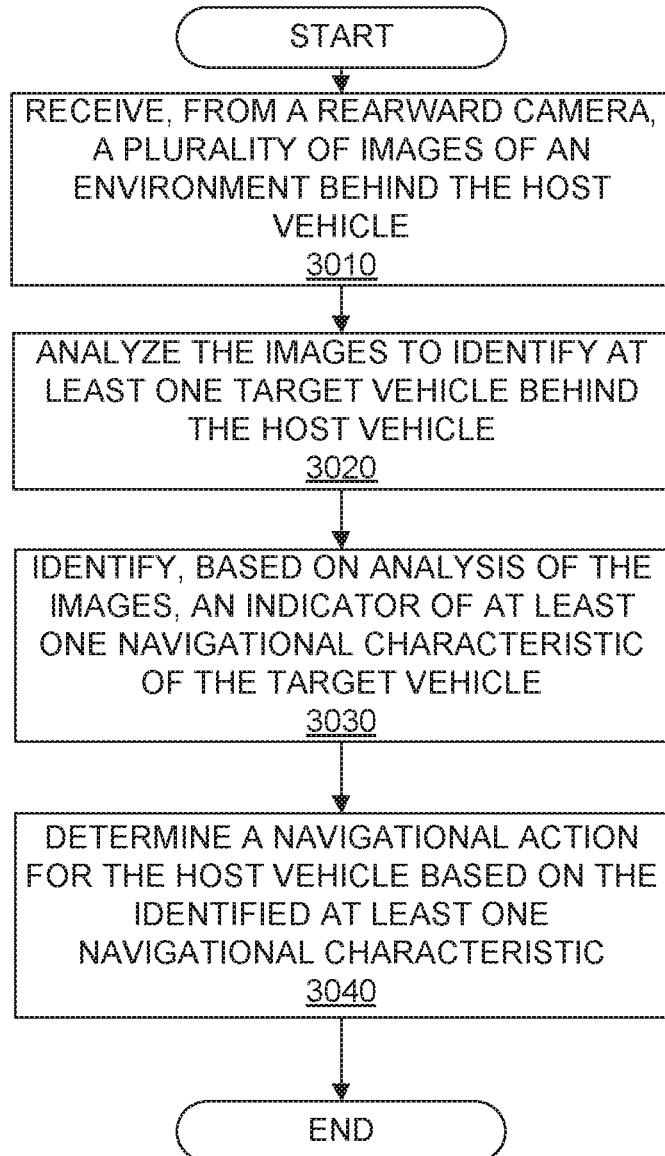
FIG. 30 provides an algorithmic flow chart for navigating a vehicle based on behavior of a following vehicle consistent with the disclosed embodiments.

FIG. 30 depicts a flow chart of method 3000 for navigating a vehicle based on behavior of a following vehicle. Method 3000 may, for example, be implemented by at least one processing device (e.g., processing device 110) of the host vehicle.

At step 3010, processing device 110 may receive, from a rearward-facing camera, a plurality of images representative of an environment behind the host vehicle. In some embodiments, the plurality of images may be captured from different angles (e.g., using different cameras) and/or at different times. In one particular example, the plurality of images may represent a plurality of temporal sequences of frames, each sequence covering the same period of time but at a unique angle.

At step 3020, processing device 110 may analyze the plurality of images to identify at least one target vehicle in the environment behind the host vehicle. For example, processing device 110 may apply one or more image classifiers (optionally cascading classifiers) to identify the at least one target vehicle in the plurality of images. One or more neural networks may be used in combination with or in lieu of any of the techniques described above.

At step 3030, processing device 110 may identify, based on analysis of the plurality of images, an indicator of at least one navigational characteristic of the target vehicle. For example, the at least one navigational characteristic of the target vehicle may include a relative acceleration between the target vehicle and the host vehicle, a relative velocity between the target vehicle and the host vehicle, a follow distance between the target vehicle and the host vehicle, a time to collision between the target vehicle and the host vehicle, or the like. In some embodiments, processing device 110 may apply one or more image classifiers (optionally cascading classifiers) to identify the navigational indicator in the plurality of images. The one or more image classifiers may be applied to the images as a whole and/or to one or more portions of the images including the at least one target vehicle, such as a bounding box of the target vehicle (optionally with a buffer around the bounding box). Additionally or alternatively, processing device 110 may calculate an optical flow between the images to identify the at least one navigational characteristic. For example, the optical flow may allow for calculation of an absolute and/or a relative velocity of the target vehicle. Further processing may be performed on the results of the one or more classifiers and/or optical flow algorithms. For example, processing device 110 may calculate a relative acceleration, a time to collision, a braking distance, or the like based on a velocity of the target vehicle; may calculate a follow distance based on a location (e.g., a point location, a bounding box, or the like) of the target vehicle; etc. One or more neural networks may be used in combination with or in lieu of any of the techniques described above.

At step 3040, processing device 110 may determine a navigational action for the host vehicle based on the identified at least one navigational characteristic of the target vehicle. For example, the determined navigational action for the host vehicle may include slowing the host vehicle to increase a gap between the host vehicle and a leading vehicle ahead of the host vehicle, navigating the host vehicle from a current travel lane to a different travel lane, reducing a maximum allowable braking rate for the host vehicle, or the like.

Method 3000 may include additional steps. For example, method 3000 may further include causing at least one adjustment of a navigational actuator of the host vehicle in response to the determined navigational action for the host vehicle. In one particular example example, if the determined navigational action is a lateral movement of the host vehicle, processing device 110 may adjust a steering mechanism of the host vehicle. Similarly, if the determined navigational action is an acceleration of the host vehicle, processing device 110 may adjust an accelerator of the host vehicle. Moreover, if the determined navigational action is a slowing down of the host vehicle, processing device 110 may adjust a brake of the host vehicle.

Navigating Based on Sensed Brake Light Patterns

In some embodiments, a navigation system of a host vehicle may monitor a braking characteristic of a leading vehicle. Based on the braking characteristic, the host vehicle may make one or more navigational changes—e.g., when the leading vehicle is determined to be braking frequently or erratically. Such frequent or erratic braking may indicate that the leading vehicle is following another vehicle at an unsafe distance and/or is driven by a driver that lacks focus and/or is having difficulty staying awake.

In some embodiments, the navigation system may cause navigational changes of the host vehicle in response to the braking characteristic. For example, the host vehicle may slow down, increase a following distance to the target vehicle, change lanes, or the like. Such a capability may allow for an autonomous vehicle to preemptively avoid dangerous drivers and/or situation without the need for human intervention.

Figure 31:
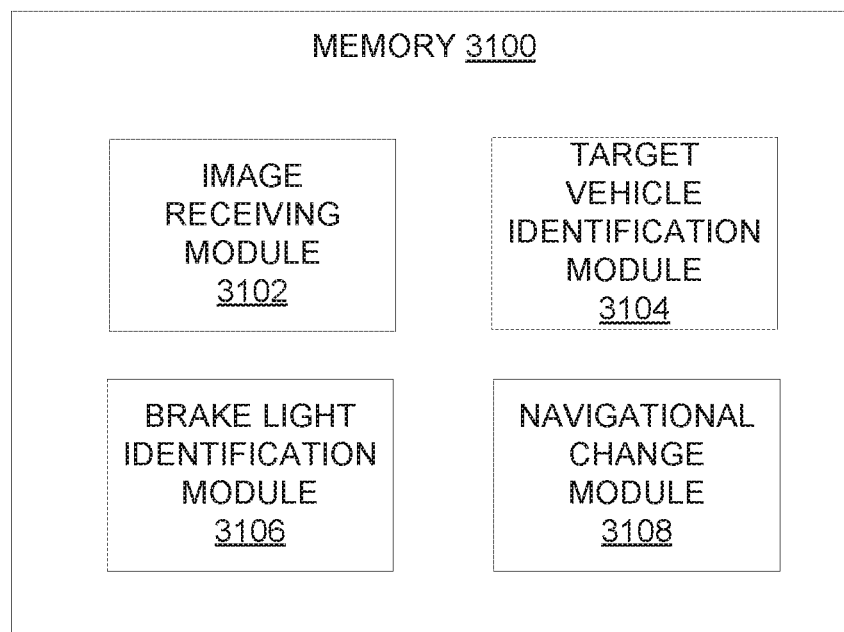
FIG. 31 is an exemplary block diagram of a memory configured to store instructions for navigating using sensed brake light patterns consistent with the disclosed embodiments.

FIG. 31 is a block diagram of memory 3100 configured to store instructions for navigating using sensed brake light patterns. Although depicted as a single memory in FIG. 31, memory 3100 may comprise one or more non-volatile (e.g., hard disk drive, flash memory, etc.) and/or volatile (e.g., RAM or the like) memories. In some embodiments, memory 3100 may be included in system 100. For example, memory 3100 may comprise, at least in part, a portion of one or more memory units 140, 150.

As depicted in FIG. 31, memory 3100 may include an image receiving module 3102. Image receiving module 3201 may receive, from a camera, a plurality of images representative of an environment ahead of the host vehicle. The plurality of images may be received directly from the camera (e.g., using one or more buses), retrieved from one or more memories storing images from the camera, and/or over one or more computer networks, whether from the camera directly or from one or more memories connected to the network(s).

In some embodiments, module 3102 may receive alternative or additional information from other sensors in the host vehicle. For example, module 3102 may receive information from at least one of a speedometer, a GPS, an accelerometer, a radar, a lidar, a suspension sensor, or the like.

As further depicted in FIG. 31, memory 3100 may include a target vehicle identification module 3104. Target vehicle identification module 3104 may analyze the plurality of images to identify at least one target vehicle in the environment ahead of the host vehicle. For example, target vehicle identification module 3104 may apply one or more image classifiers (optionally cascading classifiers) to identify the at least one target vehicle in the plurality of images. One or more neural networks may be used in combination with or in lieu of any of the techniques described above. For example, the one or more neural networks may be trained using a training set of images having associated target vehicles and minimizing a loss function associated therewith. The one or more neural networks may continue to be trained using real data. For example, feedback from human drivers may be received and incorporated into the one or more neural networks to improve accuracy. In some embodiments, the training and/or feedback incorporation may be performed remotely from the host vehicle (e.g., on one or more remote servers). Accordingly, the one or more neural networks (as well as updates thereto) may be sent to the host vehicle from the one or more remote servers. Alternatively, the host vehicle may send images to the one or more remote servers for processing on the one or more neural networks.

As depicted in FIG. 31, memory 3100 may further include a brake light identification module 3106. Brake light identification module 3106 may identify, based on analysis of the plurality of images, at least one brake light associated with the target vehicle. Similar to target vehicle identification module 3104, brake light identification module 3106 may apply one or more image classifiers (optionally cascading classifiers) to identify the at least one brake light in the plurality of images. The one or more image classifiers may be applied to a portion of the images including the at least one target vehicle. For example, identifying the target vehicle may include calculating a bounding box for the identified vehicle such that the one or more classifiers for identifying the brake light may be applied to the bounding box (or to an area including the bounding box and a buffer around the bounding box). One or more neural networks may be used in combination with or in lieu of any of the techniques described above.

Brake light identification module 3106 may further identify, based on analysis of the plurality of images, at least one characteristic associated with changes in an illumination state of the at least one brake light. For example, the at least one characteristic may include a frequency at which the illumination state of the at least one brake light changes, a length of time the at least one brake light remains illuminated after activation, a number of times over a predetermined time interval that the at least one brake light is activated, a pattern over a period of time, or any combination thereof.

In some embodiments, brake light identification module 3106 may apply one or more image classifiers (optionally cascading classifiers) to identify the at least one characteristic in the plurality of images. The one or more image classifiers may be applied to a portion of the images including the at least one target vehicle or a portion of the images include the at least one brake light. For example, identifying the target vehicle or the brake light may include calculating a bounding box for the identified vehicle or identified brake light such that the one or more classifiers for identifying the characteristic may be applied to the bounding box (or to an area including the bounding box and a buffer around the bounding box). One or more neural networks may be used in combination with or in lieu of any of the techniques described above. Additionally or alternatively to using a plurality of images, modules 3102, 3104, and 3106 may cooperate to receive, from the at least one target vehicle, a wireless signal. Such a signal may be received directly from the target vehicle (e.g., as a radio frequency signal), transmitted from the target vehicle to the host vehicle over one or more computer networks (e.g., 4G, LTE, Wi-Fi, Bluetooth, etc.), and/or transmitted from the target vehicle to one or more remote servers and then relayed from the server(s) to the host vehicle. The signal may indicate that the target vehicle has depressed its brakes. The signal may further include a length of time for which the brakes are depressed. Alternatively, the server(s) and/or host vehicle may calculate the length of time based on a time of transmission/receipt of a signal indicating the brakes are depressed and a time of transmission/receipt of a signal indicating the brakes are released.

Finally, memory 3100 may include a navigational change module 3108. Navigational change module 3108 may cause a navigational change for the host vehicle based on the identified at least one characteristic associated with the changes in the illumination state of the at least one brake light. For example, the navigational change for the host vehicle may include slowing the host vehicle to increase a gap between the host vehicle and the target vehicle, navigating the host vehicle from a current travel lane to a different travel lane, or the like. In one particular example, if the at least one characteristic includes a frequency at which the illumination state of the at least one brake light changes that is above a threshold, the determined navigational action may include slowing the host vehicle to increase a gap between the host vehicle and the target vehicle and/or navigating the host vehicle from a current travel lane to a different travel lane. In another particular example, if the at least one characteristic includes a length of time the at least one brake light remains illuminated after activation that is above a threshold, the determined navigational action may include slowing the host vehicle to increase a gap between the host vehicle and the target vehicle and/or navigating the host vehicle from a current travel lane to a different travel lane. In yet another particular example, if the at least one characteristic includes a number of times over a predetermined time interval that the at least one brake light is activated that is above a threshold, the determined navigational action may include slowing the host vehicle to increase a gap between the host vehicle and the target vehicle and/or navigating the host vehicle from a current travel lane to a different travel lane. In another example, if the at least one characteristic includes a pattern over a period of time that is determined to be erratic (e.g., by applying a frequency test, a serial test, a poker test, a gap test, a mono-bit test, a Wald-Wolfowitz test, an autocorrelation test, a Kolmogorov-Smirnov test, a spectral test, and/or Diehard tests; by calculating entropy; or the like), the determined navigational action may include slowing the host vehicle to increase a gap between the host vehicle and the target vehicle and/or navigating the host vehicle from a current travel lane to a different travel lane.

Navigational change module 3108 may account for at least one characteristic associated with a speed of the target vehicle in addition to the at least one characteristic associated with the changes in the illumination state of the at least one brake light. For example, navigational change module 3108 may determine a frequency threshold based on the average (or median, mode, etc.) deceleration when the target vehicle brakes. Accordingly, navigational change module 3108 may still cause a navigational change if the target vehicle engages in less frequent but overly heavy braking. In another example, navigational change module 3108 may determine a number of times over a predetermined time interval threshold based on the average (or median, mode, etc.) acceleration after the target vehicle brakes. Accordingly, navigational change module 3108 may still cause a navigational change if the target vehicle engages in fewer occurrences of braking but engages in overly heavy accelerating afterward.

Additionally or alternatively, navigational change module 3108 may account for at least one characteristic associated with a trajectory of the target vehicle in addition to the at least one characteristic associated with the changes in the illumination state of the at least one brake light. For example, navigational change module 3108 may determine a frequency threshold based on the average (or median, mode, etc.) drift of the target vehicle from an expected trajectory. Accordingly, navigational change module 3108 may still cause a navigational change if the target vehicle engages in less frequent braking but is swerving within its lane. In another example, navigational change module 3108 may determine a number of times over a predetermined time interval threshold based on the average (or median, mode, etc.) lane changes of the target vehicle. Accordingly, navigational change module 3108 may still cause a navigational change if the target vehicle engages in fewer occurrences of braking but engages in frequent lane changes.

In some embodiments, causing the navigational change for the host vehicle may include causing an adjustment of a navigational actuator of the host vehicle. As explained above, a navigational actuator may include at least one of a steering mechanism, a brake, or an accelerator.

Figure 32A:
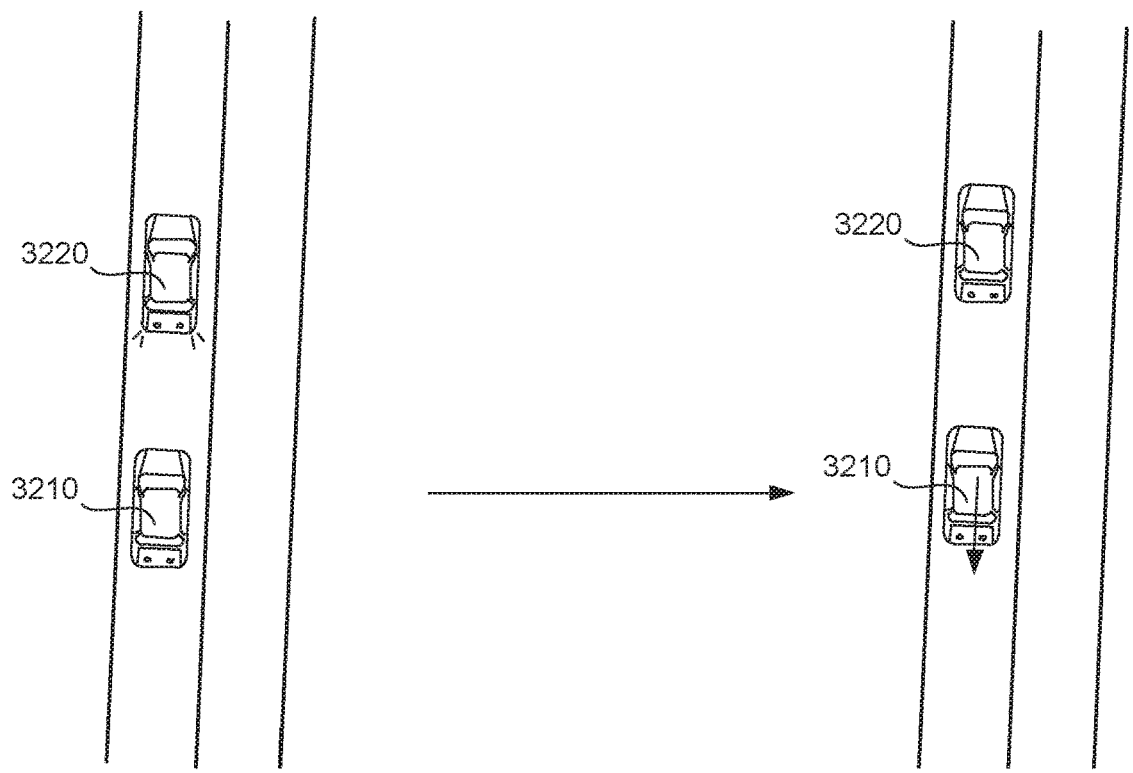
FIG. 32A provides a diagrammatic illustration of a host vehicle navigating based on a sensed brake light pattern of a leading vehicle consistent with the disclosed embodiments.

FIG. 32A is a diagram of host vehicle 3210 navigating based on a sensed brake light pattern of leading vehicle 3220. In the example of FIG. 32A, host vehicle 3210 slows down in response to a characteristic associated with changes in an illumination state of the at least one brake light of target vehicle 3220. For example, the characteristic may include a frequency at which the illumination state of the at least one brake light of target vehicle 3220 changes, and the frequency may exceed a threshold. In another example, the characteristic may include a length of time the at least one brake light of target vehicle 3220 remains illuminated after activation, and the length of time may exceed a threshold. In yet another example, the characteristic may include a number of times over a predetermined time interval that the at least one brake light of target vehicle 3220 is activated, and the number of times may exceed a threshold. Any of the above examples may be combined.

Figure 32B:
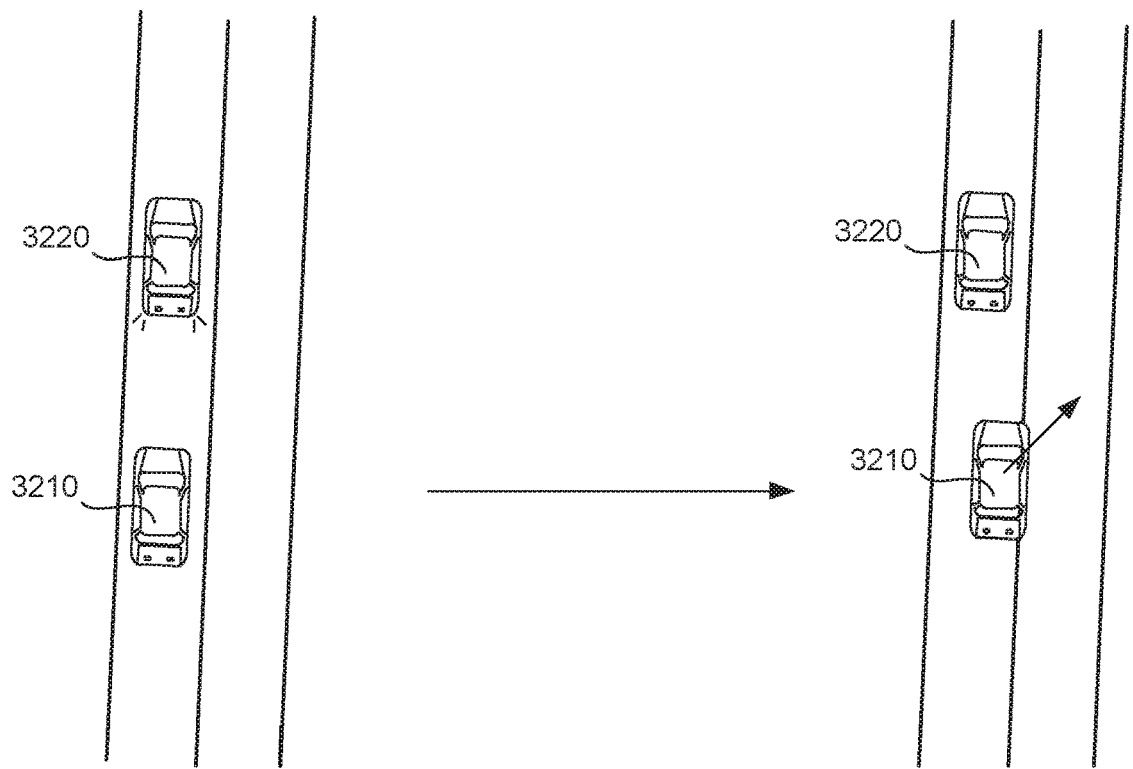
FIG. 32B provides another diagrammatic illustration of a host vehicle navigating based on a sensed brake light pattern of a leading vehicle consistent with the disclosed embodiments.

FIG. 32B is another diagram of host vehicle 3210 navigating based on a sensed brake light pattern of leading vehicle 3220. In the example of FIG. 32B, host vehicle 3210 changes lanes in response to a characteristic associated with changes in an illumination state of the at least one brake light of target vehicle 3220. For example, the characteristic may include a frequency at which the illumination state of the at least one brake light of target vehicle 3220 changes, and the frequency may exceed a threshold. In another example, the characteristic may include a length of time the at least one brake light of target vehicle 3220 remains illuminated after activation, and the length of time may exceed a threshold. In yet another example, the characteristic may include a number of times over a predetermined time interval that the at least one brake light of target vehicle 3220 is activated, and the number of times may exceed a threshold. Any of the above examples may be combined.

Host vehicle 3210 may include memory 3100 described above and use the modules therein to perform the decisions depicted in FIGS. 32A and 32B. Additionally or alternatively, host vehicle 3210 may execute method 3300 described below to perform the decisions depicted in FIGS. 32A and 32B.

Figure 33:
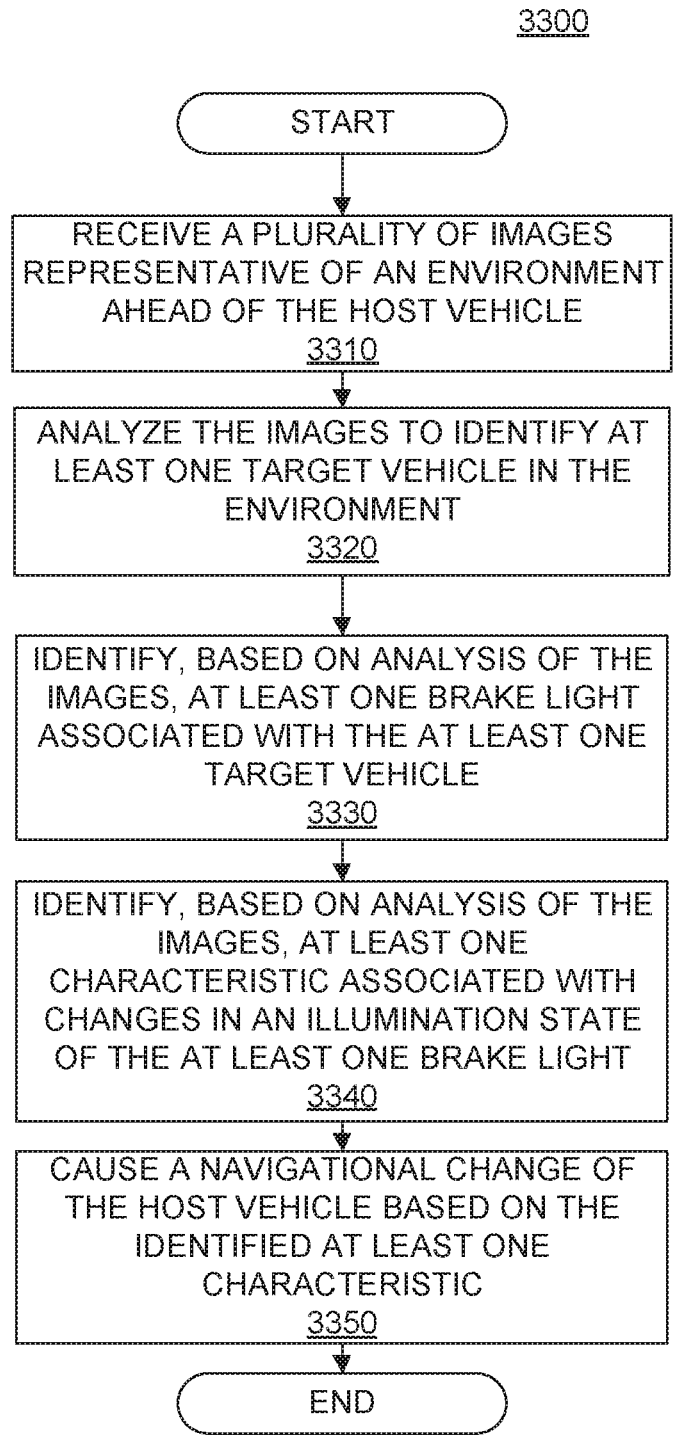
FIG. 33 provides an algorithmic flow chart for navigating a vehicle based on a sensed brake light pattern of a leading vehicle consistent with the disclosed embodiments.

FIG. 33 depicts a flow chart of method 3300 for navigating a vehicle based on a sensed brake light pattern of a leading vehicle. Method 3300 may, for example, be implemented by at least one processing device (e.g., processing device 110) of the host vehicle.

At step 3310, processing device 110 may receive, from a camera, a plurality of images representative of an environment ahead of the host vehicle. For example, the camera may be at least one of image capture device 122, image capture device 124, and image capture device 126. The plurality of images may be captured from different angles (e.g., using different cameras) and/or at different times. In one particular example, the plurality of images may represent a plurality of temporal sequences of frames, each sequence covering the same period of time but at a unique angle.

In some embodiments, processing device 110 may receive additional information from other sensors in the host vehicle. For example, processing device 110 may receive information from a speedometer, a GPS, an accelerometer, a radar, a lidar, a suspension sensor, or the like.

At step 3320, processing device 110 may analyze the plurality of images to identify at least one target vehicle in the environment ahead of the host vehicle. For example, processing device 110 may apply one or more image classifiers (optionally cascading classifiers) to identify the at least one target vehicle in the plurality of images. One or more neural networks may be used in combination with or in lieu of any of the techniques described above.

At step 3330, processing device 110 may identify, based on analysis of the plurality of images, at least one brake light associated with the target vehicle. For example, processing device 110 may apply one or more image classifiers (optionally cascading classifiers) to identify the at least one brake light in the plurality of images. The one or more image classifiers may be applied to the images as a whole or to a portion of the images including the at least one target vehicle. One or more neural networks may be used in combination with or in lieu of any of the techniques described above.

At step 3340, processing device 110 may identify, based on analysis of the plurality of images, at least one characteristic associated with changes in an illumination state of the at least one brake light. For example, the at least one characteristic may include a frequency at which the illumination state of the at least one brake light changes, a length of time the at least one brake light remains illuminated after activation, a number of times over a predetermined time interval that the at least one brake light is activated, a pattern over a period of time, or any combination thereof.

In some embodiments, processing device 110 may receive an updated plurality of images used to detect the at least one characteristic. Similar to the at least one target vehicle and the at least one brake light, processing device 110 may apply one or more image classifiers (optionally cascading classifiers) to the updated images to identify the detected change. Additionally or alternatively, processing device 110 may calculate an optical flow of the updated images to detect changes in an illumination state of the at least one brake light. One or more neural networks may be used in combination with or in lieu of the image classifiers and/or optical flow algorithms.

At step 3350, processing device 110 may cause a navigational change for the host vehicle based on the identified at least one characteristic associated with the changes in the illumination state of the at least one brake light. For example, the navigational change for the host vehicle may include slowing the host vehicle to increase a gap between the host vehicle and the target vehicle, navigating the host vehicle from a current travel lane to a different travel lane, or the like.

In some embodiments, causing the navigational change for the host vehicle may include causing an adjustment of a navigational actuator of the host vehicle. In one particular example, if the navigational change includes slowing the host vehicle to increase a gap between the host vehicle and the target vehicle, processing device 110 may adjust a brake of the host vehicle. Similarly, if the navigational change includes navigating the host vehicle from a current travel lane to a different travel lane, processing device 110 may adjust a steering mechanism of the host vehicle.

Method 3300 may include additional steps. For example, method 3300 may further include causing a second navigational change for the host vehicle based on the first navigational change. For example, if the first navigational change includes navigating the host vehicle from a current travel lane to a different travel lane, the second navigational change may include accelerating the host vehicle to pass the target vehicle. In another example, if the first navigational change includes slowing the host vehicle to increase a gap between the host vehicle and the target vehicle, the second navigational change may include navigating the host vehicle from a current travel lane to a different travel lane.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A navigation system for a host vehicle, the system comprising: at least one processing device comprising circuitry and a memory, wherein the memory includes instructions that when executed by the circuitry cause the at least one processing device to: receive a plurality of images acquired by a camera, the plurality of images being representative of an environment ahead of the host vehicle; analyze the plurality of images to identify at least one target vehicle in the environment ahead of the host vehicle; identify, based on analysis of the plurality of images, at least one brake light associated with the at least one target vehicle; identify, based on analysis of the plurality of images, at least one characteristic associated with changes in an illumination state of the at least one brake light; and cause a navigational change for the host vehicle based on the identified at least one characteristic associated with the changes in the illumination state of the at least one brake light, the navigational change being associated with a movement of the at least one target vehicle.

2. The system of claim 1, wherein the at least one characteristic includes a frequency at which the illumination state of the at least one brake light changes.

3. The system of claim 1, wherein the at least one characteristic includes a length of time the at least one brake light remains illuminated after activation.

4. The system of claim 1, wherein the at least one characteristic includes a number of times over a predetermined time interval that the at least one brake light is activated.

5. The system of claim 1, wherein causing the navigational change for the host vehicle includes causing an adjustment of a navigational actuator of the host vehicle.

6. The system of claim 5, wherein the navigational actuator includes at least one of a steering mechanism, a brake, or an accelerator.

7. The system of claim 1, wherein the navigational change for the host vehicle includes slowing the host vehicle to increase a gap between the host vehicle and the target vehicle.

8. The system of claim 1, wherein the navigational change for the host vehicle includes navigating the host vehicle from a current travel lane to a different travel lane.

9. The system of claim 1, wherein the at least one characteristic includes a pattern over a period of time.

10. A computer-implemented method for navigating a host vehicle, the method comprising: receiving a plurality of images acquired by a camera, the plurality of images being representative of an environment ahead of the host vehicle; analyzing the plurality of images to identify at least one target vehicle in the environment ahead of the host vehicle; identifying, based on analysis of the plurality of images, at least one brake light associated with the at least one target vehicle; identifying, based on analysis of the plurality of images, at least one characteristic associated with changes in an illumination state of the at least one brake light; and causing a navigational change for the host vehicle based on the identified at least one characteristic associated with the changes in the illumination state of the at least one brake light, the navigational change being associated with a movement of the at least one target vehicle.

11. The method of claim 10, wherein the at least one characteristic includes a frequency at which the illumination state of the at least one brake light changes.

12. The method of claim 10, wherein the at least one characteristic includes a length of time the at least one brake light remains illuminated after activation.

13. The method of claim 10, wherein the at least one characteristic includes a number of times over a predetermined time interval that the at least one brake light is activated.

14. The method of claim 10, wherein the navigational change for the host vehicle includes slowing the host vehicle to increase a gap between the host vehicle and the target vehicle.

15. The method of claim 10, wherein the navigational change for the host vehicle includes navigating the host vehicle from a current travel lane to a different travel lane.

16. The method of claim 10, wherein the at least one characteristic includes a pattern over a period of time.

17. A non-transitory, computer-readable storage medium storing instructions that, when executed by at least one processing device, cause the at least one processing device to: receive a plurality of images acquired by a camera, the plurality of images being representative of an environment ahead of the host vehicle; analyze the plurality of images to identify at least one target vehicle in the environment ahead of the host vehicle; identify, based on analysis of the plurality of images, at least one brake light associated with the at least one target vehicle; identify, based on analysis of the plurality of images, at least one characteristic associated with changes in an illumination state of the at least one brake light; and cause a navigational change for the host vehicle based on the identified at least one characteristic associated with the changes in the illumination state of the at least one brake light, the navigational change being associated with a movement of the at least one target vehicle.

18. The non-transitory, computer-readable storage medium of claim 17, wherein the at least one characteristic includes a frequency at which the illumination state of the at least one brake light changes.

19. The non-transitory, computer-readable storage medium of claim 17, wherein the at least one characteristic includes a length of time the at least one brake light remains illuminated after activation.

20. The non-transitory, computer-readable storage medium of claim 17, wherein the at least one characteristic includes a number of times over a predetermined time interval that the at least one brake light is activated.

21. The non-transitory, computer-readable storage medium of claim 17, wherein the navigational change for the host vehicle includes slowing the host vehicle to increase a gap between the host vehicle and the target vehicle.

22. The non-transitory, computer-readable storage medium of claim 17, wherein the navigational change for the host vehicle includes navigating the host vehicle from a current travel lane to a different travel lane.

23. The non-transitory, computer-readable storage medium of claim 17, wherein the at least one characteristic includes a pattern over a period of time.

\* \* \* \* \*